(12) United States Patent
Weitsman

(10) Patent No.: US 10,518,403 B2
(45) Date of Patent: Dec. 31, 2019

(54) BLIND SLIDE-MOUNT FASTENER ALIGNMENT APPARATUS, KIT AND METHOD

(71) Applicant: CW Consulting Associates, LLC, Saratoga, CA (US)

(72) Inventor: Kevin L. Weitsman, Saratoga, CA (US)

(73) Assignee: CW Consulting Associates, LLC, Saratoga, CA (US)

( * ) Notice: Subject to any disclaimer, the term of this patent is extended or adjusted under 35 U.S.C. 154(b) by 0 days.

(21) Appl. No.: 16/018,033

(22) Filed: Jun. 25, 2018

(65) Prior Publication Data

US 2018/0370017 A1    Dec. 27, 2018

Related U.S. Application Data

(60) Provisional application No. 62/524,611, filed on Jun. 25, 2017.

(51) Int. Cl.
| | |
|---|---|
| *A47G 1/16* | (2006.01) |
| *B25H 7/04* | (2006.01) |
| *F16M 13/02* | (2006.01) |
| *A47G 1/20* | (2006.01) |
| *F16B 19/10* | (2006.01) |

(Continued)

(52) U.S. Cl.
CPC ............. *B25H 7/045* (2013.01); *A47G 1/205* (2013.01); *F16M 13/02* (2013.01); *B43K 23/016* (2013.01); *F16B 19/109* (2013.01); *F16B 21/09* (2013.01)

(58) Field of Classification Search
CPC .......... A47G 1/205; B25H 7/045; F16M 13/02
USPC ..................................................... 33/666, 613
See application file for complete search history.

(56) References Cited

U.S. PATENT DOCUMENTS

| | | |
|---|---|---|
| 2,343,499 A | 3/1944 | Edwards |
| 4,202,108 A | 5/1980 | Adams, Jr. et al. |

(Continued)

FOREIGN PATENT DOCUMENTS

WO    2017053636 A1    3/2017

OTHER PUBLICATIONS

Oct. 24, 2014 Internet Archive screen capture of Home Depot web page for 20 lb. Large Keyhole Hangers, Model # 50236.

(Continued)

*Primary Examiner* — Christopher W Fulton
(74) *Attorney, Agent, or Firm* — Lance M. Pritikin

(57) ABSTRACT

A marking apparatus facilitates blind slide-mounting of an object to a mounting surface in a desired alignment using the object as an alignment template. A retention element in receipt of a post is movable against resilient bias to allow the head of the apparatus to capture a mounting slot in the object. The resilient bias moves the retention element to a gripping position, and a cover is rotated to cause a tightening element to secure the grip of the apparatus to the object. A rotational detent element offset from the head prevents the post from rotating with respect to the retention element. When affixed to the object, the apparatus is used to mark the appropriate location for installation of a fastener to supportingly engage the slide-mount slot of the object. The apparatus may include an orthogonality adapter to ensure that it remains orthogonal to the object during certain marking operations.

47 Claims, 34 Drawing Sheets

(51) Int. Cl.
*B43K 23/016* (2006.01)
*F16B 21/09* (2006.01)

(56) References Cited

U.S. PATENT DOCUMENTS

| | | | |
|---|---|---|---|
| 4,382,337 A * | 5/1983 | Bendick | B25H 7/04 |
| | | | 33/574 |
| 4,392,425 A | 7/1983 | Capezzuto et al. | |
| 4,466,193 A | 8/1984 | Astle | |
| 4,512,084 A * | 4/1985 | Lieberman | A47G 1/205 |
| | | | 33/574 |
| 4,794,857 A | 1/1989 | Waters, Sr. | |
| 4,837,942 A | 6/1989 | Watts | |
| 5,477,620 A * | 12/1995 | Barnett | B25H 7/04 |
| | | | 33/644 |
| 5,927,919 A | 7/1999 | Blankenship et al. | |
| 6,360,661 B1 | 3/2002 | Cheung | |
| 6,574,880 B2 | 6/2003 | Lombardo | |
| 6,848,192 B2 * | 2/2005 | Partin | E04F 21/1855 |
| | | | 33/613 |
| 6,908,270 B1 | 6/2005 | Iwata | |
| 6,952,887 B2 | 10/2005 | Muchnik | |
| 6,971,184 B2 | 12/2005 | Prevost | |
| 6,978,551 B2 | 12/2005 | Krake et al. | |
| 6,983,691 B2 | 1/2006 | Shih | |
| 7,032,872 B2 | 4/2006 | Sullivan | |
| 7,185,442 B2 * | 3/2007 | Grillo | A47G 1/205 |
| | | | 33/613 |
| 7,293,925 B1 | 11/2007 | Sanseviero | |
| 7,350,312 B1 * | 4/2008 | Grillo | A47G 1/205 |
| | | | 33/613 |
| 7,497,028 B2 * | 3/2009 | Nevers | A47G 1/1606 |
| | | | 33/613 |
| 8,458,979 B2 | 6/2013 | Ebner et al. | |
| 9,555,540 B1 | 1/2017 | Weitsman | |
| 2002/0083612 A1 | 7/2002 | Prather | |
| 2004/0098875 A1 | 5/2004 | Gould | |
| 2006/0075650 A1 * | 4/2006 | Tatum | B25H 7/045 |
| | | | 33/666 |
| 2007/0119068 A1 * | 5/2007 | Horst | A47G 1/205 |
| | | | 33/666 |
| 2007/0283588 A1 * | 12/2007 | Gardner | F16B 15/02 |
| | | | 33/666 |
| 2008/0315063 A1 | 12/2008 | Gallien | |
| 2009/0193674 A1 | 8/2009 | Megahed | |
| 2011/0174953 A1 | 7/2011 | Ruiz et al. | |
| 2015/0034794 A1 | 2/2015 | Durante | |
| 2015/0144756 A1 | 5/2015 | Miller | |
| 2017/0008161 A1 | 1/2017 | Weitsman | |
| 2017/0273479 A1 * | 9/2017 | Snyder | A47G 1/205 |
| 2019/0070877 A1 * | 3/2019 | Flores | B41K 1/003 |

OTHER PUBLICATIONS

Mar. 12, 2015 Internet Archive screen capture of Parts Express web page for Keyhole Speaker Hanging Kit, Hangman Model KSH4-B.
Sep. 2, 2013 Internet Archive screen capture of E-VisionUK Hotel Solutions web page for Keyhole Brackets.

* cited by examiner

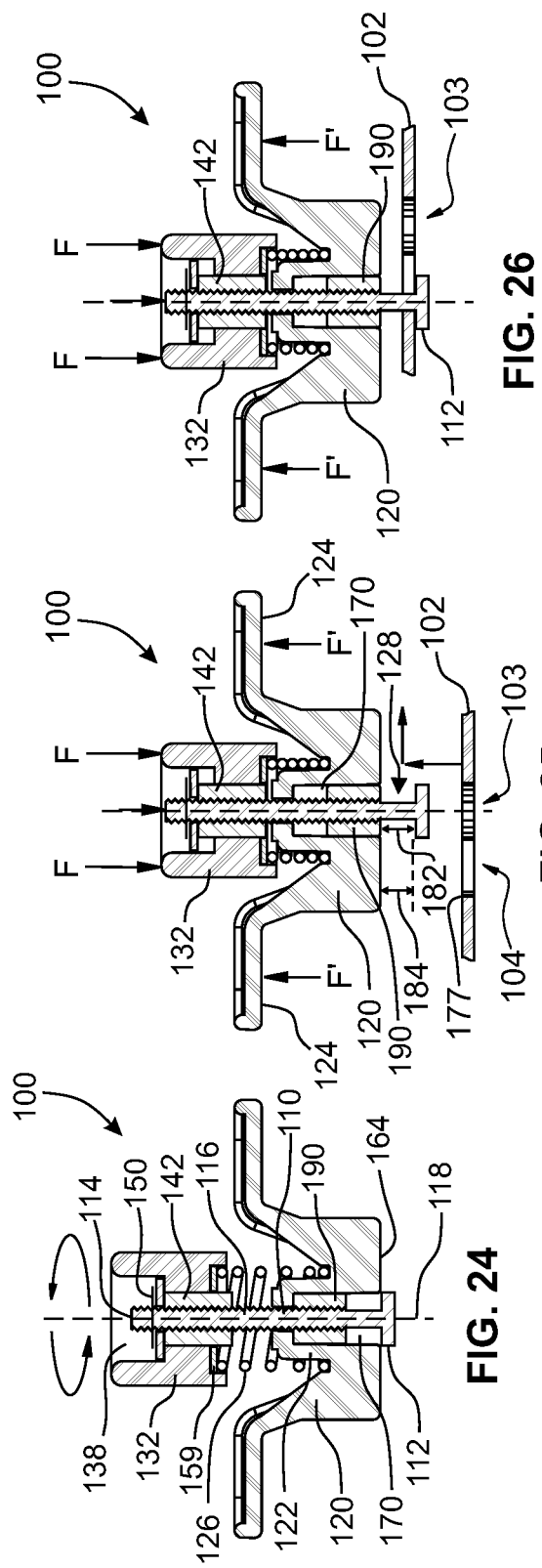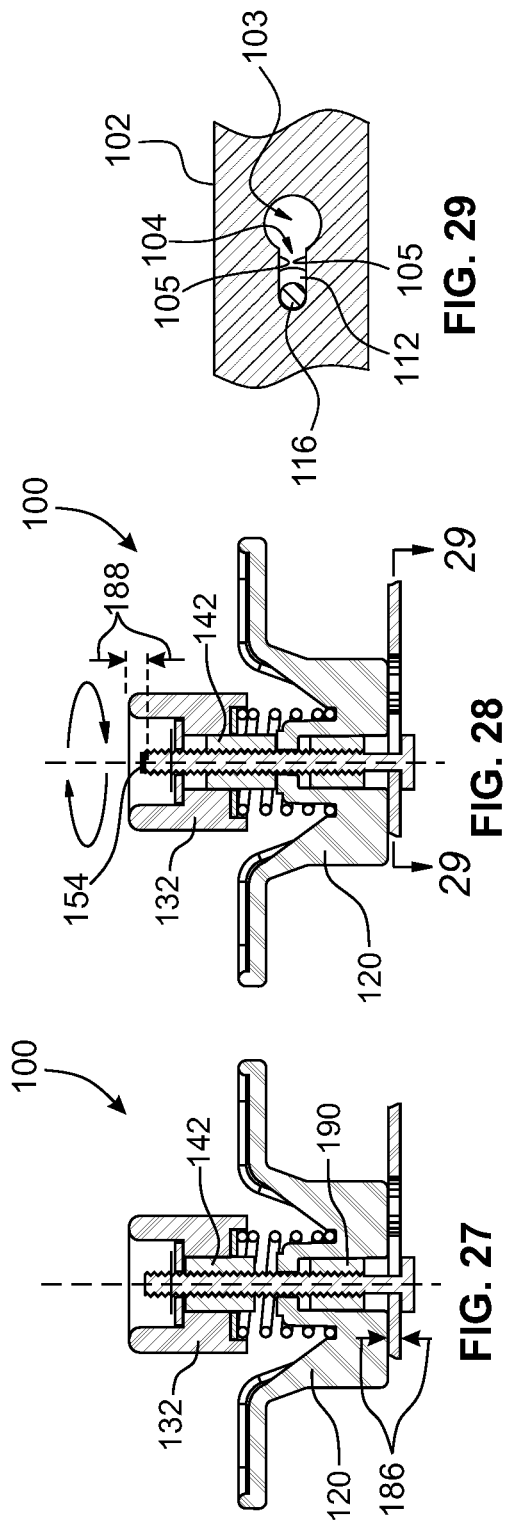

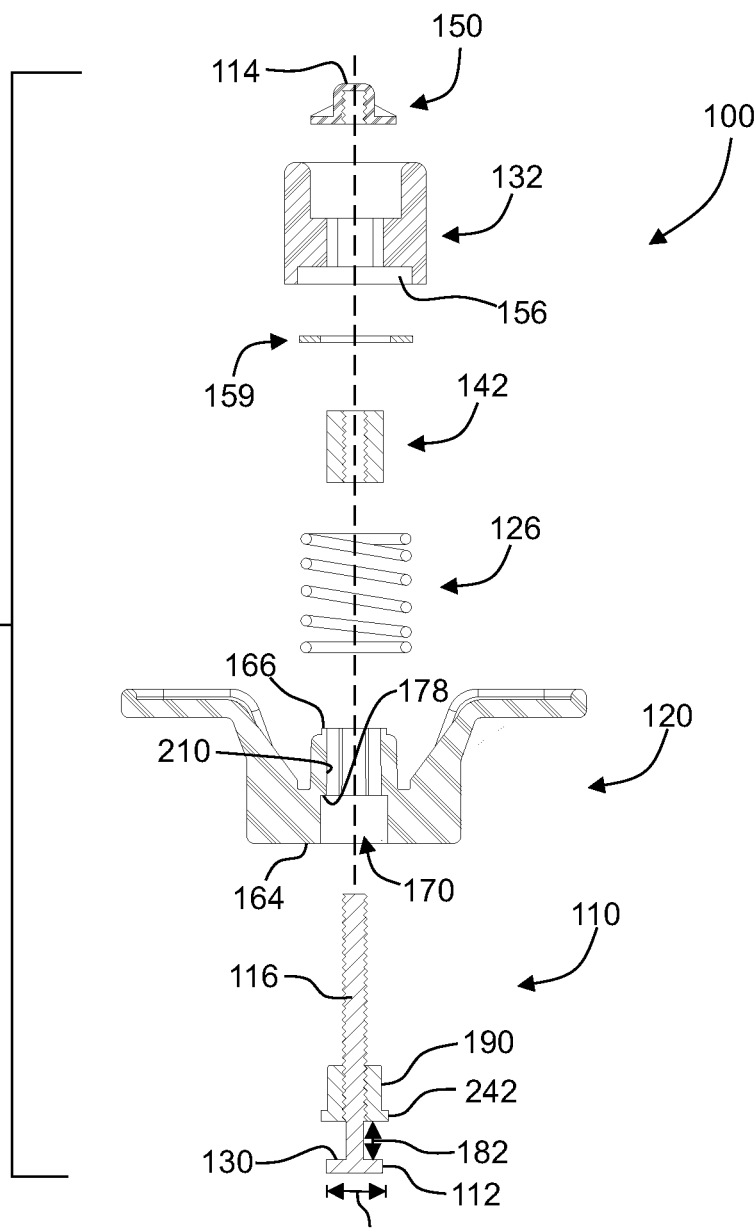
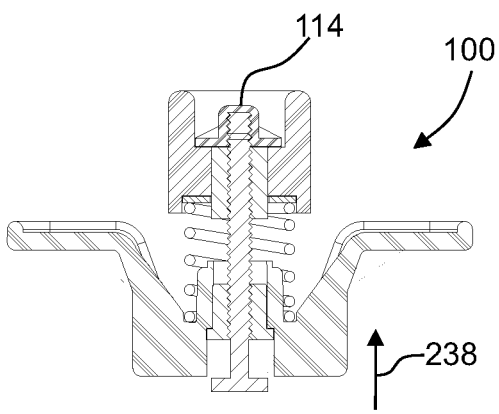
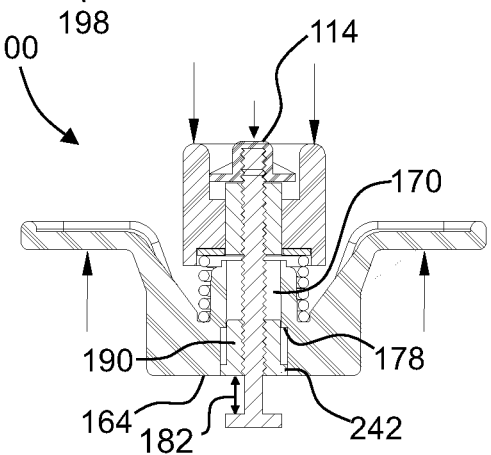
FIG. 62
FIG. 63

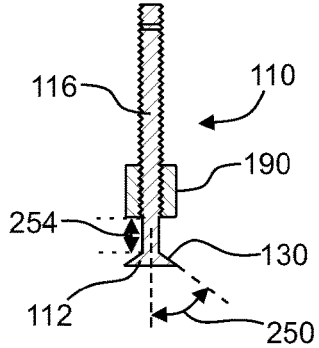
FIG. 64
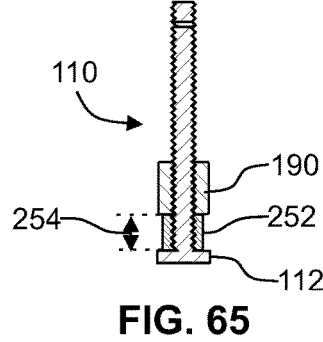
FIG. 65
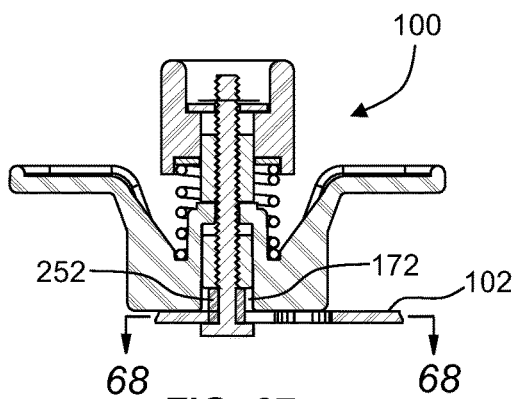
FIG. 67
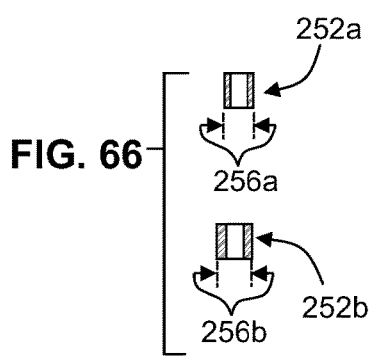
FIG. 66
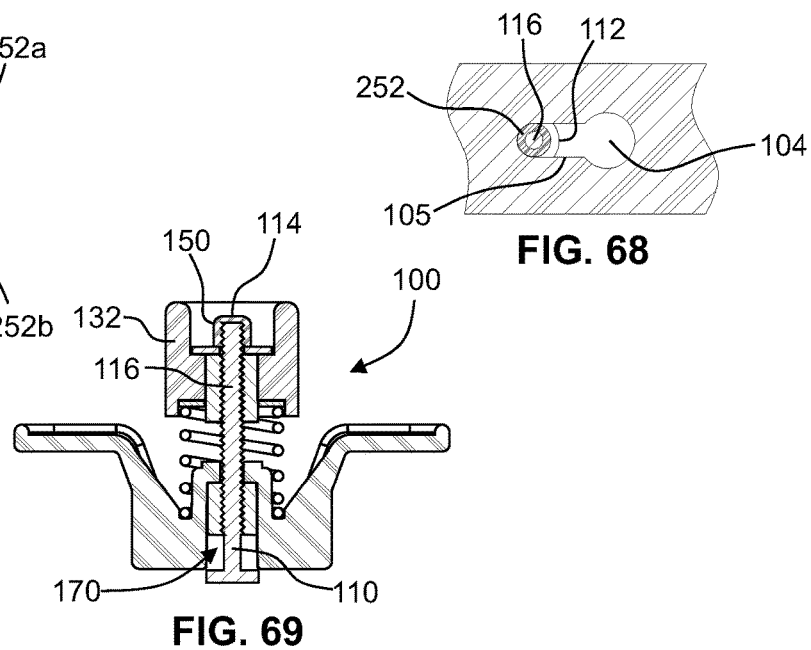
FIG. 68
FIG. 69
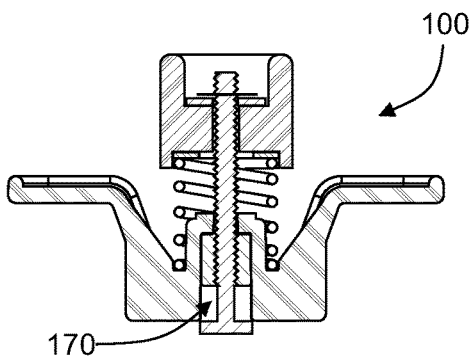
FIG. 70
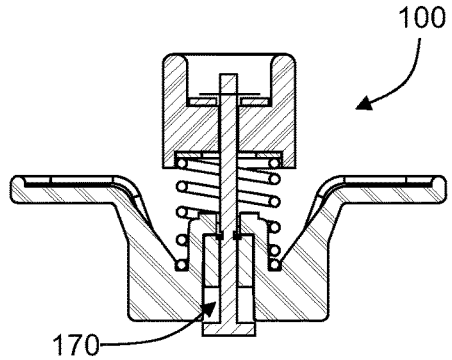
FIG. 71

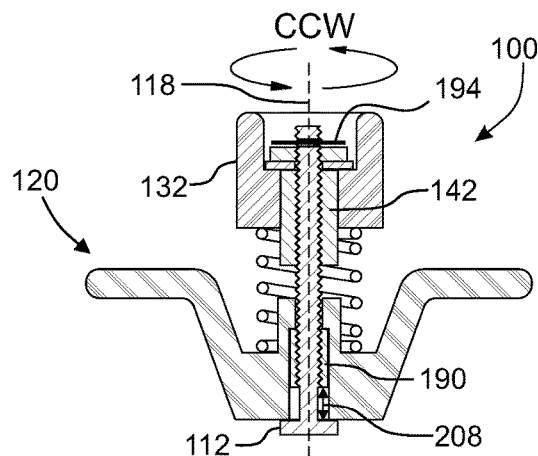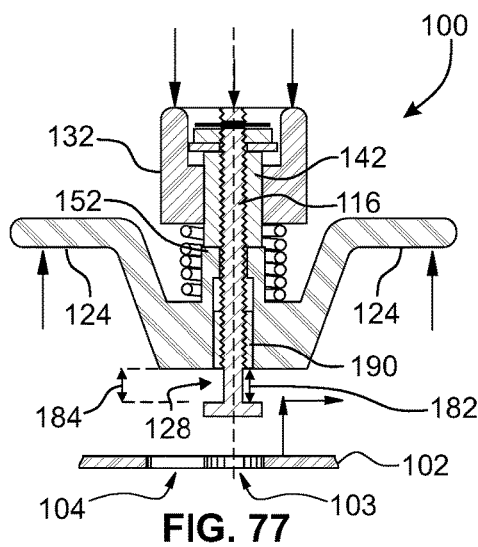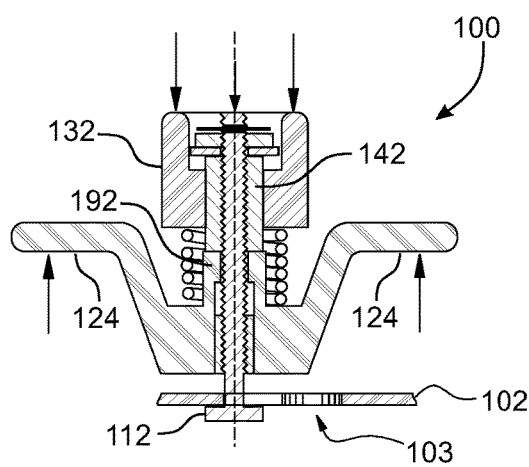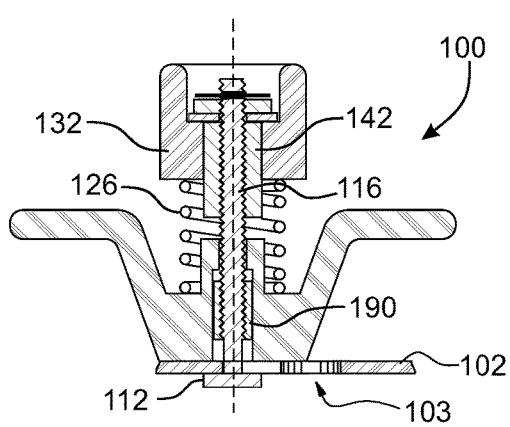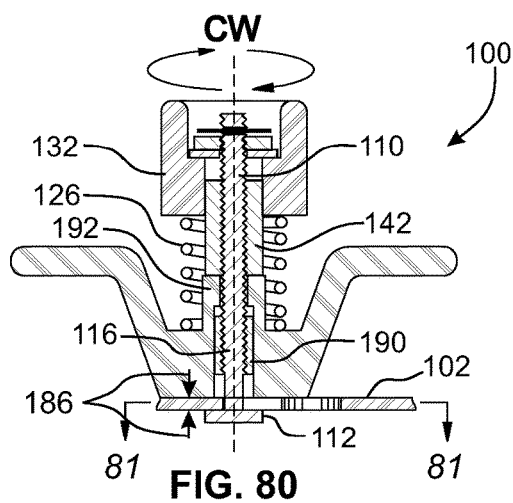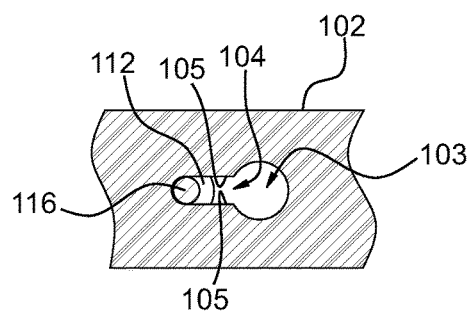

BLIND SLIDE-MOUNT FASTENER ALIGNMENT APPARATUS, KIT AND METHOD

RELATED APPLICATIONS

This application claims the benefit of U.S. Provisional Application No. 62/524,611 filed Jun. 25, 2017, the content of which is incorporated by this reference in its entirety for all purposes as if fully set forth herein.

TECHNICAL FIELD

The disclosure herein relates generally to devices and methods for mounting objects onto supporting structures. More particularly, the disclosure relates to devices and methods to facilitate placement of blind slide-mount fasteners on a supporting wall or other structure in a manner which results in desired alignment of the mounted object.

BACKGROUND

There are a considerable number of commercial items (objects) that come with molded or cut-in keyhole slots (blind slide-mounts). There is also a range of tools available for the do-it-yourself (DIY) population to generate their own keyhole slots, such as in picture frames. And further still, there is a large selection of add-on keyhole slot hardware available to consumers.

Blind slide-mounts (e.g. keyhole slots) are very desirable by virtue of having no visible mounting hardware. That virtue also defines the key issue associated with all keyhole slots (blind slide-mounts)—determining where on the mounting surface the fasteners should be located to ensure the object ends up mounted in the desired alignment. The vast majority of commercial items come without mounting templates, and certainly that is the case for DIY/add-on applications. Making a template can be tedious and time consuming. Determining the mount fastener locations using measurements is considerably more complex, and often results in the inability to mount an object due to slight errors. And in all cases, using either measurements or templates, there is no consideration for the actual 3D geometry of an object which can result in interference with a nearby object or visual displeasure.

What is needed is a device that allows an object-to-be-mounted to be used as its own "template" for determining mount fastener locations, with a key focus on being very easy to use to achieve first-time accuracy, and having broad applicability to virtually all keyhole slot (blind slide-mount) types and configurations.

Applicant's previously-filed PCT International Patent Application No. PCT/US2016/053208 (Published on Mar. 30, 2017 as WO 2017/053636) disclosed certain expedients for a blind slide-mount fastener alignment apparatus, kit and method. The instant disclosure presents further innovations which extend beyond the teachings of Applicant's previously-published work.

SUMMARY

Certain deficiencies of the prior art are overcome by the provision of embodiments of an apparatus, kit and method in accordance with the present disclosure. Advantages of embodiments of the teachings disclosed herein include providing an apparatus that (a) securely tightens to the object to ensure marking and mounting accuracy, regardless of the materials the object is made of, (b) functions on virtually all blind slide-mount configurations, and (c) avoids making undesirable marks on the mounting surface while positioning the object to be mounted. Moreover, certain enhancements of the apparatus allow the finger grip orientation to be rotationally reconfigured in relation to the respective blind slide mount slot, and allow the post element to be easily replaced to selectively provide the apparatus with larger or smaller shaft and/or head dimensions to accommodate different slot sizes.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 24 is a diagrammatic cross-sectional view of the example marking apparatus of FIG. 23 in assembled configuration, and wherein the cover element is shown being rotated counter-clockwise so as to ensure the tightening element is threadedly moved away from the opposing face of the object retention element;

FIG. 25 is a diagrammatic cross-sectional view similar to that of FIG. 24, but wherein the object retention element is shown axially moved to its open position;

FIG. 26 is a diagrammatic cross-sectional view similar to that of FIG. 25, but in which the head portion of the post element has been inserted through a fastener head opening of a mounting slot of the object;

FIG. 27 is a diagrammatic cross-sectional view similar to that of FIG. 26, but showing the object retention element in a gripping position and the tightening element in a release position;

FIG. 28 is a diagrammatic cross-sectional view similar to that of FIG. 27, but showing the cover element being rotated while the rotational detent member remains non-rotatably engaged with the rotational detent face, thereby preventing the post element from being able to rotate with respect to the object retention element, to threadingly transport the tightening element to its lock or retaining position so as to clampingly secure the object slot lips between the head portion and the object retention element;

FIG. 29 is a diagrammatic cross-sectional view taken across lines 29-29 of FIG. 28;

FIG. 61 is a diagrammatic exploded view of another alternate example marking apparatus in accordance with the present disclosure, wherein the axial detent member and rotational detent member are a unitary component, and the cover retention element is configured to threadedly engage the shaft portion and thereby form the marking end;

FIG. 62 is a diagrammatic cross-sectional view of the example marking apparatus of FIG. 61 in assembled configuration, illustrating one example of how the limitation of axial movement may be by way of engagement between the axial detent portion and the rotational detent member within the alignment bore, and how the cover retention element may form the marking tip;

FIG. 63 is a diagrammatic cross-sectional view similar to that of FIG. 62, but wherein the object retention element is shown axially moved to its open position;

FIG. 64 is a diagrammatic cross-sectional view of an example alternate post element wherein the inner face of the head portion is tapered at a taper angle with respect to the shaft portion, and the taper angle is between 30 and 60 degrees;

FIG. 65 is a diagrammatic cross-sectional view of another example alternate post element wherein a shaft size adapter is in receiving engagement with the shaft portion within a clearance zone, the clearance zone being defined by the axial offset between the rotational detent member and the head portion;

FIG. 66 is a diagrammatic cross-sectional view of a pair of shaft size adapters having different shaft adapter diameters, and which may be placed in receiving engagement with shaft portion;

FIG. 67 is a diagrammatic cross-sectional view of an example marking adapter with a shaft size adapter in receiving engagement with the shaft portion of the post element;

FIG. 68 is a diagrammatic cross-sectional view taken along lines 68-68 of FIG. 67, illustrating how the shaft size adapter allows the marking apparatus to accommodate a wider slide mount slot;

FIG. 69 is a diagrammatic cross-sectional view of another example marking apparatus, wherein the cover retention element is configured to threadedly engage the shaft portion, and thereby form the marking end;

FIG. 70 is a diagrammatic cross-sectional view of another example marking apparatus, wherein the apparatus lacks a tightening element;

FIG. 71 is a diagrammatic cross-sectional view of another example marking apparatus similar to that of FIG. 70, but wherein the shaft portion is unthreaded;

FIG. 76 is a diagrammatic cross-sectional view similar to that of FIG. 73, but wherein the cover element is shown being rotated counter-clockwise so as to ensure the tightening element is threadedly moved away from the inset collar;

FIG. 77 is a diagrammatic cross-sectional view similar to that of FIG. 76, but wherein the object retention element is shown axially moved to its open position;

FIG. 78 is a diagrammatic cross-sectional view similar to that of FIG. 77, but wherein the head portion of the post element has been inserted through fastener head opening of a mounting slot of the object;

FIG. 79 is a diagrammatic cross-sectional view of the apparatus of FIG. 78, but showing the object retention element in a gripping position and the tightening element in a release position;

FIG. 80 is a diagrammatic cross-sectional view similar to that of FIG. 79, but showing the cover element being rotated while the rotational detent member remains non-rotatably engaged with the rotational detent face, thereby preventing the post element from being able to rotate with respect to the object retention element, to threadingly transport the tightening element to its lock or retaining position so as to clampingly secure the object slot lips between the head portion and the object retention element;

FIG. 81 is a diagrammatic cross-sectional view taken across lines 81-81 of FIG. 80;

FIG. 104 is an example flow diagram illustrating one example process for changing finger grip orientation and subsequent device use for blind slide mount attachment location devices, such as the marking apparatus of FIGS. 89 and 93;

FIG. 105 is an example flow diagram illustrating one example process for changing the head size (e.g., diameter) and subsequent device use in blind slide-mount attachment location devices, such as the marking apparatus of FIGS. 89 and 93;

FIG. 106 is a diagrammatic cross-sectional view of an alternate example cover element with a spring alignment groove;

Figure 107A:
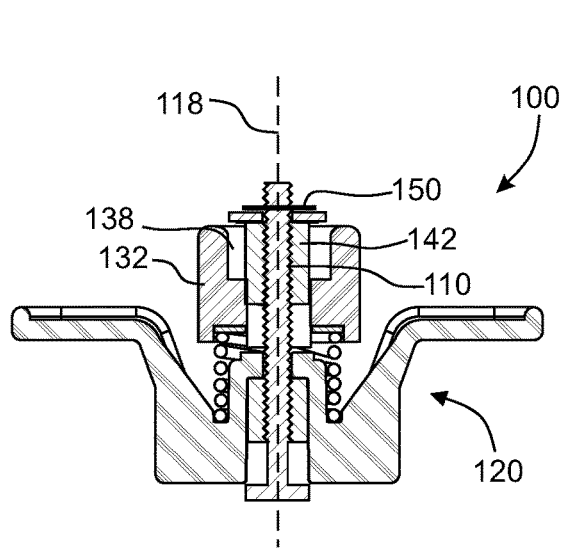
Figure 107B:
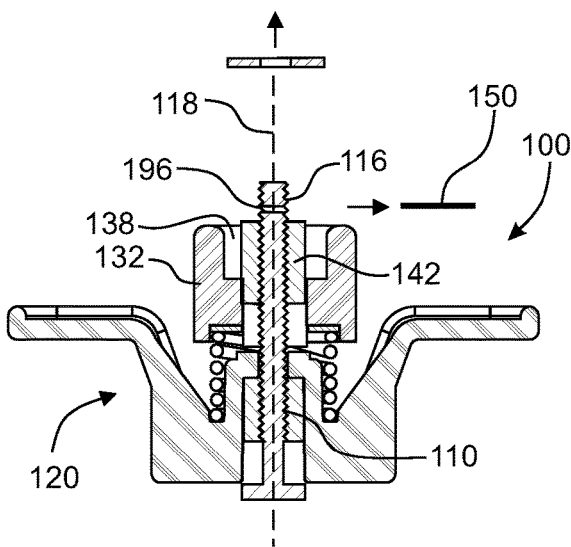

FIG. 107A is a diagrammatic cross-sectional view of an example marking apparatus showing how the cover element may be movable with respect to the post element to a retention-access position, whereat the cover retention element is removable from the shaft portion; and FIG. 107B is a diagrammatic cross-sectional view similar to that of FIG. 107B, but showing the cover retention element laterally removed from the shaft portion.

DETAILED DESCRIPTION OF THE PREFERRED EMBODIMENTS

Referring now to the drawings, like reference numerals designate identical or corresponding features throughout the several views.

With reference to the several drawings, various embodiments of a marking apparatus for facilitating blind slide-mounting of an object 102 to a mounting surface 108 in a desired alignment using the object as an alignment template are shown generally at 100.

Embodiments of a marking apparatus 100 in accordance with the present disclosure may preferably comprise an object retention element 120, a tightening element 142, a cover element 132, and a post element 110 with a rotational detent member 190.

Figure 2:
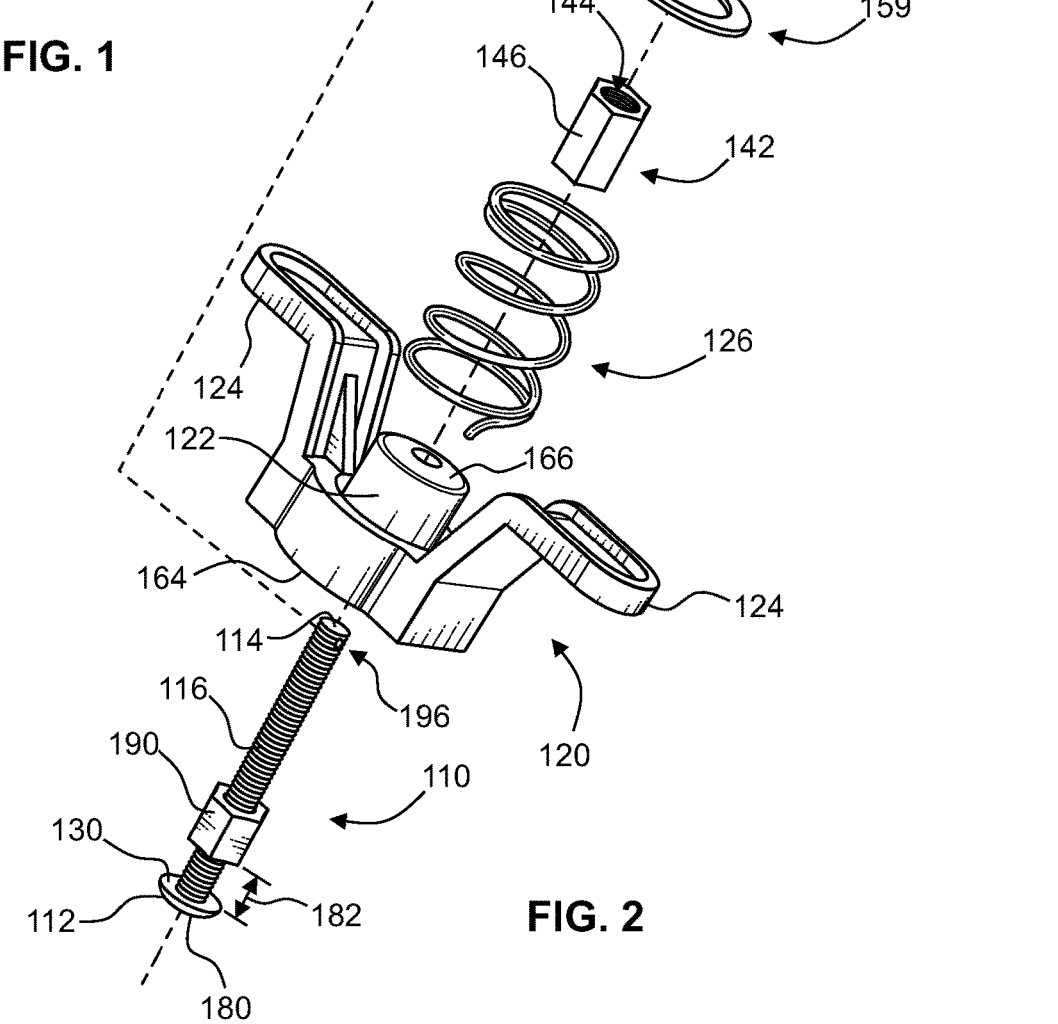
FIG. 2 is a diagrammatic exploded view of the marking apparatus of FIG. 1.

Referring to FIG. 2, the post element 110 may include a head portion 112, a marking end 114 and a shaft portion 116 typically extending therebetween along a main axis 118. The shaft portion 116 may be at least partially threaded. The head portion 112 may have an outer face 180 opposite of the marking end 114, and an inner face 130 disposed oppositely of the outer face 180 between the outer face 180 and the marking end 114.

The rotational detent member 190 may be affixed to the shaft portion 116, preferably in a manner which prevents their rotational and translation movement with respect to one another. Moreover, the rotational detent member 190 preferably projects radially outwardly of the shaft portion. Referring to FIGS. 2, 25, 77 and 103, the rotational detent member 190 is preferably axially offset from the inner face 130 so as to define a clearance distance 182 along the main axis 118 between the rotational detent member 190 and the inner face 130.

Figure 23:
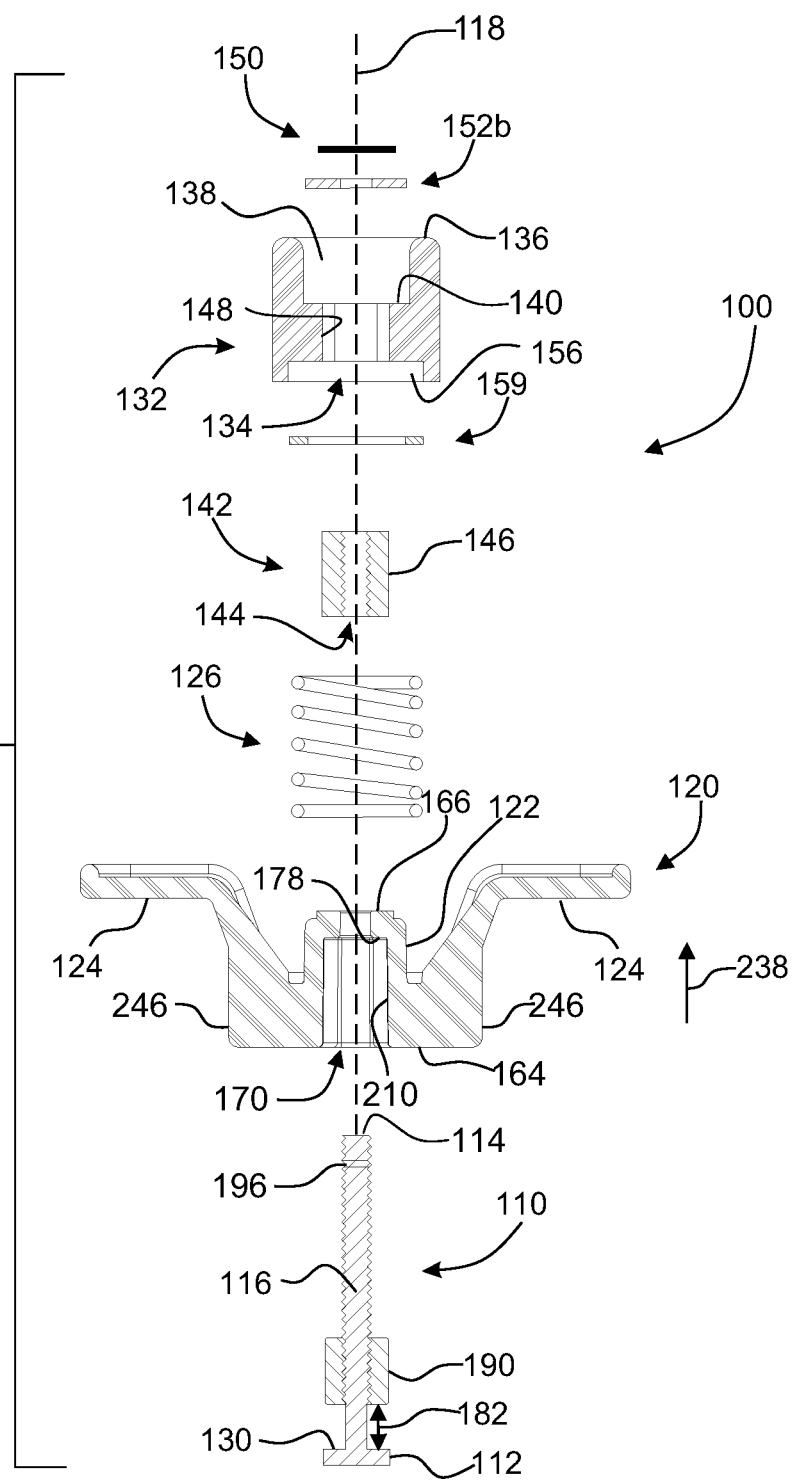
FIG. 23 is a diagrammatic exploded view of one alternative example marking apparatus in accordance with the present disclosure.
Figure 72:
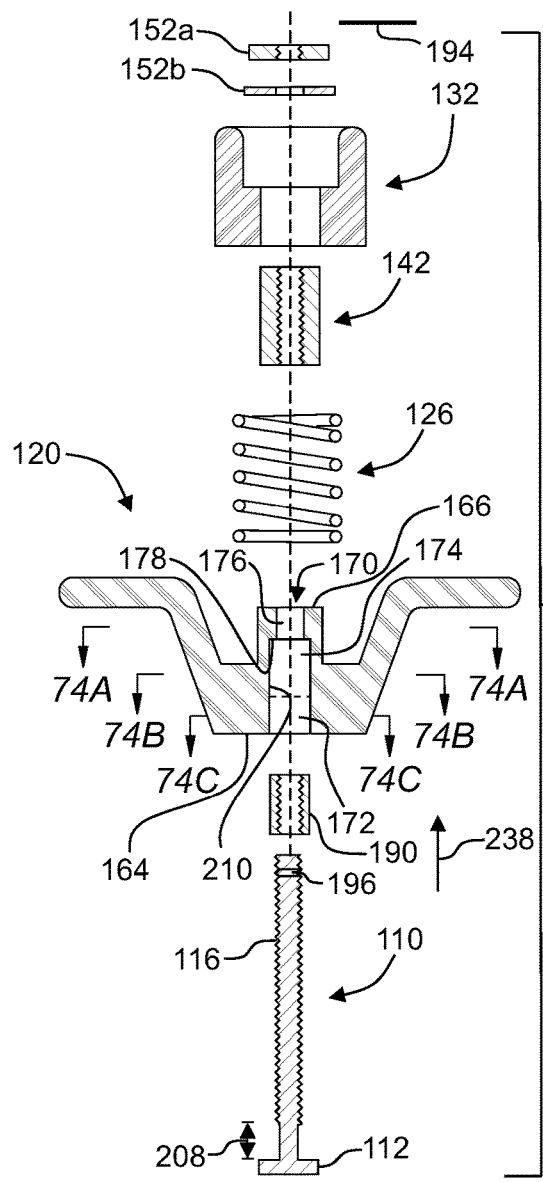
FIG. 72 is a diagrammatic disassembled view of another example apparatus in which the rotational detent member is multilaterally disposed about the shaft of the post element, is axially and rotational affixed thereto, and is configured to axially-slidably but non-rotatably engage a rotational detent face in the alignment bore of the object retention element.

Referring to FIGS. 23 and 72, the object retention element 120 may include a retention face 164, an opposing face 166, and an alignment bore 170 disposed therebetween along the main axis 118. The alignment bore 170 is configured to be in receipt of the shaft portion 116 and includes a rotational detent section 210. The rotational detent section 210 is preferably configured to axially-slidably and non-rotatably receive the rotational detent member 190. The alignment bore 170 may include an axial detent portion 178 configured to limit axial movement of the head portion 112 in a retraction direction 238 from the retention face 164 toward the opposing face 166.

Referring to FIGS. 24-28 and 76-80, the object retention element 120 is preferably movable with respect to the post element 110 along the main axis 118 between a closed position, an open position, and a gripping position therebetween. Movement of the object retention element 120 from the closed position to the open position results in the presentation of a lip groove 128 for receiving a mounting lip 105 of an object 102. The lip groove 128 may be at least partially defined by a gap distance 184 between the head portion 112 and the retention face 164. Movement of the object retention element 120 from the open position to the gripping position may be configured to result in a reduction of the gap distance 184 for securement of the mounting lip 105 within the lip groove 128 with a gripping force 186.

Figure 31:
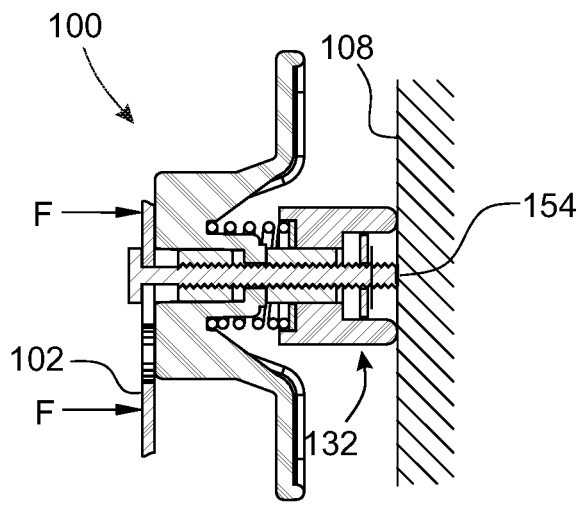
FIG. 31 is a diagrammatic cross-sectional view of the marking apparatus of FIG. 24, but shown in a further configuration in which the cover element is forced into its retracted position by pushing the object toward the mounting surface, thereby causing the marking tip to place a respective patch of marking substance on the mounting surface.

Referring to FIG. 23, the tightening element 142 may have a main bore 144 which may be threaded, and a first torque detent 146 non-rotatably engageable with a second torque detent 148 of the cover element 132. The tightening element 142 may be threadedly transportable along the shaft portion 116 between a release position (see, for example, FIG. 24) and a lock position (see, for example, FIG. 28). The tightening element 142 may thereby be configured to (i) when in the release position, allow movement of the object retention element 120 between the closed position and the open position, (ii) when in the lock position, prevent movement of the object retention element 120 from the gripping position toward the open position, and (iii) enable adjustability of the gripping force 186. The adjustability of the gripping force 186 preferably enables the gripping force to be increased sufficiently so as to rigidly affix the marking apparatus to the object 102. With reference to FIG. 31, such rigidity helps ensure that the respective marking 154 is placed at the proper location on the mounting surface 108.

The cover element 132 may have a tightening element aperture 134, a marking tip chamber 138 and a lock detent 140. The cover element 132 may be configured to engage the tightening element 142 so as to restrict relative rotational movement therebetween about the main axis 118 while enabling relative axial movement therebetween.

Referring to FIGS. 25 and 77, in particular preferred embodiments of the marking apparatus 100, the clearance distance 182 may be configured to prevent the rotational detent member 190 from protruding outward of the retention face 164 when the object retention element 120 is in the gripping position.

Referring to FIGS. 23 and 24, in certain preferred embodiments of the marking apparatus, the rotational detent member 190 and the rotational detent section 210 may be configured to be placed in mutual non-rotatable engagement at multiple rotational orientations about the main axis 118 with respect to one another.

In particular preferred embodiments of a marking apparatus 100 in which the alignment bore 170 includes an axial detent portion 178 configured to limit axial movement of the head portion 112 in a retraction direction 238 from the retention face 164 toward the opposing face 166, the limitation of axial movement may be by way of engagement between the axial detent portion 178 and the rotational detent member 190. Referring to FIG. 23 for example, the axial detent portion 178 may be a retention flange lip within the alignment bore 170.

In other preferred embodiments of a marking apparatus 100 in which the alignment bore 170 includes an axial detent portion 178, the limitation of axial movement may be by way of engagement between the axial detent portion 178 and an axial detent member 242 affixed to the shaft portion 116 between the head portion 112 and the marking end 114. In such case, the axial detent member 242 may be, for example, a retaining ring. Further, the axial detent member 242 may preferably be disposed between the rotational detent member 190 and the head portion 112. Referring to FIGS. 61-63, in particular embodiments of a marking apparatus 100, the rotation detent member 190 and the axial detent member 242 may be a unitary component.

Figure 59:
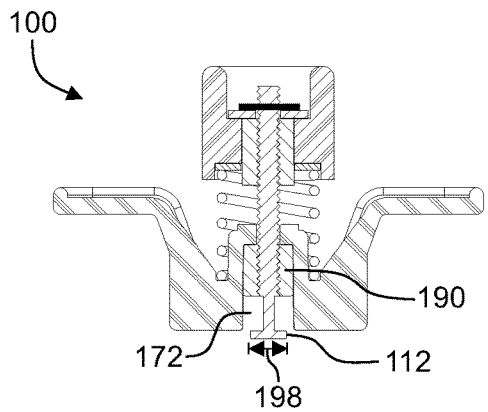
FIG. 59 is a diagrammatic cross-sectional view of a further alternate example of a marking apparatus wherein the diameter of the first segment of the alignment bore is greater than the head diameter of the post element, and the segment of the shaft portion within the clearance zone is narrower than the remainder of the shaft portion.
Figure 60:
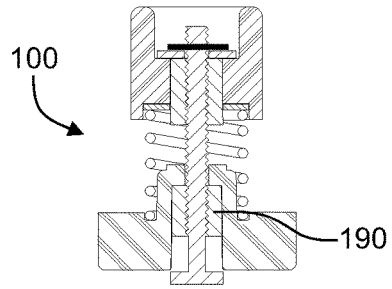
FIG. 60 is a diagrammatic cross-sectional view of a further alternate example of a marking apparatus wherein the object retention element does not include grip portions extending radially of the main axis.

Referring to FIGS. 57, 58, 61-63 and 101B and 102B, in certain embodiments of the marking apparatus 100, the alignment bore 170 may include a first segment 172 extending from the retention face 164. The first segment 172 may be devoid of the rotational detent section 210 so as not to restrict axial and rotational movement between the rotational detent member 190 and the object retention element 120. Additionally or in the alternative, the head portion 112 may have a head diameter 198, and the first segment 172 may have a first diameter 244 equal to or greater than the head diameter 198 (see, e.g., FIGS. 57-59).

Referring to FIGS. 24, 25 and 77, in particular preferred embodiments of the marking apparatus 100, the clearance distance 182 may be configured to prevent the rotational detent member 190 from protruding outward of the retention face 164 when the object retention element 120 is in the open position.

Figure 21:
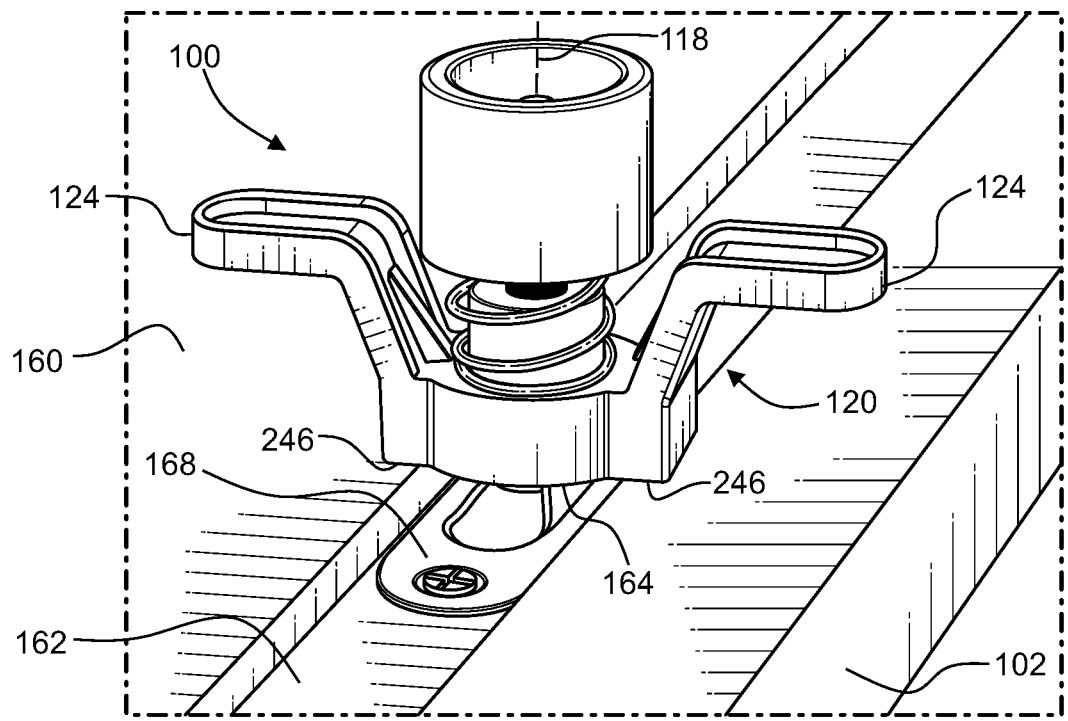
FIG. 21 is a diagrammatic perspective view similar to that of FIG. 20, but wherein the example marking apparatus is shown affixed to the object by way of the keyhole hardware element, the keyhole hardware element being disposed within a recess inward of the local planar surface of the object, and the retention face of the object retention element extending laterally to engage the local planar surface of the object and thereby maintain the marking apparatus in rigid orthogonal alignment with respect to the object.
Figure 22A:
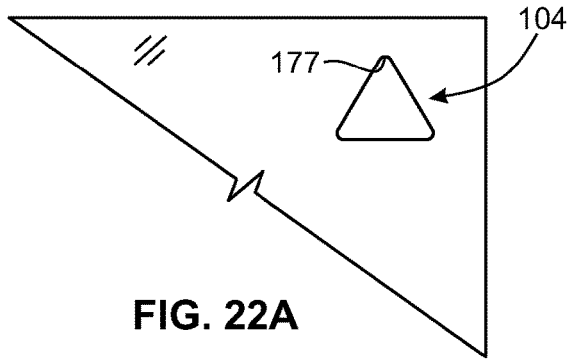
FIG. 22A is a diagrammatic partial plan view of an object with one alternate example shape of a slide mount slot with respective slot closed end.
Figure 22B:
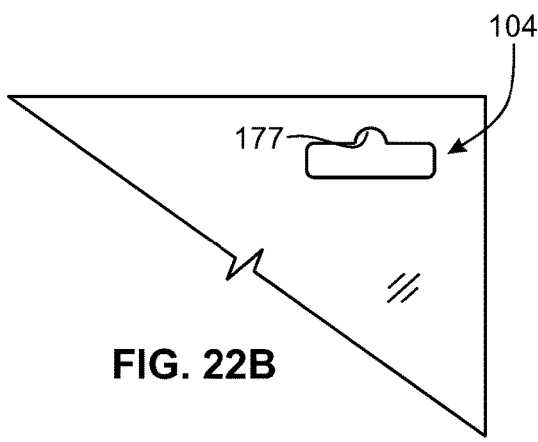
FIG. 22B is a diagrammatic partial plan view of an object with another alternate example shape of a slide mount slot with respective slot closed end.
Figure 22C:
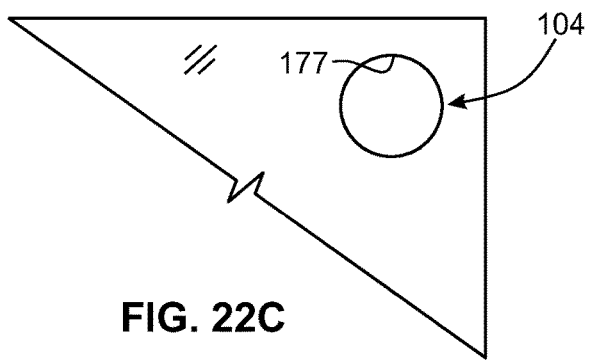
FIG. 22C is a diagrammatic partial plan view of an object with another alternate example shape of a slide mount slot with respective slot closed end.
Figure 22D:
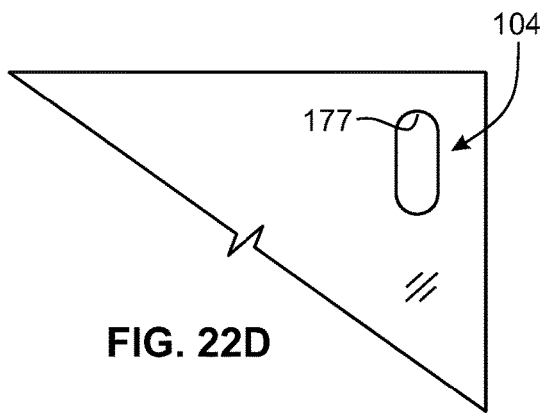
FIG. 22D is a diagrammatic partial plan view of an object with another alternate example shape of a slide mount slot with respective slot closed end.

Referring to FIG. 21, the object retention element 120 may preferably include one or more finger grip portions 124 extending radially of the main axis 118. In certain such embodiments, each of the finger grip portions 124 may have a base transition portion 246 axially terminating in-plane with the retention face 164. This helps the marking apparatus to remain rigidly orthogonal with respect to the local plane surface 160 in cases where the keyhole hardware element 168 is fully disposed within a recess 162 inwardly offset from the local planar surface 160.

Figure 30:
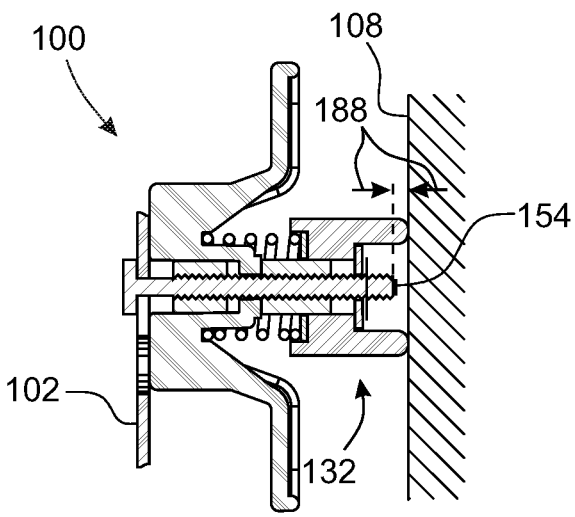
FIG. 30 is a diagrammatic cross-sectional view of the marking apparatus of FIG. 24, but shown in a configuration in which the cover element is in its extended position and is positioned against the mounting surface prior to marking.

In particular embodiments of a marking apparatus 100, the cover element 132 may include a surface engagement portion 136 and may be movable with respect to the post element 110 along the main axis 118 between an extended position (see, for example, FIG. 30) and a marking position (see, for example, FIG. 31). Moreover, the cover element 132 may be elastically biased toward the extended position. In such embodiments, the surface engagement portion 136 may (i) extends axially beyond the marking end 114 when the cover element 132 is in the extended position, and (ii) be axially aligned with or inward of the marking end 114 when the cover element 132 is in the marking position. Furthermore, referring to FIG. 24, the object retention element 120 may be resiliently biased toward the closed position. In such case, the resilient bias and elastic bias may be provided by way of, for example, a spring element 126. The object retention element 120 may include an alignment boss 122 through which the alignment bore 170 extends and about which the spring element 126 is disposed.

In certain preferred embodiments of a marking apparatus 100, the resilient bias of the object retention element 120 and the elastic bias of the cover element 132 may both be provided by the same spring element 126. Additionally, or in the alternative, with reference to FIGS. 82-87 for example, the resilient bias and elastic bias may be provided by way of the object retention element 120. In such case, the object retention element 120 may be comprised of a spring steel or resilient polymer, and may have a closed-profile cross-section.

Referring to FIGS. 23 and 24, in preferred embodiments of a marking apparatus 100, the post element 110 may include a cover retention element 150 removably attached to the shaft portion 116. In such case, when the cover retention element 150 is attached to the shaft portion 116, the cover retention element 150 is preferably configured to (i) axially retain the cover element 132 on the post element 110, (ii) limit the axial distance 188 between the surface engagement portion 136 and the marking end 114 when the cover element 132 is in the extended position, and (iii) prevent the post element 110 from being removed from the object retention element 120. See, for example, FIG. 28. Referring to FIG. 24, the cover element 132 may include a marking tip chamber 138, and at least a majority of the cover retention element 150 may be configured to reside within the marking tip chamber 138 when the cover element 132 is in the extended position.

With reference to FIG. 72, in certain embodiments of a marking apparatus 100 the cover retention detent 150 may include, for example one or more lock nuts 152a and one or more washers 152b. In particular such embodiments, the cover retention detent 150 may be permanently affixed to the post element 110 and may be non-removable therefrom.

Referring to FIG. 24, removal of the cover retention element 150 from the shaft portion 116 may be laterally obstructed when the majority of the cover retention element 150 resides within the marking tip chamber 138. The lateral obstruction may be sufficient to prevent removal of the cover retention element (e.g., a locking pin) from the pin aperture. However, referring to FIGS. 107A and 107B, the cover element 132 may be movable with respect to the post element 110 along the main axis 118 to a retention-access position, whereat the cover retention element 150 is removable from the shaft portion. The post element 110 may then be removable from the object retention element 120 when the cover retention element 150 and tightening element 142 are removed from the shaft portion 116. In such embodiments, the cover retention element 150 may comprise a locking pin 194 (see, e.g., FIG. 2) configured to extend radially through a pin aperture 196 in the shaft portion 116.

In particular embodiments of a marking apparatus 100, the cover retention element 150 may be a conventional external retaining ring configured to laterally snapingly engage the shaft portion 116 (e.g., within a snap ring groove). In the alternative, referring to FIGS. 61-63 and 69, the cover retention element 150 may be configured to threadedly engage the shaft portion 116, and thereby form the marking end 114 of the post element 110. In such case, the cover retention element 150 may be formed of or include a polymer to help prevent the cover retention element 150 from threadedly rotating on the shaft portion 116 responsive to rotation of the adjacent cover element 132.

Referring to FIGS. 10-12, 14-19 and 42-47, certain preferred embodiments of a marking apparatus 100 further comprise an orthogonality adapter (shown, for example, at 212A and 212B) for rigidly maintaining the main axis 118 in an orthogonal orientation with respect to a local surface 160 of an object 102 having a keyhole hardware element 168 protrudingly affixed to the local surface 160 of the object 102. The orthogonality adapter may preferably include (a) a primary axis 214 and a relief axis 216 defined orthogonally to one another and collectively defining a transverse plane 218 in which they reside; (b) a post deployment aperture 220 extending along the primary axis 214; (c) a relief channel 222 extending along the relief axis 216 and intersecting the post deployment aperture 220; (d) a retainer engagement portion 224 configured to be in removable engagement with the object retention element 120; (e) an object engagement plane 226 defined orthogonally to the primary axis 214; and (f) two shim portions 228 disposed on opposing sides of the transverse plane 218 and terminating at the object engagement plane 226.

Figure 51:
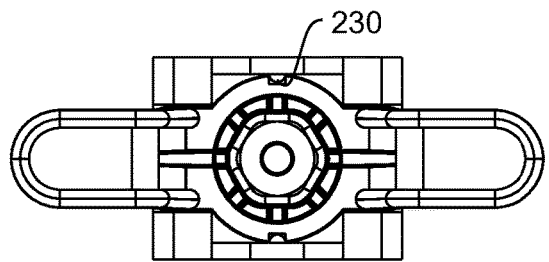
FIG. 51 is a diagrammatic top view of the mutually-engaged orthogonality adapter and retention element shown in FIG. 49.
Figure 49:
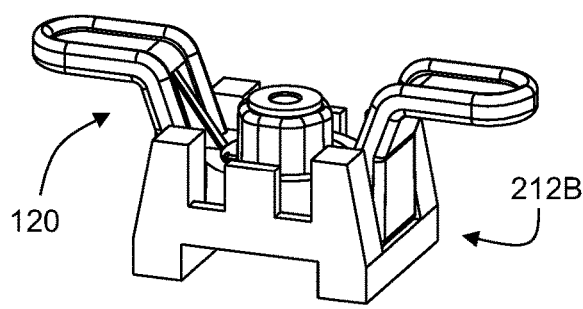
FIG. 49 is a diagrammatic perspective view of the example orthogonality adapter and retention element shown in FIG. 48, but wherein the orthogonality adapter is shown in removable engagement with object retention element.
Figure 52:
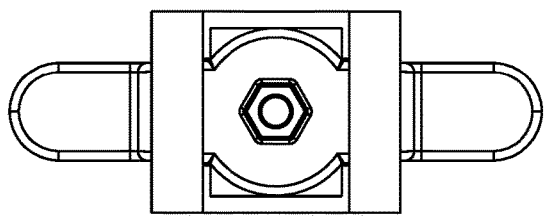
FIG. 52 is a diagrammatic bottom view of the mutually-engaged orthogonality adapter and retention element shown in FIG. 49.
Figure 50:
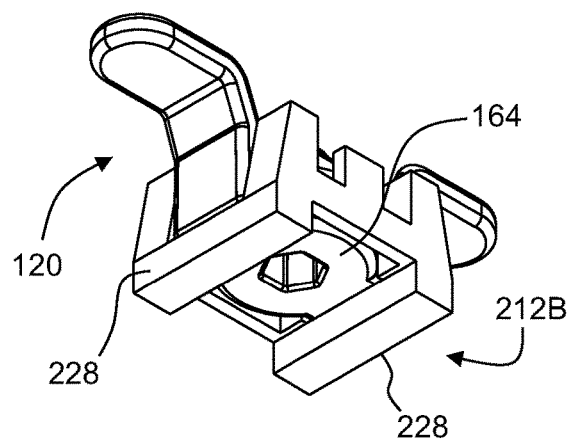
FIG. 50 is a further diagrammatic perspective view of the mutually-engaged orthogonality adapter and retention element shown in FIG. 49.
Figure 53:
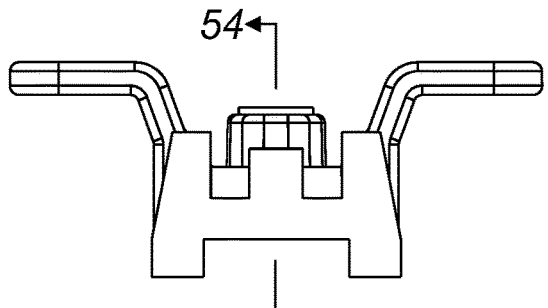
FIG. 53 is a diagrammatic front view of the mutually-engaged orthogonality adapter and retention element shown in FIG. 49.
Figure 54:
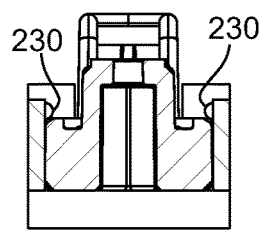
FIG. 54 is a diagrammatic cross-sectional view taken across lines 54-54 of FIG. 28.

Referring to FIGS. 14, 15 and 42-54, in particular preferred embodiments of an apparatus 100 with orthogonality adapter 212B, the removable engagement is by way of at least partial receipt of the object retention element 120 by the retainer engagement portion 224. For example, the orthogonality adapter 212B and the object retention element 120 may include complementary securement features for manually-reversibly maintaining the removable engagement (e.g., urging the orthogonality adapter to remain in engagement with the object retention element 120). Referring to FIGS. 48-54, the complementary securement features may include one or more cantilever snaps 230. For example, as shown in FIGS. 51 and 54, a pair of cantilever snaps 230 may be disposed on opposing sides of the orthogonality adapter 212B, and may be configured to snapingly engage corresponding snap-receiving portions of the object retention element 120. Additional or in the alternative, the complementary securement features may include a mutually-frictionally engageable surfaces between the orthogonality adapter 212B and the object retention element 120.

Referring to FIGS. 10-12, 18, 19 and 42-47, in particular embodiments of an orthogonality adapter, the relief channel 222 may include a relief mouth 232 opening along the relief axis 216 oppositely of the post deployment aperture 220. Moreover, the orthogonality adapter may include a cross member 234 connecting the shim portions 228 to one another. With particular reference to FIGS. 18, 19 and 42-27, in certain embodiments of an orthogonality adapter 212B, the relief channel 222 may include first and second relief mouths 232 which open along the relief axis 216 on opposing sides of the post deployment aperture 220. In preferred orthogonality adapters, (a) the shim portions 228 may have a thickness 236 in a direction along the primary axis 214; (b) a head extension distance (e.g., distance 184 in FIG. 25) may be defined between the retention face 164 and the inner face 130 when the object retention element 120 is in the open position; and (c) the thickness 236 is configured to be equal to or less than the head extension distance.

Figure 20:
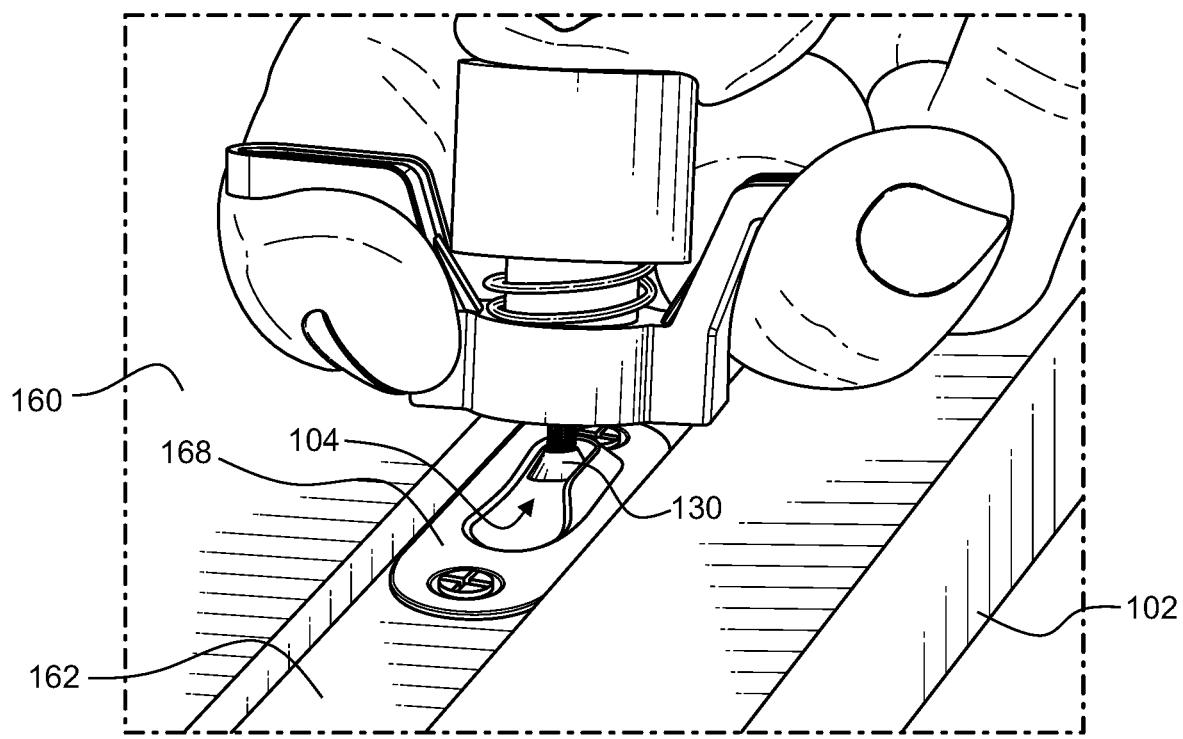
FIG. 20 is a diagrammatic perspective view showing an example marking apparatus being affixed to an object by way of a prior art keyhole hardware element, wherein the keyhole hardware element is disposed within a recess inward of the local planar surface of the object, and the retention face of the object retention element extends laterally to engage of the local planar surface of the object and thereby maintain the marking apparatus in rigid orthogonal alignment with respect to the object.
Figure 55:
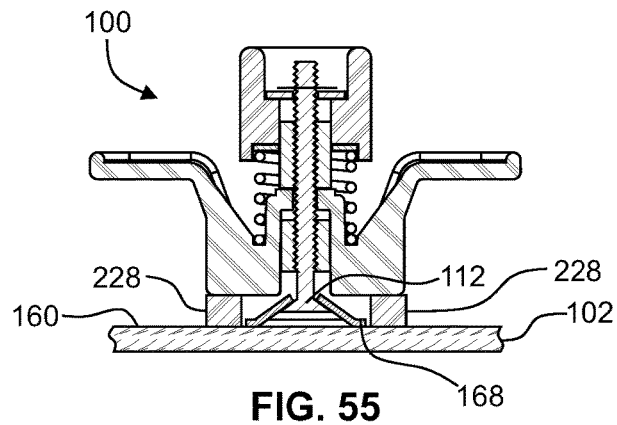
FIG. 55 is a diagrammatic cross-sectional view the configurations shown in FIGS. 10, 11, 18 and 19.
Figure 56:
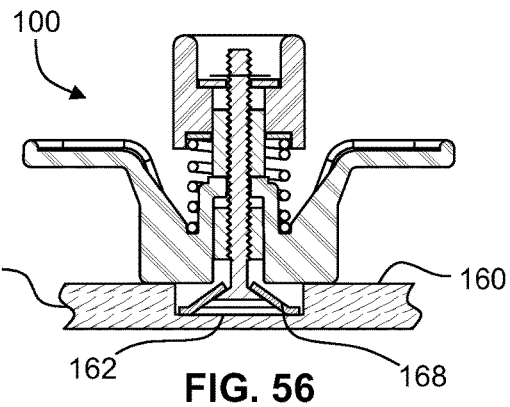
FIG. 56 is a diagrammatic cross-sectional view of the configurations shown in FIG. 21.
Figure 57:
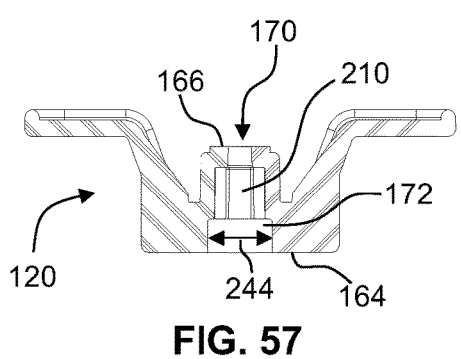
FIG. 57 is a diagrammatic cross-sectional view of a further alternate example of an object retention element in accordance with the present disclosure, wherein the first segment of the alignment bore does not comprise the rotation detent section and has a greater diameter than the second and third segments of the alignment bore.
Figure 58:
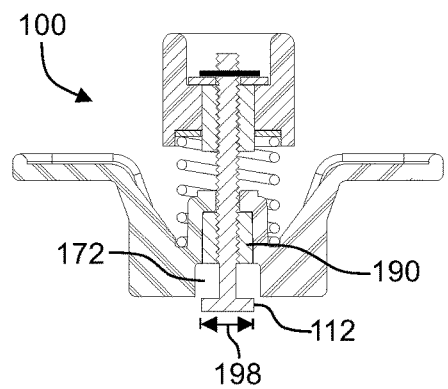
FIG. 58 is a diagrammatic cross-sectional view of an alternate example of a marking apparatus which incorporates the object retention element shown in FIG. 57.

Referring to FIGS. 20, 55 and 64, in particular embodiments of a marking apparatus 100, the inner face 130 is tapered at a taper angle 250 with respect to the shaft portion 116. For example, the taper angle 250 may preferably be between 30 and 60 degrees.

Referring to FIGS. 64-68, particular embodiments of a marking apparatus 100 may further comprise a shaft size adapter 252, wherein (a) the axial offset defines a clearance zone 254 between the inner face 130 and rotational detent member 190; (b) the shaft size adapter 252 may be configured to be in receiving engagement with the shaft portion 116 within the clearance zone 254 and thereat extend radially outwardly of the shaft portion 116; and (c) the alignment bore 170 includes a first segment 172 extending from the retention face 164, the shaft size adapter 252 being configured to be received by the first segment 172. Depending upon the particular embodiment, the shaft size adapter 252 may be permanently affixed to the shaft portion 116, or may be configured to be in removable receiving engagement with the shaft portion 116. For example, the shaft size adapter 252 may be comprised of a polymer and the removably receiving engagement may be by way of, for example, snap joining. Referring to FIG. 66, a marking apparatus 100 or a kit comprising one or more marking apparatuses 100 may comprise a plurality of shaft size adapters. In such case, the plurality of shaft size adapters (e.g., 252a and 252b) may have respective shaft adapter diameters (e.g., 256a and 256b) which are distinct from one another.

Figure 88:
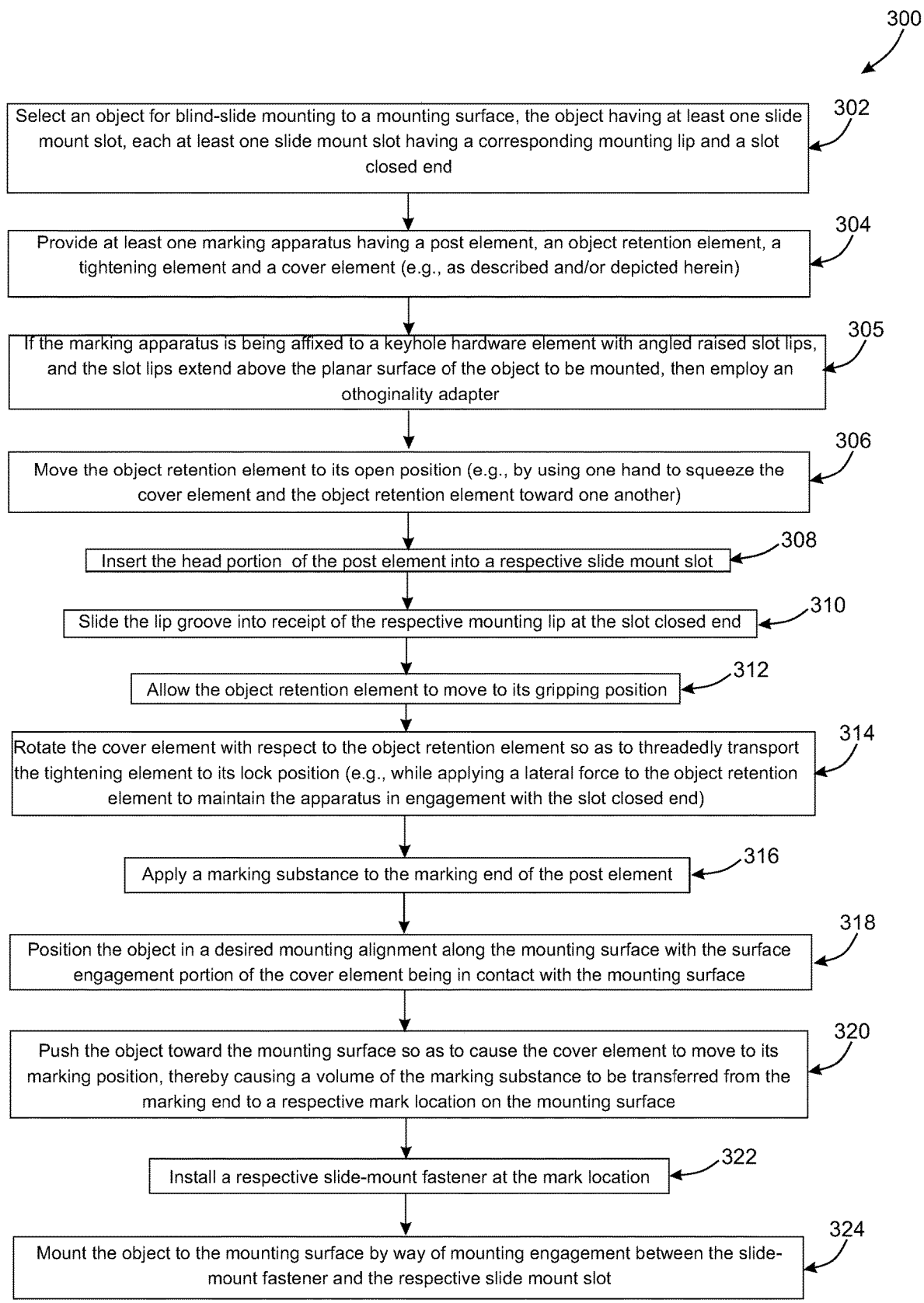
FIG. 88 is a diagrammatic flow diagram illustrating one example embodiment of a method of blind slide-mounting an object to a mounting surface in a desired alignment using the object as an alignment template.
Figure 89:
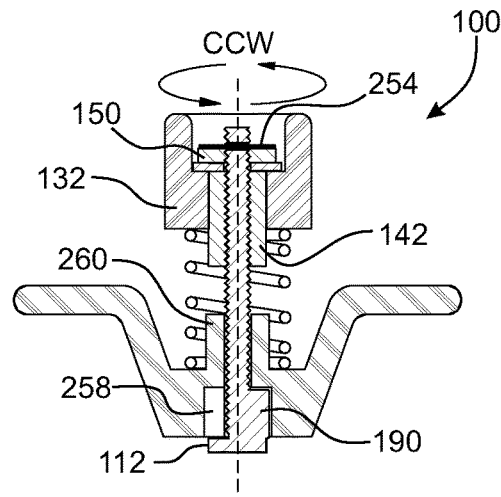
FIG. 89 is a diagrammatic cross-sectional view of a further example marking apparatus, the cover element shown being rotated counter-clockwise to cause the tightening element to move away from the inset collar.
Figure 90:
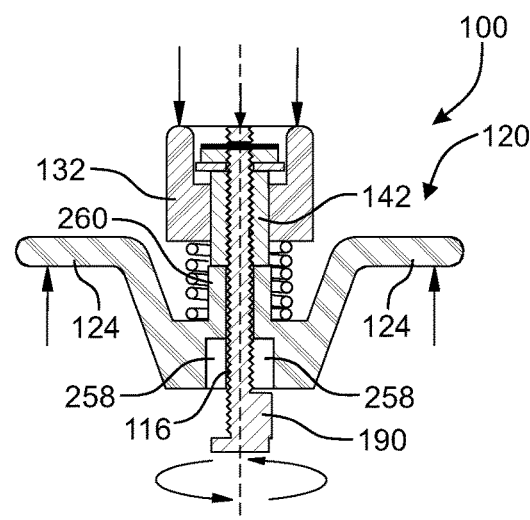
FIG. 90 is a diagrammatic cross-sectional view similar to that of FIG. 89, but in which the post element is extended outward of the object retention element sufficiently to disengage the rotation detent member from all of the rotational detent grooves, thereby allowing the finger grip portions of the object retention element to be selectively rotationally reoriented with respect to the rotational detent member (e.g., the feature protruding laterally of the shaft portion of the post element)
Figure 91A:
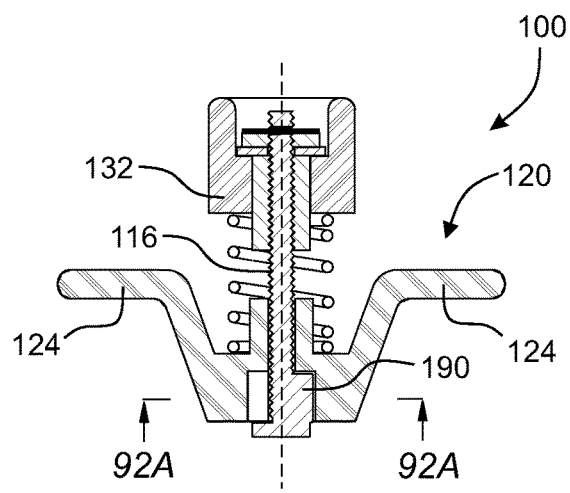
FIG. 91A is a diagrammatic cross-sectional view similar to that of FIG. 90, but in which the object retention element is shown having moved back into its closed position, the rotational detent member being in a first selected rotational orientation with respect to the object retention element and engaging a corresponding rotational detent groove.
Figure 91B:
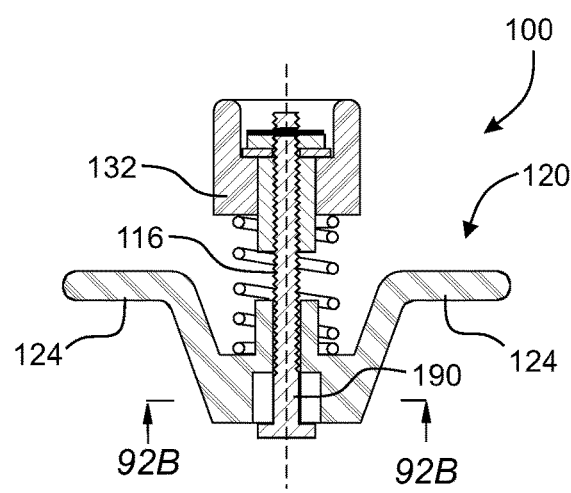
FIG. 91B is a diagrammatic cross-sectional view similar to that of FIG. 91A with the object retention element shown having moved back into its closed position, but wherein the rotational detent member is in a second selected rotational orientation with respect to the object retention element and is engaging a different corresponding rotational detent groove.
Figure 92A:
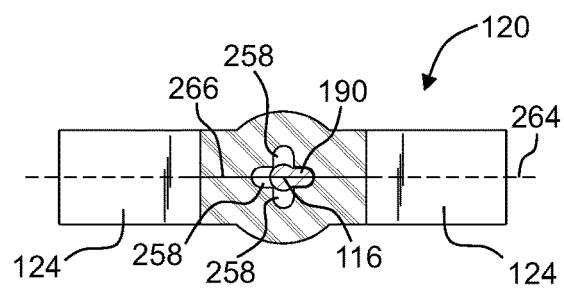
FIG. 92A is a diagrammatic cross-sectional view taken across lines 92A-92A of FIG. 91A, showing the finger grip axis oriented parallel to the rotational detent axis.
Figure 92B:
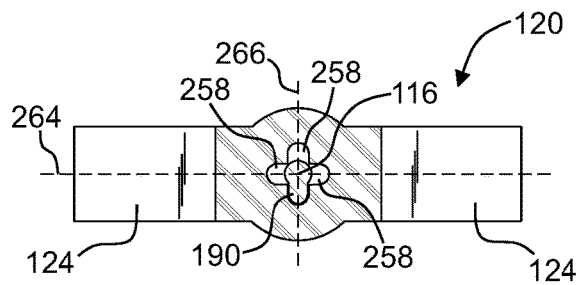
FIG. 92B is a diagrammatic cross-sectional view taken across lines 92B-92B of FIG. 91B, showing the finger grip axis oriented perpendicularly to the rotational detent axis.

A method of blind slide-mounting an object 102 to a mounting 108 in a desired alignment using the object 102 as an alignment template comprises a series of steps. One example of such a method 300 is illustrated in FIG. 88. Notably, the steps of the methods illustrated and described herein may not need to be performed in any particular order.

Figure 6:
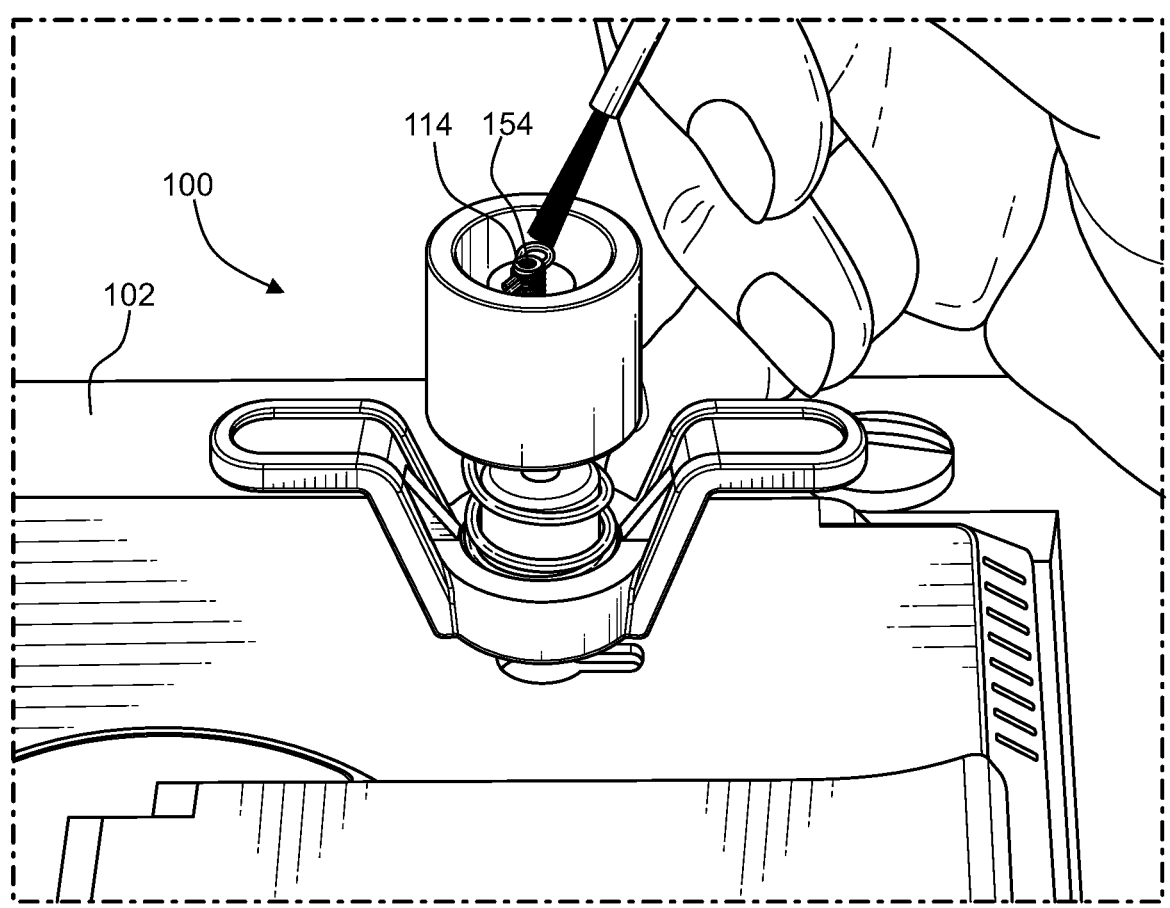
FIG. 6 is a diagrammatic perspective view of an object of an example marking apparatus affixed to an object similar to that of FIG. 5, wherein a marking substance is shown being applied to the marking end of the post element.
Figure 7:
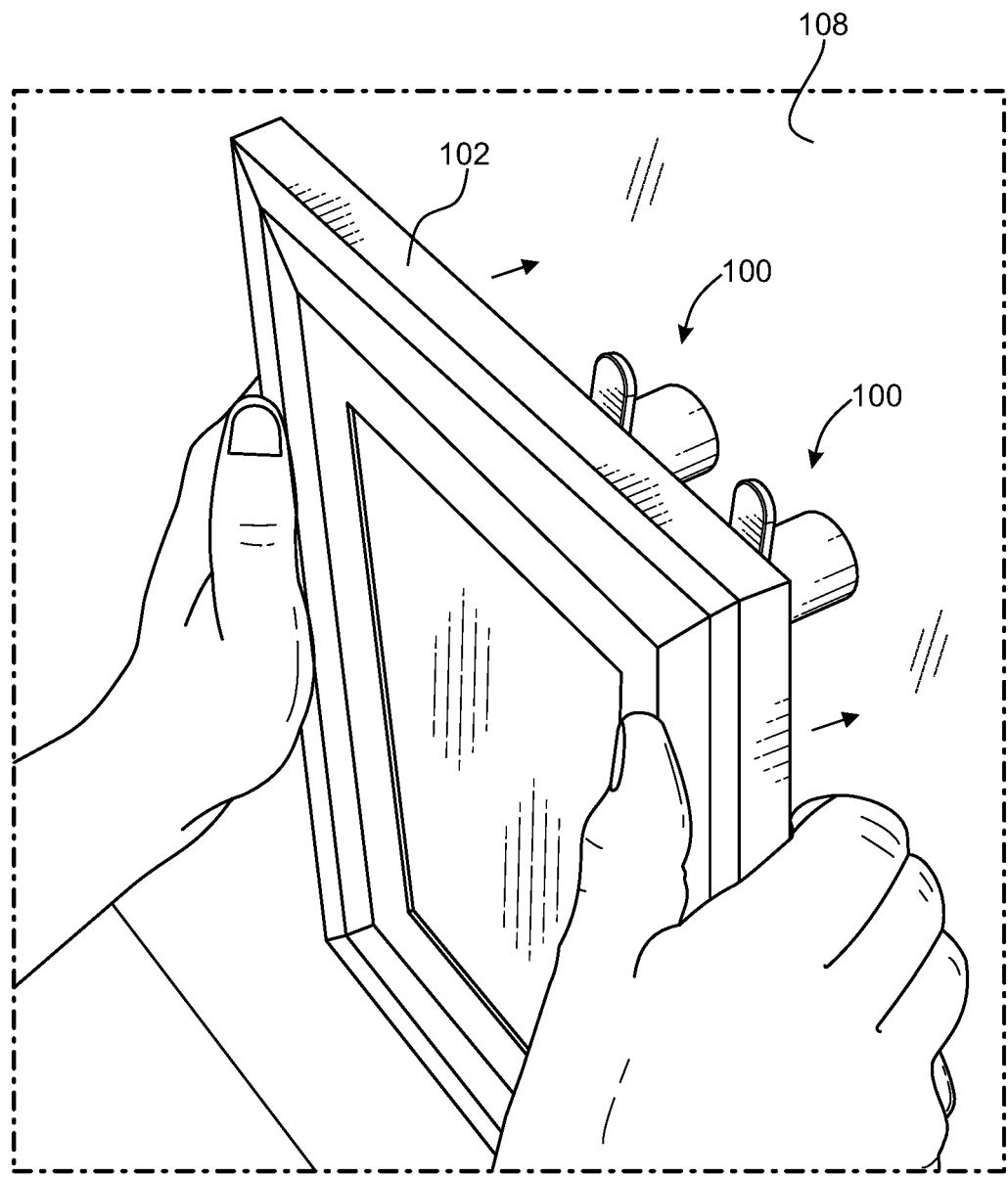
FIG. 7 is a diagrammatic perspective view showing the object being pushed toward the mounting surface so as to cause the cover element of each marking apparatus to move to its marking position, thereby causing a volume of the marking substance to be transferred from the marking end to a respective mark location on the mounting surface.
Figure 8:
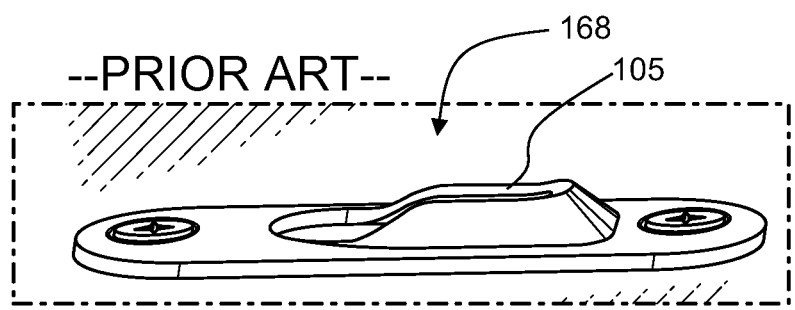
FIG. 8 is a diagrammatic perspective view of a prior art keyhole hardware element affixed to an object to be mounted to a mounting surface.
Figure 9:
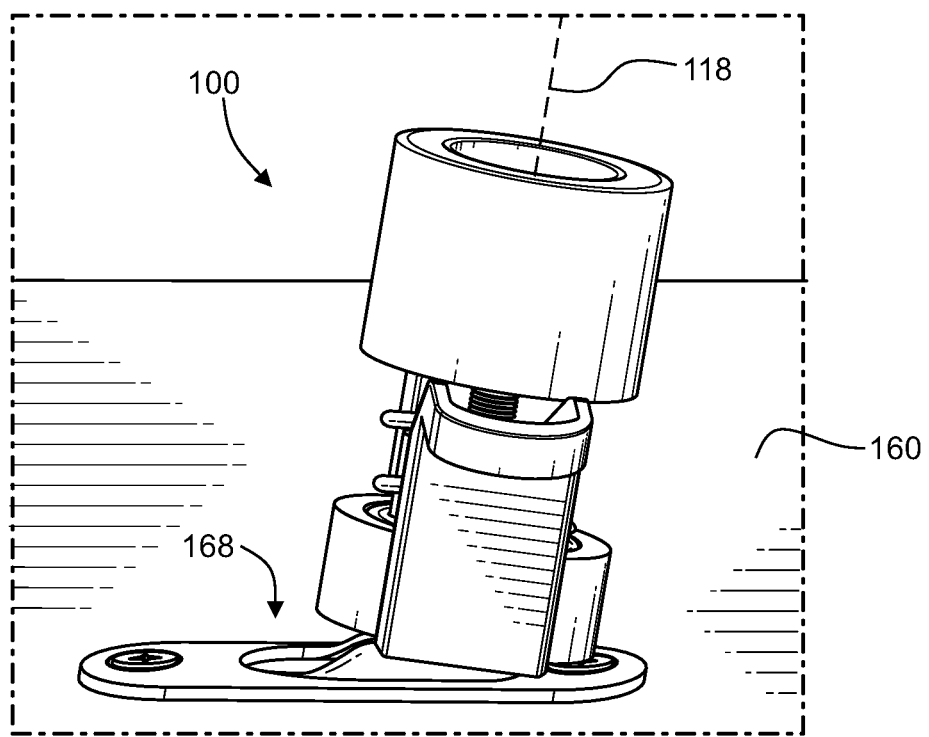
FIG. 9 is a diagrammatic perspective view of an example marking apparatus affixed to an object by way of the prior art keyhole hardware element of FIG. 8, illustrating the potential for a resulting lack of orthogonality between the marking apparatus main axis and the object when the slot lips of the keyhole hardware element protrude outward of the local planar surface of the object.
Figure 10:
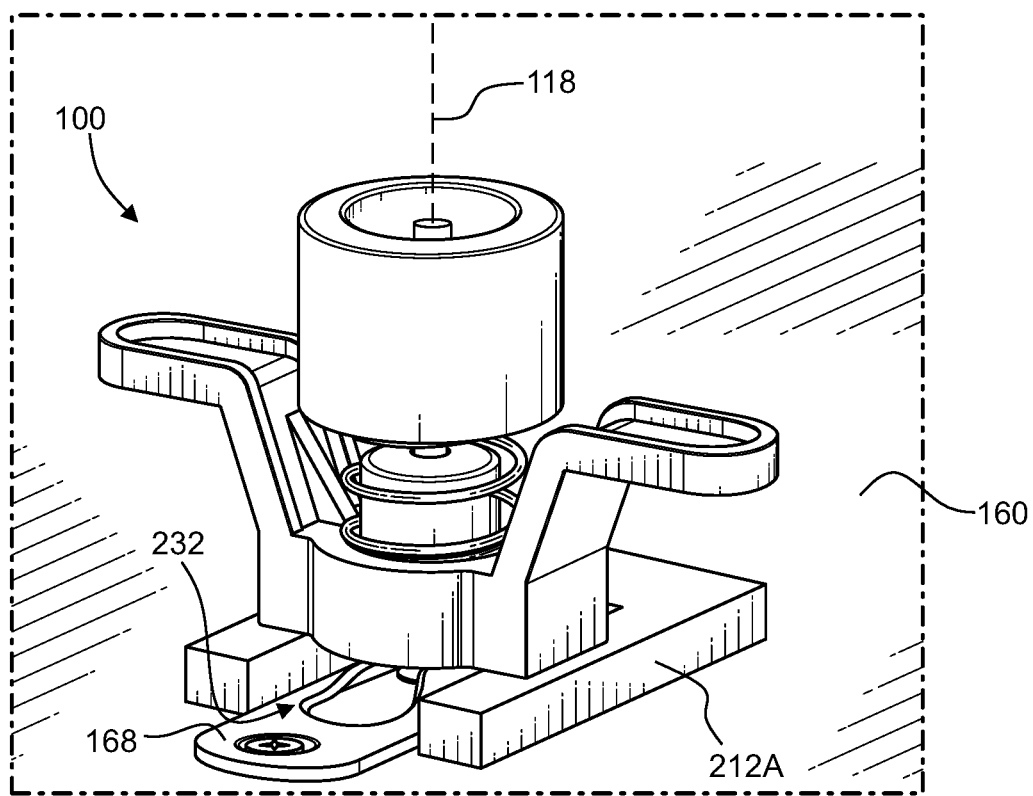
FIG. 10 is a diagrammatic perspective view similar to that of FIG. 9, but wherein implementation of an example orthogonality adapter in accordance with the present disclosure allows the marking apparatus to be affixed to the object such that the main axis of the apparatus remains rigidly orthogonal to the object.
Figure 11:
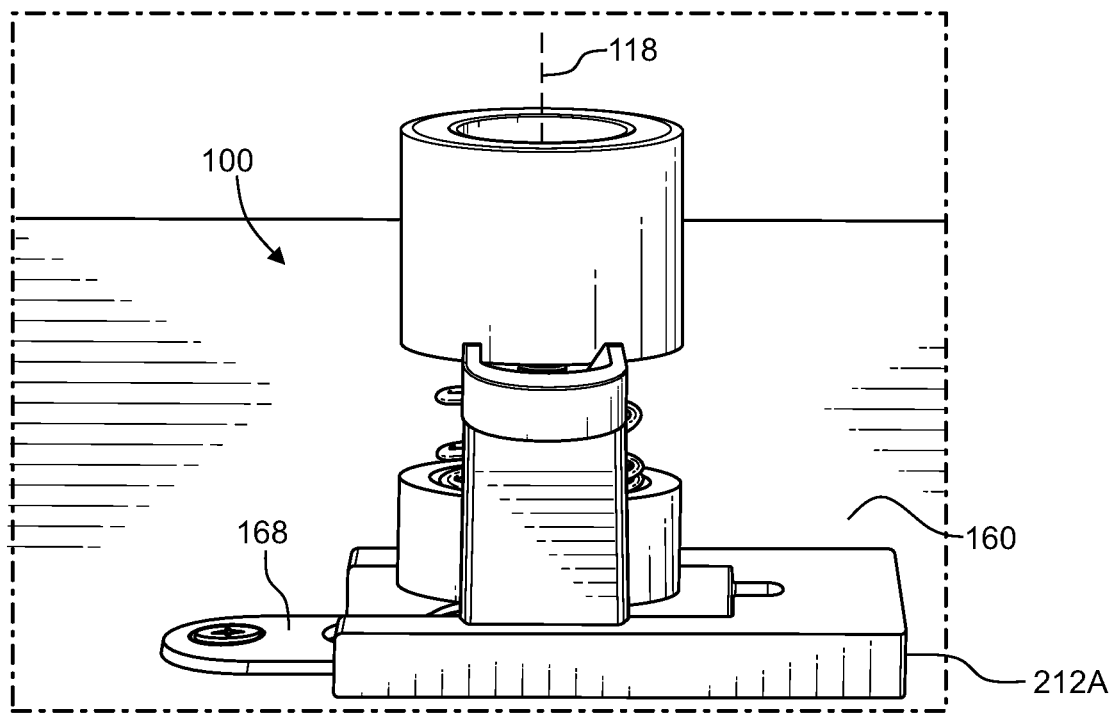
FIG. 11 is a further diagrammatic perspective view similar to that of FIG. 9, further illustrating the orthogonal alignment of the marking apparatus with respect to the object to be mounted.
Figure 12:
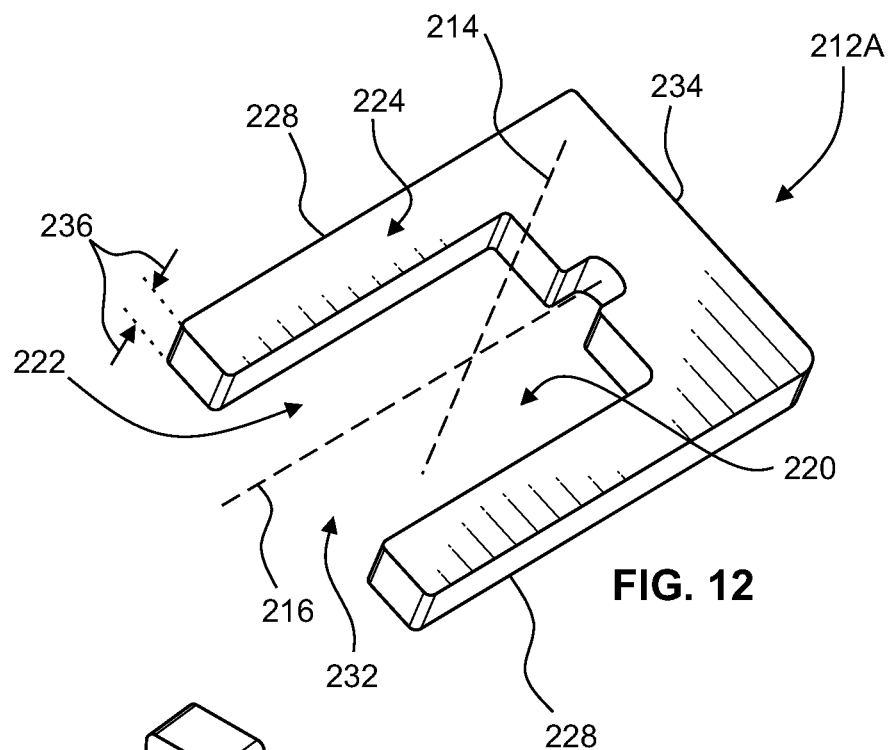
FIG. 12 is a diagrammatic perspective view of an example orthogonality adapter in accordance with the present disclosure.
Figure 13:
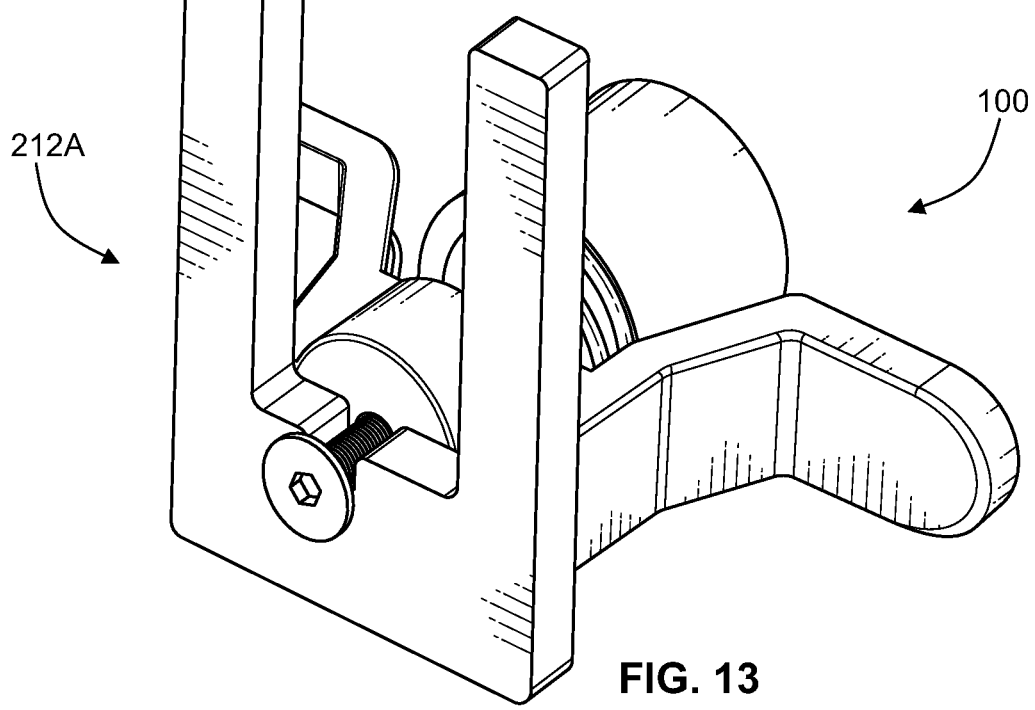
FIG. 13 is a diagrammatic perspective view of an example marking apparatus with an example orthogonality adapter in accordance with the present disclosure, wherein the orthogonality adapter is shown releasably secured in a storage position with respect to the object retention element.
Figure 14:
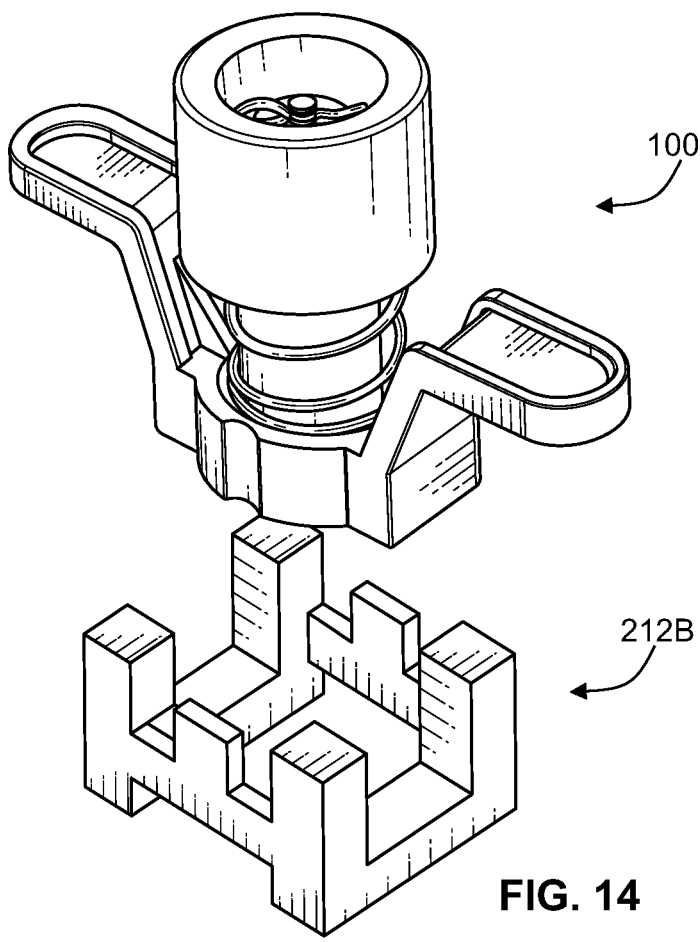
FIG. 14 is a diagrammatic perspective view of an example marking apparatus with an alternate example orthogonality adapter in accordance with the present disclosure, wherein the orthogonality adapter is shown disengaged from the object retention element.
Figure 15:
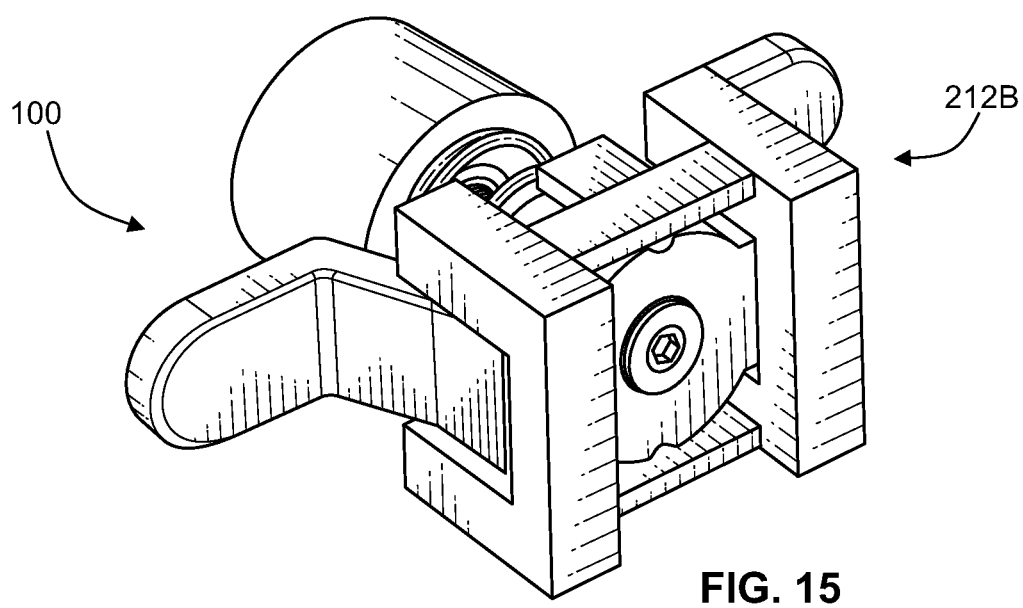
FIG. 15 is a diagrammatic perspective view of the example marking apparatus with the alternate example orthogonality adapter similar to that of FIG. 14, but wherein the orthogonality adapter is shown in removable engagement with the object retention element.
Figure 32:
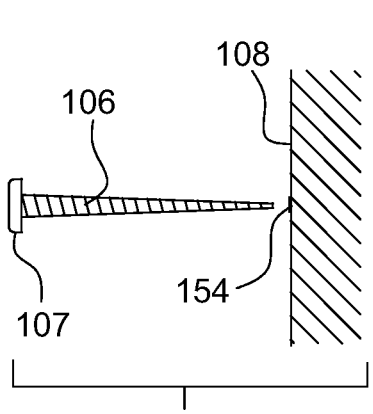
FIG. 32 is a diagrammatic partial cross-sectional view of a mounting surface with an apparatus-placed mark thereon, and a fastener being aligned with the marking for installation thereat.
Figure 33:
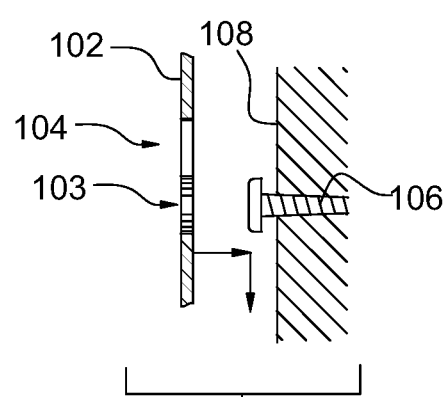
FIG. 33 is a diagrammatic partial cross-sectional view of a mounting surface with a fastener installed therein at the location of an apparatus-placed mark.
Figure 34:
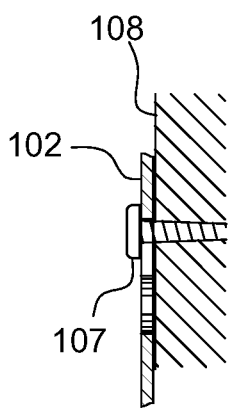
FIG. 34 is a diagrammatic partial cross-sectional view of an object mounted to a mounting surface by way of engagement between the object's keyhole feature and a fastener.
Figure 35:
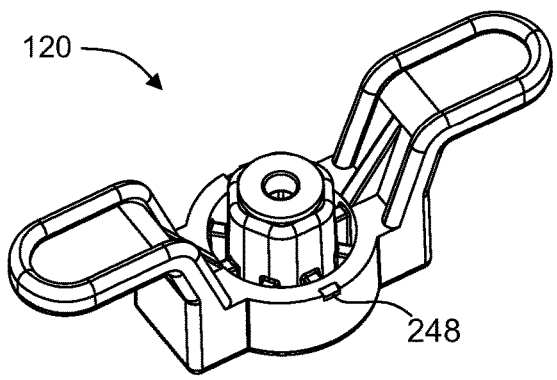
FIG. 35 is a diagrammatic perspective view of one example object retention element in accordance with the present disclosure.
Figure 36:
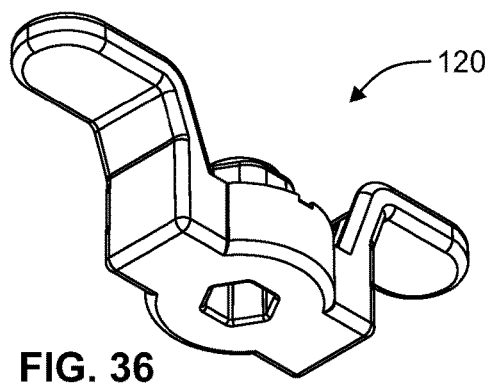
FIG. 36 is a further diagrammatic perspective view of the example object retention element shown in FIG. 35.
Figure 37:
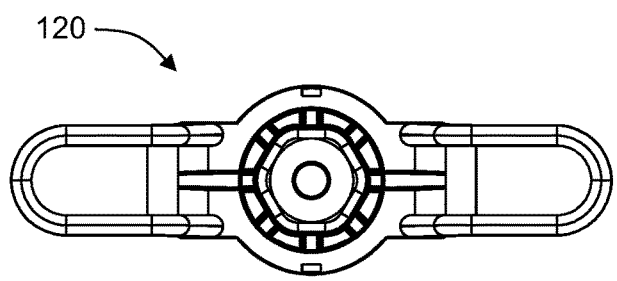
FIG. 37 is a diagrammatic top view of the example object retention element shown in FIG. 35.
Figure 40:
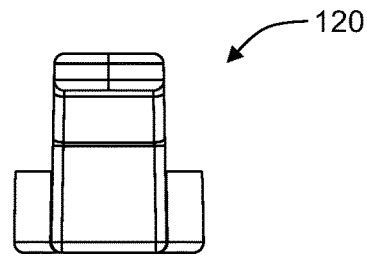
FIG. 40 is a diagrammatic side view of the example object retention element shown in FIG. 35.
Figure 38:
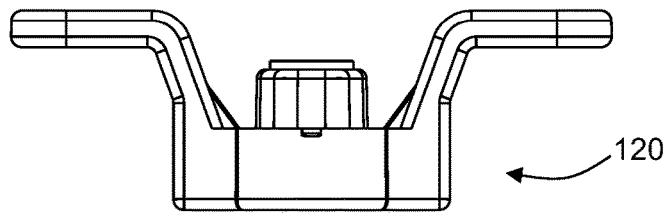
FIG. 38 is a diagrammatic front view of the example object retention element shown in FIG. 35.
Figure 39:
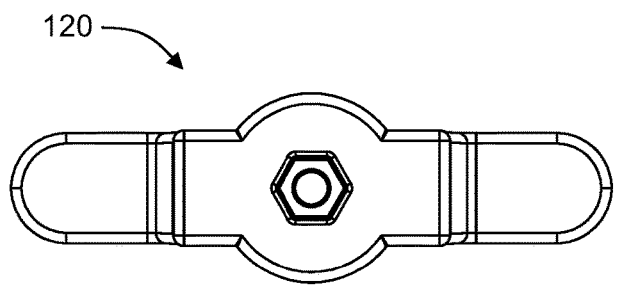
FIG. 39 is a diagrammatic bottom view of the example object retention element shown in FIG. 35.
Figure 41:
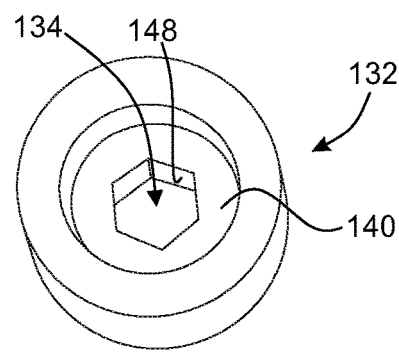
FIG. 41 is a diagrammatic perspective view of an example cover element in accordance with certain embodiments of a marking apparatus disclosed herein.
Figure 42:
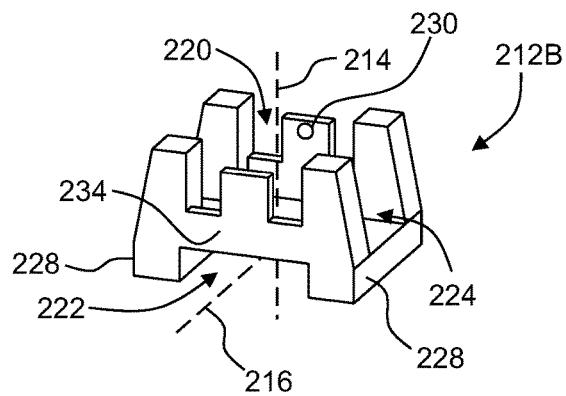
FIG. 42 is a diagrammatic perspective view of one example orthogonality adapter in accordance with the present disclosure.
Figure 43:
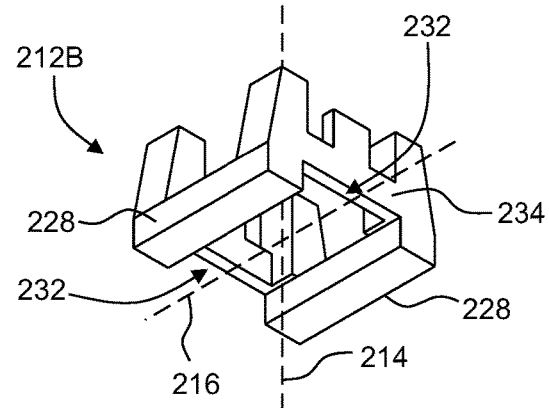
FIG. 43 is a further diagrammatic perspective view of the example orthogonality adapter shown in FIG. 42.
Figure 44:
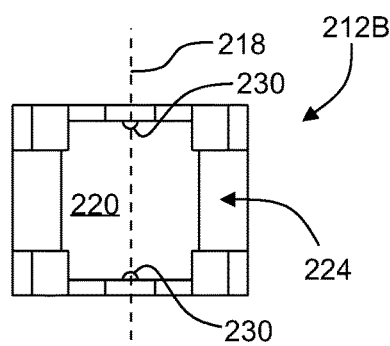
FIG. 44 is a diagrammatic top view of the example orthogonality adapter shown in FIG. 42.
Figure 45:
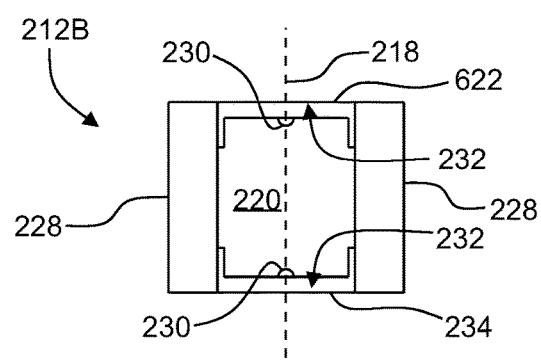
FIG. 45 is a diagrammatic bottom view of the example orthogonality adapter shown in FIG. 42.
Figure 46:
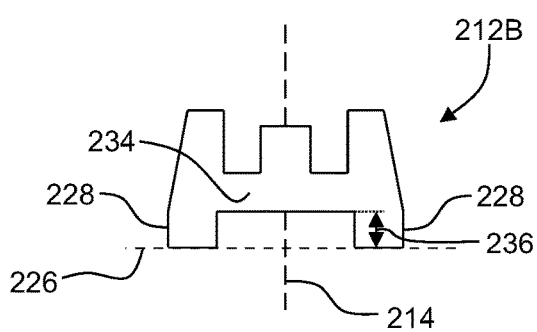
FIG. 46 is a diagrammatic front view of the example orthogonality adapter shown in FIG. 42.
Figure 47:
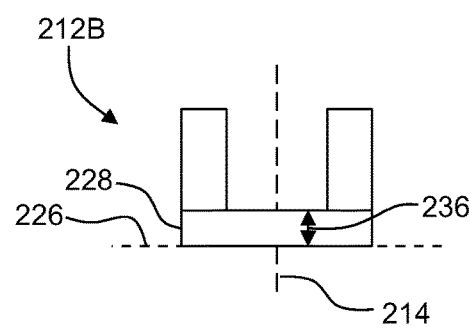
FIG. 47 is a diagrammatic side view of the example orthogonality adapter shown in FIG. 42.
Figure 48:
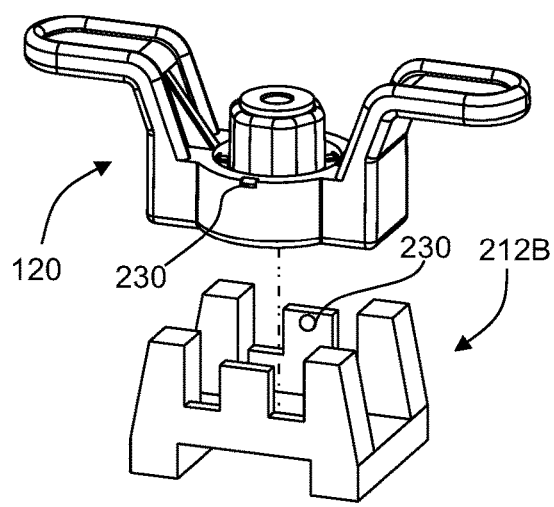
FIG. 48 is a diagrammatic perspective view of the example orthogonality adapter shown in FIG. 42 disengaged from a corresponding example object retention element.

At block 302, an object 102 is selected for blind-slide mounting to a mounting surface. The object 102 generally has at least one slide mount slot 104 (which may be provided by a keyhole hardware element 168 in some cases). Each slide mount slot 104 has a corresponding fastener head opening 103, mounting lip 105 and a slot closed end 177. At block 304, a marking apparatus 100 is provided. The provided marking apparatus is preferably structurally and functionally consistent with one or more of the apparatuses described and depicted elsewhere in this disclosure. At block 306, the object retention element 120 is moved to its open position (see, for example, FIG. 25). At block 308, the head portion 112 is inserted into a respective slide mount slot 104. At block 310, the lip groove 128 is slid into receipt of the respective mounting lip 105 at the slot closed end 177 (see, for example, FIG. 26). At block 312, the object retention element 120 is allowed to move to its gripping position (see, for example, FIG. 27). At block 314, the cover element 132 is rotated so as to threadedly transport the tightening element 142 to its lock position (see, for example, FIG. 28). At block 316, a marking substance is applied to the marking end 114 (see, for example, FIG. 6). At block 318, the object 102 is positioned in desired mounting alignment along the mounting surface 108 with the surface engagement portion 136 being in contact with the mounting surface 108 (see, for example, FIGS. 7 and 30). At block 320, the object 102 is pushed toward the mounting surface 108 so as to cause the cover element 132 to move to its marking position, thereby causing a volume of the marking substance 158 to be transferred from the marking end 114 to a respective mark location on the mounting surface 108 (see, for example, FIG. 31). The marking substance may be a liquid, or a more viscous substance (e.g., lipstick, paint, crayon, nail polish, chalk, or the like). At block 322 a respective slide-mount fastener 106 is installed at the mark location (see, for example, FIGS. 32 and 33). At block 324, the object 102 is mounted to the mounting surface 108 by way of mounting engagement between the slide-mount fastener 106 and the respective slide mount slot 104 (see, for example, FIG. 34).

In a method such as the one shown at 300, for example, in the step of selecting, the selected object 102 may have two or more said slide mount slots 104. In such case, the step of providing may include providing one or more additional marking apparatuses as described herein; and the remaining steps would be performed in association with all of the marking apparatuses provided.

Figure 3:
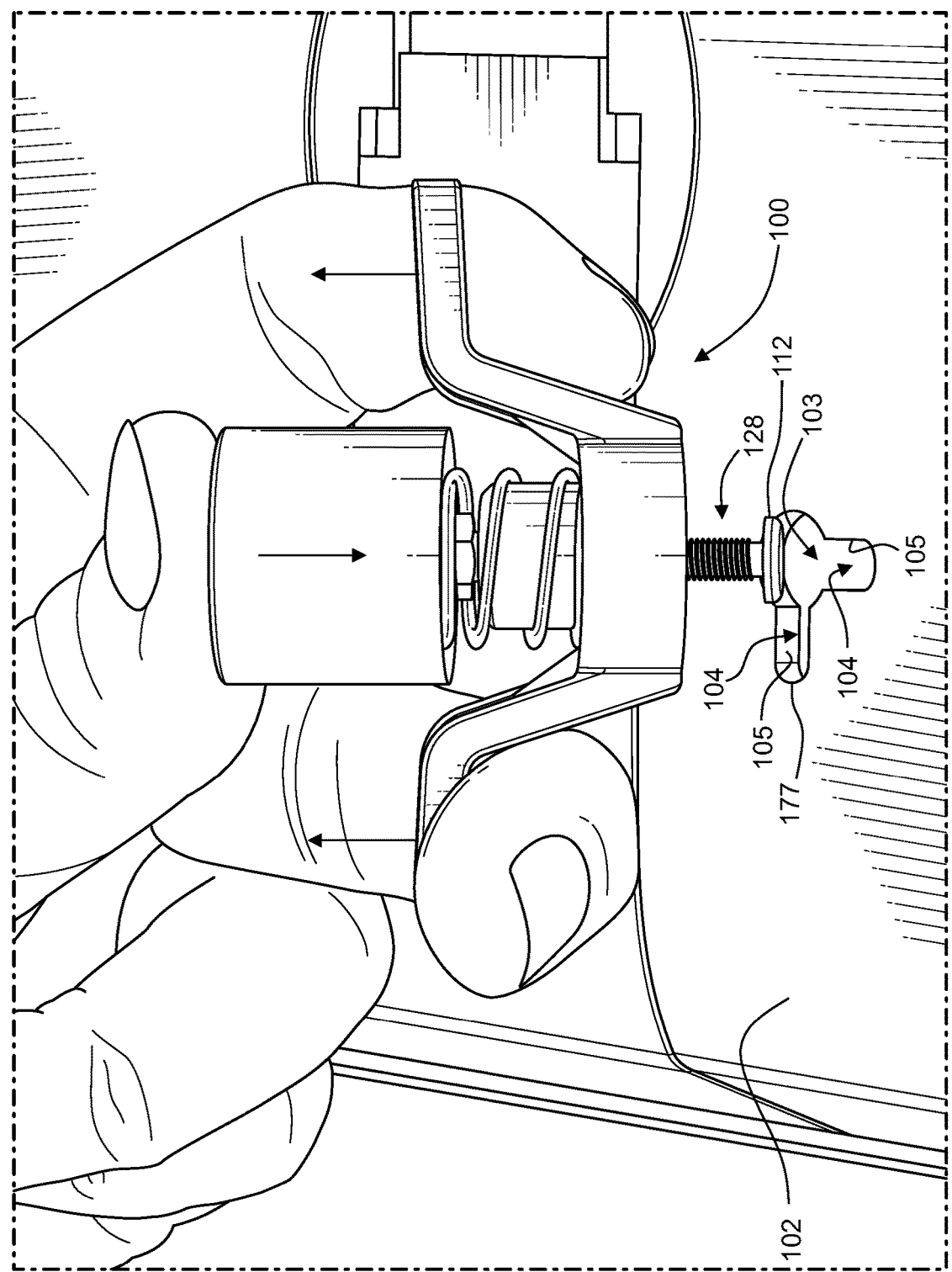
FIG. 3 is a diagrammatic perspective view of an example marking apparatus in which the object retention element has been moved to its open position, thereby presenting a lip groove between the object retention element and head portion of the post element.
Figure 4:
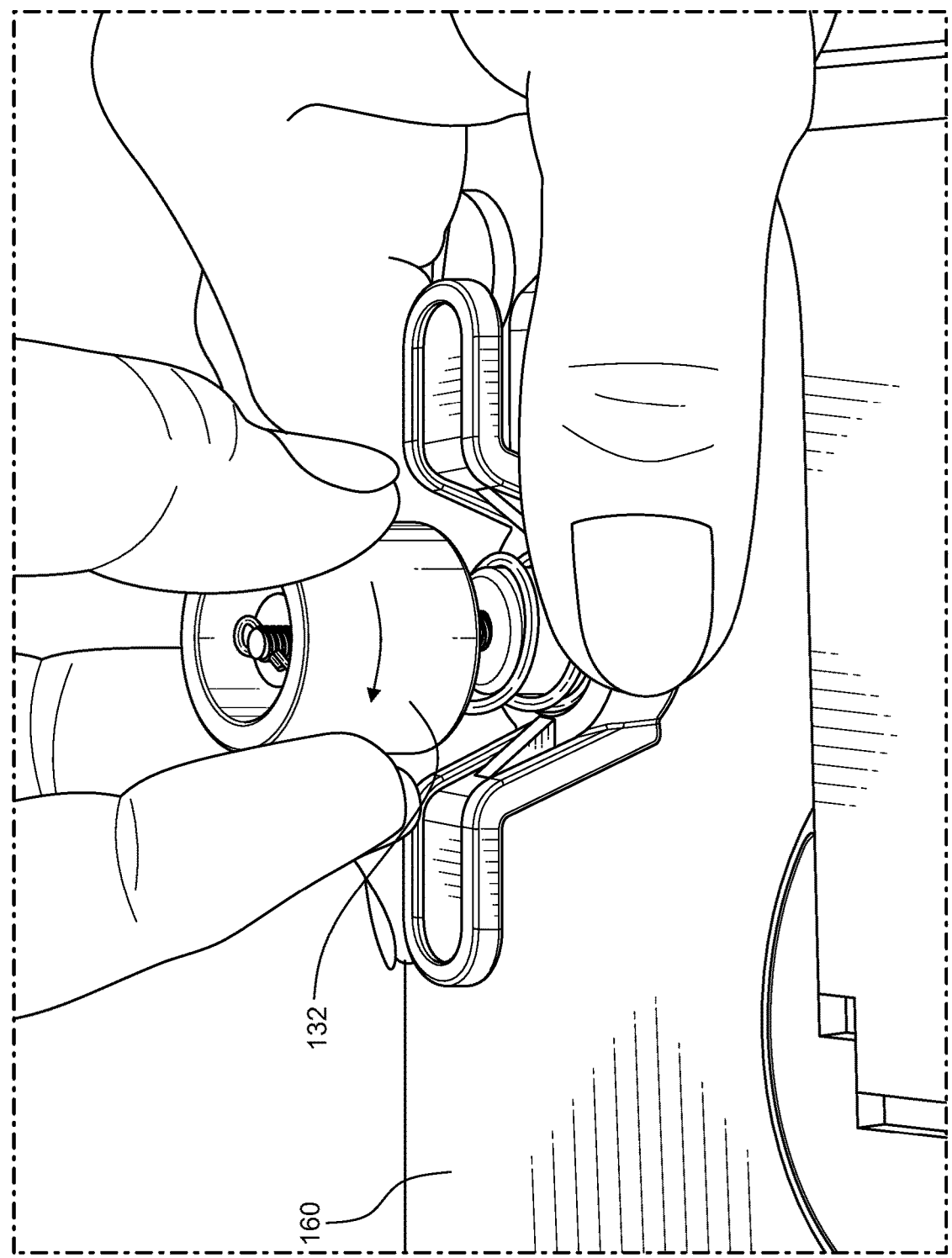
FIG. 4 is a diagrammatic perspective view of an example marking apparatus being held so that its shaft portion is maintained at the slot closed end of the fastener slot while the cover element is being rotated to move the tightening element to its lock position.
Figure 5:
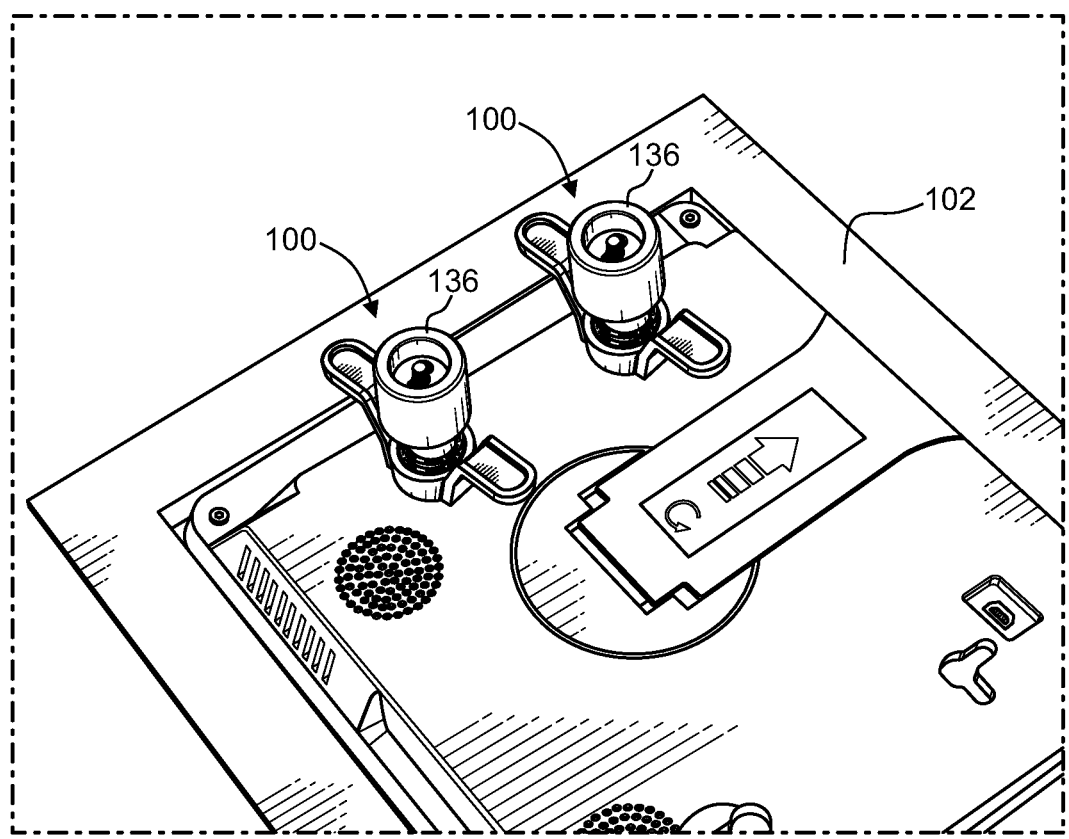
FIG. 5 is a diagrammatic perspective view of an object with a pair of marking apparatuses rigidly affixed thereto, wherein the mounting lip of each mounting slot is secured within the lip groove of a respective marking apparatuses.
Figure 16:
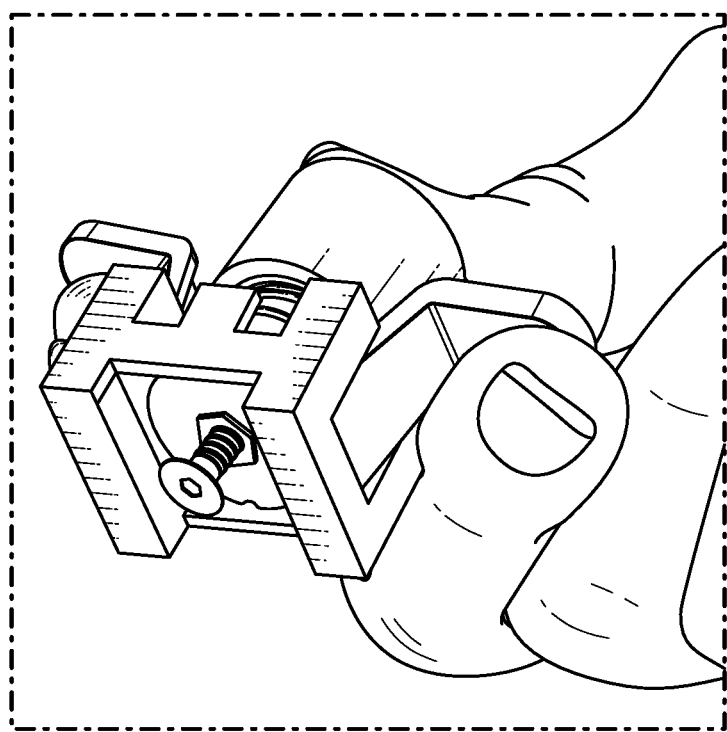
FIG. 16 is a diagrammatic perspective view of the marking apparatus of FIG. 15, but wherein the object retention element is shown in an open position.
Figure 17:
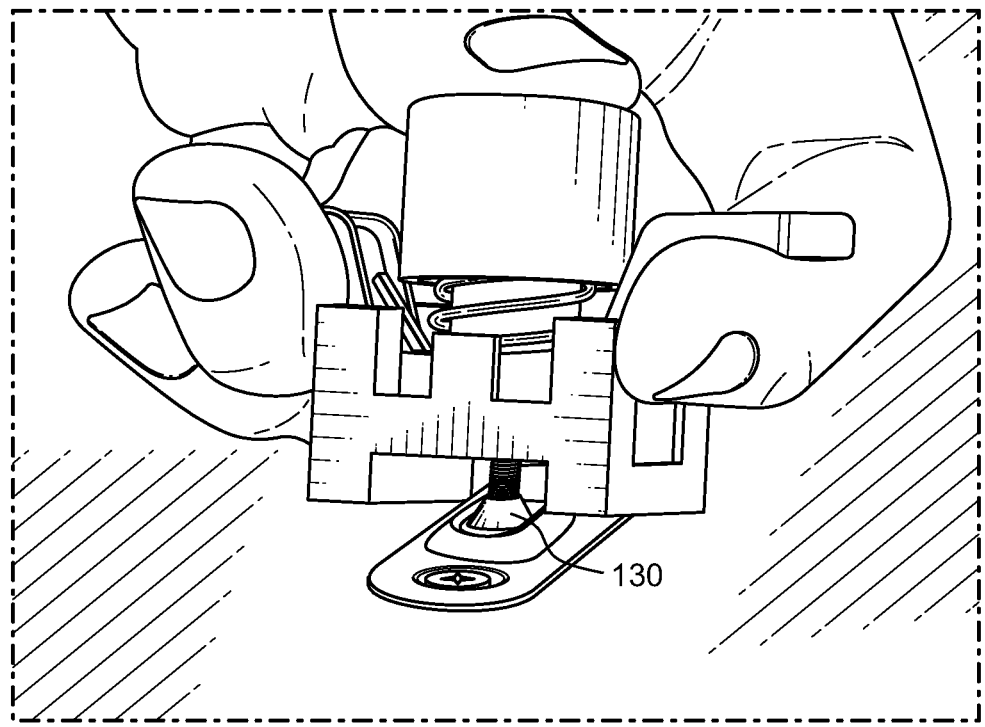
FIG. 17 is a diagrammatic perspective view of the marking apparatus of FIG. 16, but wherein head portion of the post element is shown inserted into the fastener slot of a prior art keyhole hardware element with slot lips protruding outward of the local planar surface of the object.
Figure 18:
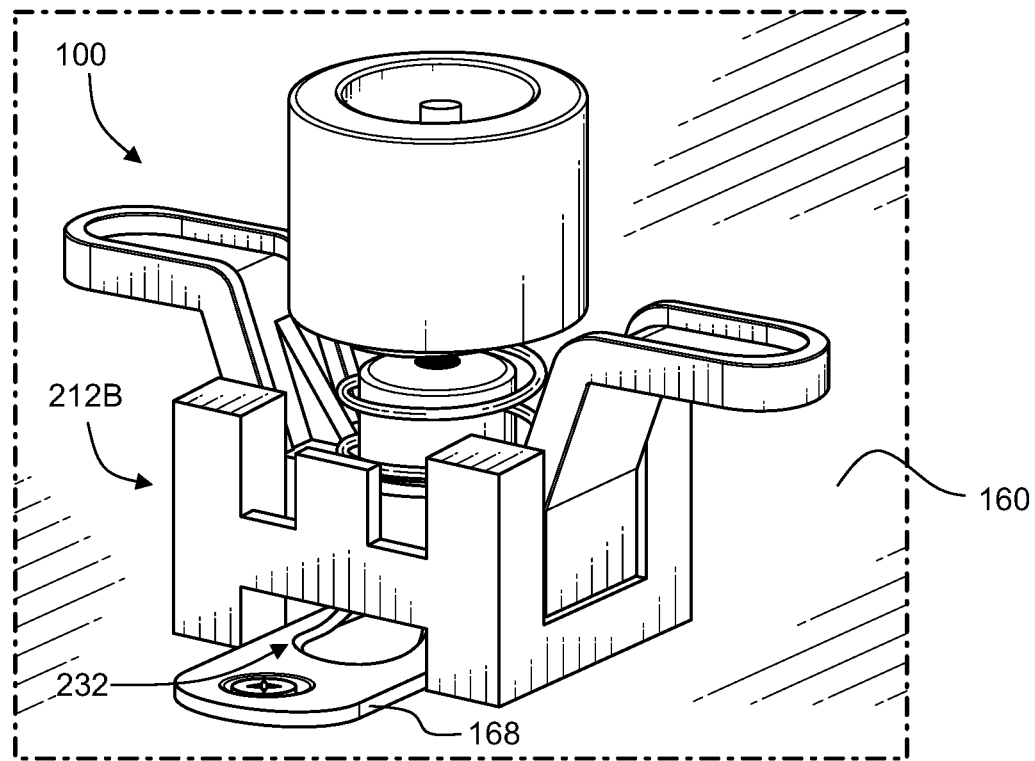
FIG. 18 is a diagrammatic perspective view similar to that of FIG. 17, but wherein the marking apparatus with orthogonality adapter is affixed to the object to be mounted by way of the keyhole hardware element such that the main axis of the apparatus remains rigidly orthogonal to the object.
Figure 19:
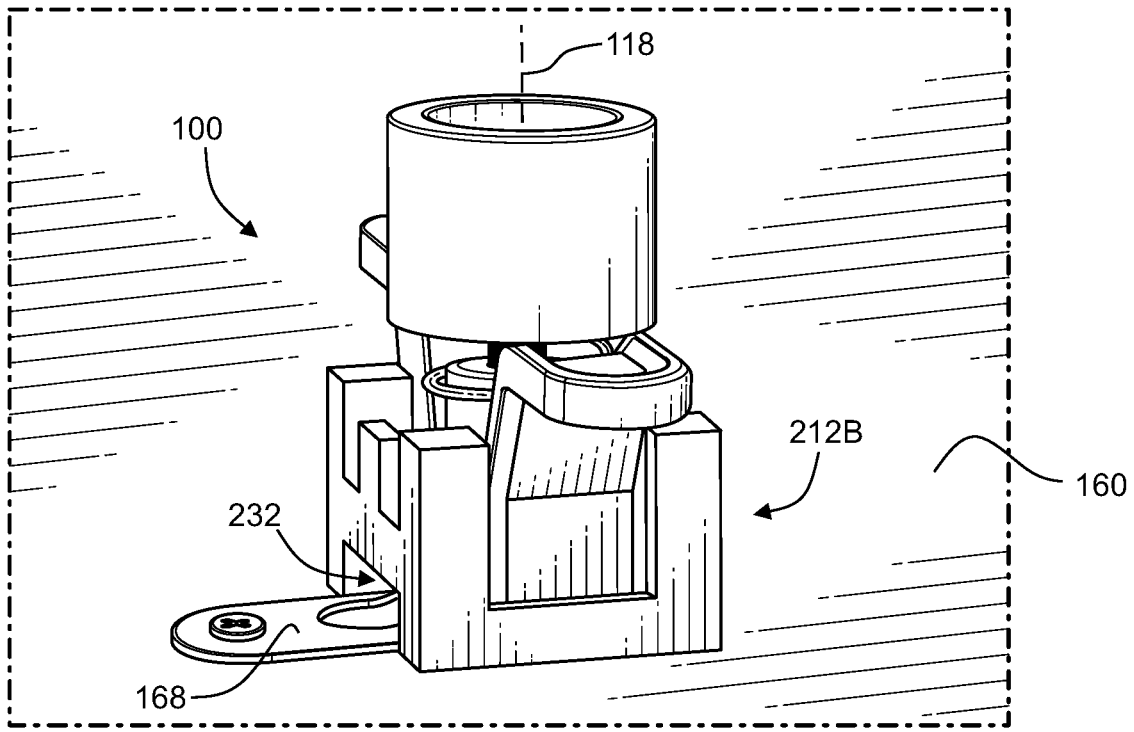
FIG. 19 is a further diagrammatic perspective view similar to that of FIG. 18, further illustrating the orthogonal alignment of the marking apparatus with respect to the object to be mounted.

Referring to FIGS. 3 and 16, in a method such as the one shown at 300 for example, the step of moving the object retention element 120 to its open position may preferably by achieved by using one hand to squeeze the cover element 132 and the object retention element 120 toward one another with a thumb of the one hand disposed across the surface engagement portion 136 and fingers of the one hand gripping one or more finger grip portions 124 of the retention element 120.

A marking apparatus may otherwise be referred to herein as a blind slide-mount attachment location device, or otherwise "device" or "apparatus." It is envisioned that kits may be produced and sold which include one or more such devices. Embodiment of a marking apparatus as described and claimed herein permits a physical object that is to be mounted to be used as its own mounting "template," thereby ensuring the accuracy of the attachment locations on a mounting surface (a) without the need for the use of paper templates or measurements and (b) with consideration for potential interference with nearby articles and visual appeal.

Embodiments of a marking apparatus may be configured for use on any object that comes with a blind slide-mount provision (for example, a keyhole or the like), and on any other objects that can accommodate the attachment of one or more blind slide-mount adaptors (e.g., the object having sufficient attachment surface area). As for the latter, there is only need for approximate placement of the adaptors on the object 102, as the blind slide-mount attachment-hole locator system allows for correct visual alignment of the object 102 onto the mounting surface 108 independent of the accuracy of the adaptor's horizontal or vertical position on the object 102.

Preferred examples of the marking apparatus may be used with any object to be mounted that has provision for one or more slide mount slots 104. Such provisions may include, for example, one or more slide mount slots 104 integrally formed with the object 102 or slide mount slots 104 formed in adaptors affixed to the surface of the object. Examples of the former would include many conventional power strips, phone bases, phone handset charging bases, network routers, cable boxes, small appliance bases, and the like. Examples of the latter would include mirrors, picture frames, decorative wall items, and the like.

The term "slide mount" may preferably be used herein to refer to a mounting receptacle, such as a keyhole, that has an opening, typically a slot, to engage the head of the mounting hardware that is installed in or on the mounting surface 108.

The term "blind" may preferably be used herein to describe the inability to see and directly mark the slide mount fastener attachment location on the mounting surface given that the slide mount is behind or on the back of the object to be mounted.

The term "locking pin" may preferably be used herein to describe a pin that extends though the shaft portion and limits the movement of the cover element in a direction toward the marking end. A locking pin may be, for example, a straight pin, a friction pin (for press-fit into the pin aperture), a hairpin clip, or the like.

The term "mounting hardware" may preferably be used herein to refer to the hardware item located in or on the mounting surface at the attachment location that engages the slide mount slot. Examples of mounting hardware may include screws, nails, bolts, picture hangers and the like.

There term "center post" (or post element 110) may preferably be used herein to refer to a central construction element which comprises a first end, a second end, and a center section (e.g., shaft portion 116). The first end may include a head portion 110. The second end may include a marking tip 114. An outer surface of the center section (shaft portion 116) may preferably be at least partially covered with a helical ridge (e.g., screw threads).

The head portion 112 may be located at the first end of the post element 110 and may preferably take the form of a protuberance which is configured to engage and grip a slide mount slot from the underside/inside.

A holding surface (e.g., object retention element 120) may be adapted to engage a slide mount slot 104 from the outer surface to sandwich the slide mount lip material between it and the head portion 112 of the post element 110. The object retention element 120 may include or be integrated with the finger grip portions 124.

A tightening element 142 may preferably be provided for tightening the object retention element 120, slide mount material (such as a keyhole slot lip 105), and head portion 112 together. Threaded transport of the tightening element 142 along the threaded shaft portion 116 to and from the head portion 112 may preferably be driven by corresponding rotation of the end cover (cover element 132).

Figure 106:
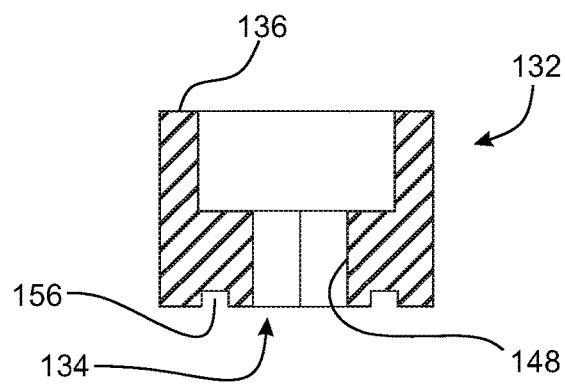

A resilient biasing element 126 may be configured to exert a biasing force on the retention element 120 to temporarily hold the head portion 112 in the object's respective slide mount slot until the tightening element 142 is transported into its retaining or lock position (e.g., "tightened"). The biasing element may also resiliently force the cover element 132 toward its extended position (see, for example, FIG. 30) to keep the marking tip away from the surface to be marked until the object 102 to be marked is pushed to mark the mounting surface 108 (see, for example, FIG. 31). The biasing element 126 may be in the form of a compression spring, a leaf spring (see, for example, the object retention element in FIG. 82), or the like. Referring to FIGS. 23 and 106, in certain preferred embodiments of a marking apparatus, in order to keep the spring element 126 from slipping laterally of the main axis 118 during operation of the marking apparatus, the cover element 132 may include a spring alignment groove or recess 156 and/or the object retention element 120 may include an alignment boss 122. Referring to FIGS. 23 and 24, a cover interface washer 159 may be provided to prevent the spring element 126 from wearing on the cover element 132 as a result of relative rotational movement therebetween.

The term "grip range" (annular slot or lip groove 128) may be used herein to describe the maximum space between the head portion 112 and the object retention element 120 that is created when the finger grip portions 124 are fully pulled back toward the cover element 132. The grip range may define the maximum slide mounting lip material thickness that can be accommodated by the respective marking apparatus.

Preferred embodiments of a device or apparatus 100 may be used for marking one or more attachment locations for mounting an object 102 that utilizes a blind slide mount mounting system (e.g., keyhole features). The post element 110 may have a head portion 112 on one end and a marking end or tip 114 on the other end, with threads in-between, and a diameter that is less than the smallest portion of the slide-mount.

A head portion 112 may be larger than the slide mount slot 104, to engage the slide mount. In some embodiments, the underside of the head portion 112 may be treated in some fashion to increase frictional contact with the slide mount material (e.g., slot lips 105).

Integrated finger grip portions 124 may be provided, to allow the object retention element 120 to be pulled back to form an annular slot or lip groove 128 for easy insertion of the head portion 112 and shaft portion 116 into the slide mount slot 104 and to allow the user to visually verify correct center post position in the slide mount slot.

A tightening element 142 may be provided for securing the apparatus to the slide mount of the object 102.

Figure 1:
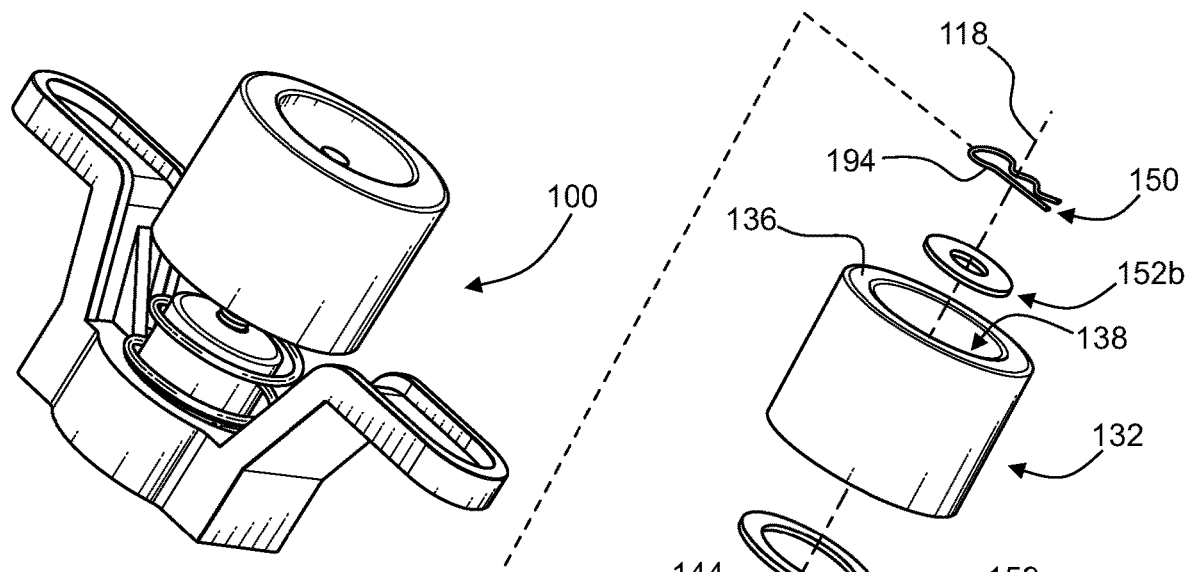
FIG. 1 is a diagrammatic perspective view of one example marking apparatus in accordance with the present disclosure.

Certain preferred examples of a cover element 132 may have a smooth face and be concentric with the post element 110. The cover element may be adapted to be moved into a retracted position (see, for example, FIG. 31) when the object is pushed toward the mounting surface 108, thereby allowing a marking substance 154 on the marking end 114 to mark the mounting surface 108 where the mounting fastener 106 is to be placed. A mounting fastener 106 may preferably include a fastener head 107. In some embodiments of a marking apparatus 100, such as the one shown in FIGS. 1 and 2, the cover element 132 includes a surface engagement portion 136 which may have radiused or beveled edges to ensure smooth translational (sliding) movement across the mounting surface 108 during alignment of the object prior to marking.

A biasing element 126 may be positioned concentrically with the post element 110 and may preferably serve the multiple purposes of holding the head portion 112 in place against the mounting lip 105 of the slide mount slot 104 until the tightening element 142 is transported to its retaining or lock position (see, for example, FIG. 28) as well as keeping a retractable cover element 132 in its extended position (see, for example, FIG. 30) until the mounting surface 108 marking push-action is performed.

The functional capabilities and limitations of particular aspects of the marking apparatus 100 may be driven by the interaction between the dimensions of its components. For example, grip range may depend on the length of the post element 110 and tightening element 142, and the position of locking mechanism 150. Also, the distance of the marking end 114 below the surface engagement portion 136 of the cover element 132 when the cover element is in its extended position may depend on the respective lengths of the post element 110 and the cover element 132, the thickness of the bottom of the cover element 132, and the position of the locking mechanism 150. Similarly, the force provided by the biasing element 126 may depend on the biasing element length, lengths of the post element 110 and the tightening element 142, thickness of the bottom of the cover element 132, and the position of the locking mechanism 150. The amount of tightening element 142 engagement in the cover element 132 depends on lengths of the post element 110 and tightening element 142, cover element 132 bottom thickness, and position of locking mechanism General advantages of preferred embodiments of the marking apparatus and associated methods in accordance with the present disclosure include one, more or all of the following: (a) allow the use of the object to be mounted as the alignment "template," thereby assuring accurate and visually-pleasing mounting without interfering with other nearby objects; (b) eliminate the need for paper templates or measurements to establish mount hole location; (c) will work on all slide mount materials and virtually all slide-mount slot configurations; (d) the marking apparatus securely tightens to the object to be mounted to ensure no mount hole location error on the mounting surface; (e) the marking apparatus will work on nearly any mounting surface (soft or hard); (f) can employ a wide variety of common substances for marking, which also allows for choice of marking color for dark, light, or colored mounting surfaces; (g) retractable/extendable marking end ensures no accidental marks on mounting surface while positioning, with marking being accomplished by push-to-mark action of the object to be mounted; (h) "floating" tightening element ensures the marking end is always at the same distance below the surface engagement portion of the cover element when the cover element is in its extended position, thereby providing a user with the same push-to-mark "feel" each time used; and (i) finger grips may be used to extend the slot-engaging head, allowing for visual confirmation that the shaft portion of the post element is located at the slot end.

Figure 97:
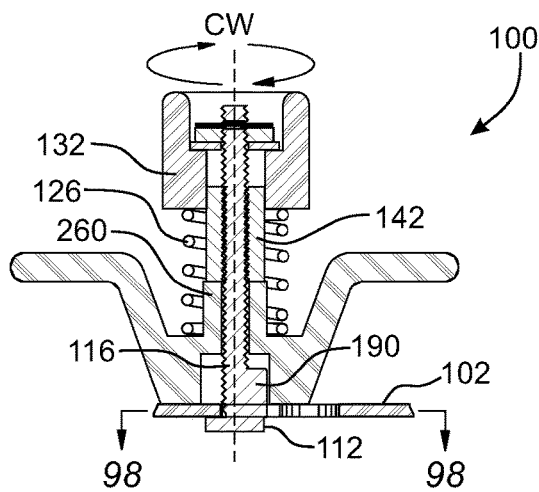
FIG. 97 is a diagrammatic cross-sectional view similar to that of FIG. 96, but showing the cover element being rotated to threadingly transport the tightening element to its lock or retaining position so as to clampingly secure the object slot lips between the head portion and the object retention element.
Figure 98:
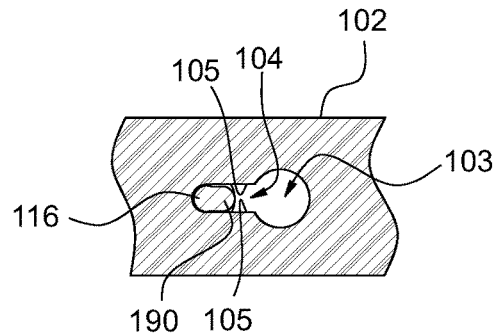
FIG. 98 is a diagrammatic cross-sectional view taken across lines 98-98 of FIG. 97.

FIGS. 89-100E herein illustrate earlier developmental versions of the marking apparatus 100. These earlier developmental versions lack certain features (such as the axial offset between the rotational detent member and the head portion) present in preferred embodiments of the marking apparatus, such as those shown at FIGS. 1, 2, and 23-29. The developmental precursors of the marking apparatus, such as those whose example constructions and components are illustrated in FIGS. 89-100E, allow the user to selectively rotate the finger grip portions 124 with respect to the slide mount slot 104 in the object 102. More particularly, such embodiments enable the user to repeatedly selectively set the finger grip portions 124 to various rotational orientations (e.g., at increments of 90 degrees) with respect to the post element 110. This type of embodiment is particularly useful in cases in which the rotational detent member 190 extends outward of the object retention element 120 during operation of the apparatus so as to contact the slide mount slot 104 in a manner requiring the rotational detent member 190 to be oriented away from the slot end (see, e.g., FIGS. 97 and 98). In critical contrast, preferred embodiments of the marking apparatus 100, such as those illustrated at FIGS. 1-2, 23-31, and 72-81 enable the user to repeatedly selectively rotate the finger grip portions 124 to various rotational orientations with respect to the keyhole slots 104 of the object 102, but without the intervening step of reorienting the finger grip portions 124 with respect to the post element 110.

Blind slide-mounts (keyhole slots) on the market feature various hole and/or slot sizes. A particular embodiment of the apparatus may accommodate many or most of these various hole and/or slot sizes. However, there are some—particularly add-on keyhole slot adapters—where the slot may be too wide for a particular embodiment of the apparatus to function correctly, and some others where the slot size is too small to accommodate the diameter of the shaft portion 116 of the post element 110. Some of these slots may require different shaft portion 116 and/or head 112 configurations. Certainly, another complete apparatus with a different head diameter 198 or shaft diameter 200 could be implemented; but having to buy more than one set of apparatuses would be an inconvenience and additional expense to the consumer. However, as demonstrated in the particular apparatus illustrated in FIGS. 72 and 73, a secure but removable locking pin 194 may be inserted in a pin aperture 196 in the post element 110 to jam-lock the nut/assembly rather than permanently locking the termination nut 152a in place using glue, weld or the like. This allows the user to remove the post element 110 from the marking apparatus 100 and replace it with an alternate post element 110 having, for example, a larger head diameter 198 (see, e.g., FIG. 100B), a smaller shaft diameter 200 within the gap zone 208 (see, e.g., FIG. 100C), a larger shaft diameter 200 within the gap zone 208 (see, e.g., FIG. 100E), or a thinner head thickness 202 (see, e.g., FIG. 100D). One or more such alternate post elements 110 may be included in a kit along with one or more apparatuses 100. In certain implementations, the length of the gap zone 208 (e.g., of the post element 110 illustrated in FIG. 100C) may be equal to or greater than the gap distance 184 formed between the head portion 112 and the object retention element 120 when the object retention element 120 is in its open position (see, e.g., FIG. 94).

In the embodiments of FIGS. 89-98, the ability to change the finger grip orientation may be provided by the multiplicity of rotational detent grooves 258, new dimensions of the device, and variation of the method of use. If the user loosens the device completely (e.g., by counter-clockwise rotation of the end cover 132), fully extending the head of the device extends the rotational detent member 190 outside its present rotational detent groove 258, thus allowing the head/protrusion assembly to be selectably rotated (e.g., 90°) thereby engaging a different corresponding rotational detent groove 258 by elastic (e.g., spring) force. In such case, the finger grips are now reoriented 90° to their original position relative to the blind slide mount (keyhole slot). For example, FIG. 92A illustrates the finger grip axis 264 oriented parallel to the rotational detent axis 266, whereas FIG. 92B illustrates the finger grip axis 264 oriented perpendicularly to the rotational detent axis 266.

Figure 93:
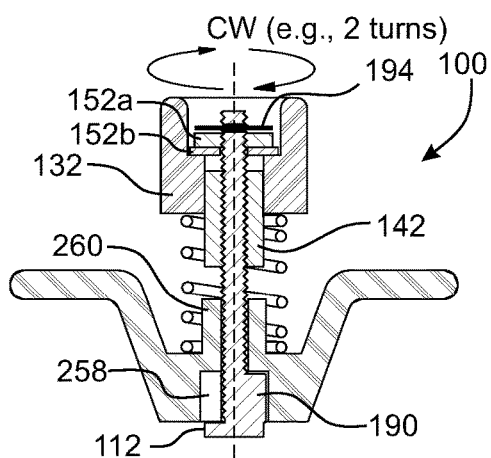
FIG. 93 is a diagrammatic cross-sectional view similar to that of FIG. 89, but wherein the cover element is shown being rotated clockwise so as to cause the tightening element to threadedly move partially toward the inset collar.
Figure 94:
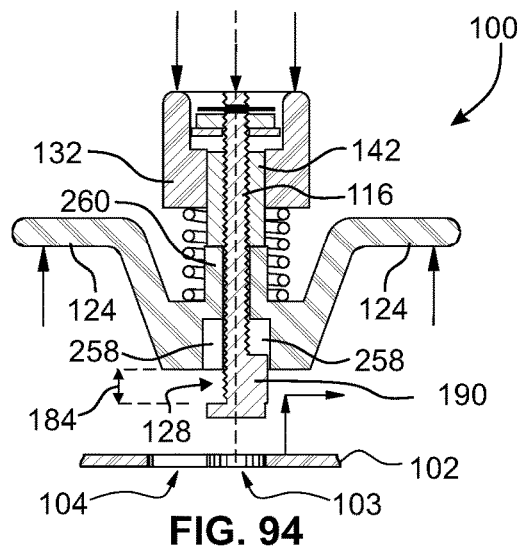
FIG. 94 is a diagrammatic cross-sectional view similar to that of FIG. 90, but wherein the object retention element is shown moved to its open position and the post element is prevented from extending sufficiently outward of the object retention element to disengage the rotational detent member from the corresponding rotational detent groove, thereby keeping the finger grips of the object retention element in their previously-selected rotational orientation with respect to the rotational detent member.
Figure 95:
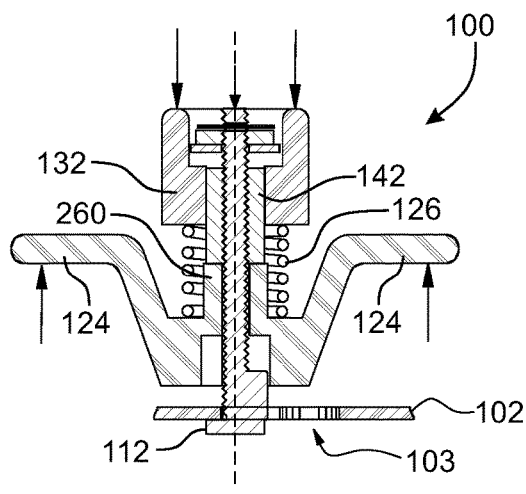
FIG. 95 is a diagrammatic cross-sectional view similar to that of FIG. 94, but wherein the head portion of the post element has been inserted through a fastener head opening of a mounting slot of an object.
Figure 96:
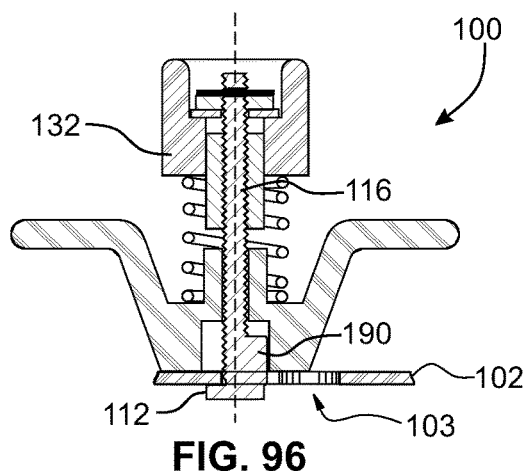
FIG. 96 is a diagrammatic cross-sectional view of the apparatus of FIG. 95, but showing the object retention element in a gripping position and the tightening element in a release position.

Referring to FIG. 93, in a preferred use of one example of such a device, the user may tighten the device by turning the end cover 132 a prescribed amount (e.g., two full turns clockwise) from fully loosened. The extendibility of the head portion 112 is thereby limited, ensuring that the rotational detent member 190 remains engaged within its user-selected rotational detent groove 258 even when the object retention element is moved fully into open position. Accordingly, inadvertent reorientation (protrusion-to-retention element misalignment) is prevented during insertion of the head portion 112 into the blind slide mount aperture 103 of the object 102.

In certain implementations of the marking apparatus illustrated in FIGS. 89-99, providing the multiplicity of rotational detent grooves 206 in combination with the post aperture may result in undesirable "wobble" of the post element 110. Such wobble may potentially be aggravated with the implementation of a smaller shaft diameter 200 in the gap zone 208. As illustrated in the examples shown in FIGS. 89-99, in order to mitigate that wobble, an inset collar 260 may be provided. This collar may preferably have a post aperture diameter that closely matches the cross-sectional diameter of the shaft portion 116 of the post element 110, thereby providing stability for the post element 110. Notably, the inset collar 260 and the features enabling the selectable rotational reorientation of the finger grips 124 relative to the rotational detent member 190 described illustrated in connection with the apparatus if FIGS. 89-99 may also be implemented in other embodiments of the apparatus 100.

Notably, different embodiments of the apparatus represented in FIGS. 89-99 may be configured with a different number of rotational detent grooves 258 (e.g., 2, 3, 4, 5 or more). Correspondingly, the angular orientation of some or all of the rotational detent grooves 258 with respect to one another may be other than 90 degrees. For example, in embodiments with three rotational detent grooves 258, the grooves may be angularly oriented 120 degrees apart from one another. Alternatively, in other embodiments with three rotational detent grooves 258, two of those grooves may be angularly oriented 90 degrees apart from one another, with the third being oriented 135 degrees apart from the other two grooves. In an embodiment with five rotational detent grooves 258, the grooves may be angularly oriented 72 degrees apart from one another. Other variations are possible. These kinds of variations afford different embodiments of the apparatus represented in FIGS. 89-99 comparatively distinct and/or additional finger grip orientations relative to the rotational detent member 190 and the respective blind slide-mount (keyhole slot). Relatedly, depending upon the embodiment of the apparatus being used, the associated method described for changing the orientation of the finger grips relative to the rotational detent member 190 and the respective blind slide-mount (keyhole) would be adapted to exploit the particular number of rotational detent grooves 258, their relative angular orientation, and consideration for ease of use.

Figure 73:
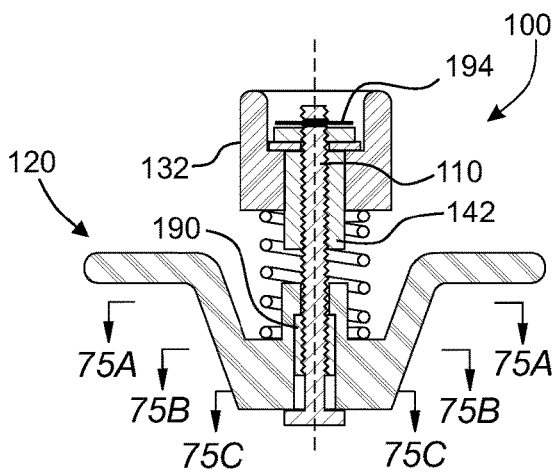
FIG. 73 is a diagrammatic assembled view of the example apparatus of FIG. 72.
Figure 74A:
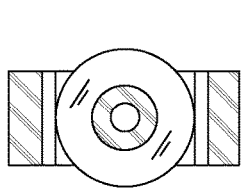
FIG. 74A is a diagrammatic cross-sectional view taken across lines 74A-74A of FIG. 72.
Figure 75A:
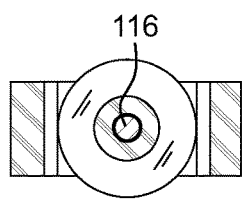
FIG. 75A is a diagrammatic cross-sectional view taken across lines 75A-75A of FIG. 73.
Figure 74B:
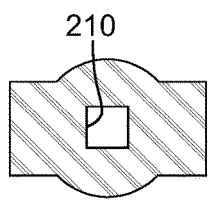
FIG. 74B is a diagrammatic cross-sectional view taken across lines 74B-75B of FIG. 72.
Figure 75B:
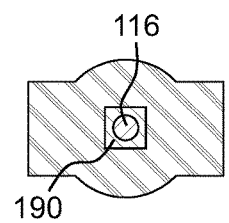
FIG. 75B is a diagrammatic cross-sectional view taken across lines 75B-75B of FIG. 73.
Figure 74C:
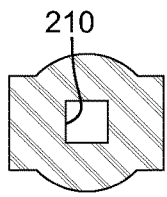
FIG. 74C is a diagrammatic cross-sectional view taken across lines 74C-74C of FIG. 72.
Figure 75C:
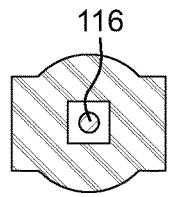
FIG. 75C is a diagrammatic cross-sectional view taken across lines 75C-75C of FIG. 73.
Figure 82:
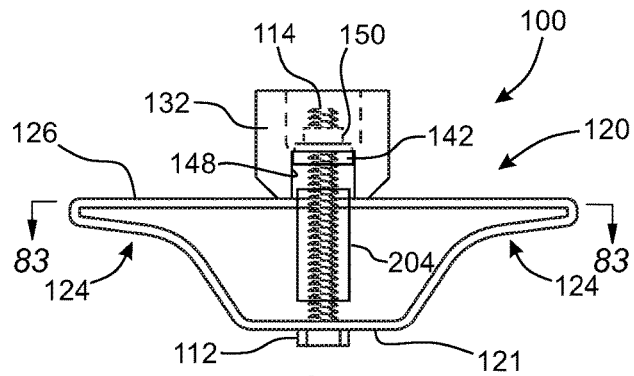
FIG. 82 is a diagrammatic cross-sectional view of yet another example embodiment of a marking apparatus in accordance with the present disclosure, wherein the resilient bias of the object retention element and the elastic bias of the cover element are provided by the object retention element.
Figure 83:
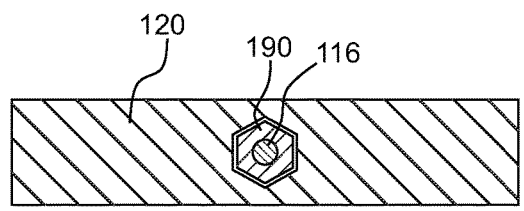
FIG. 83 is a diagrammatic cross-sectional view taken across lines 83-83 of FIG. 82.
Figure 84:
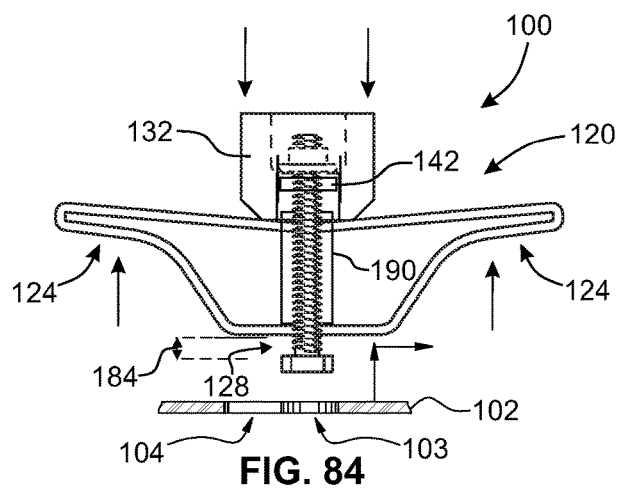
FIG. 84 is a diagrammatic cross-sectional view similar to that of FIG. 82, but wherein the object retention element is moved to its open position by elastic compression of the object retention element.
Figure 85:
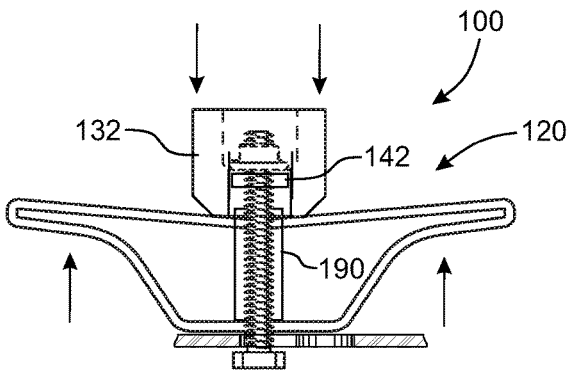
FIG. 85 is a diagrammatic cross-sectional view similar to that of FIG. 84, but wherein the object retention element has been moved to its open position by elastic compression of the object retention element.
Figure 86:
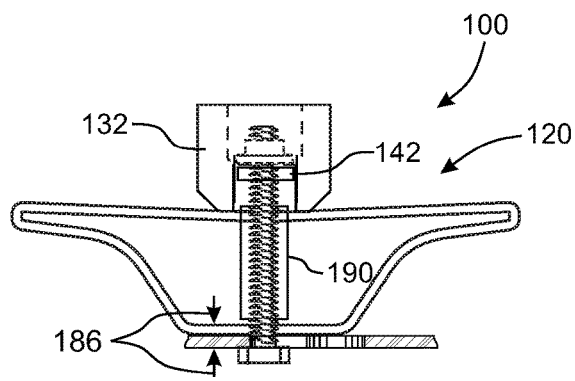
FIG. 86 is a diagrammatic cross-sectional view similar to that of FIG. 85, but wherein the object retention element has been allowed to move to its gripping position by releasing the elastic compression of the object retention element.
Figure 87:
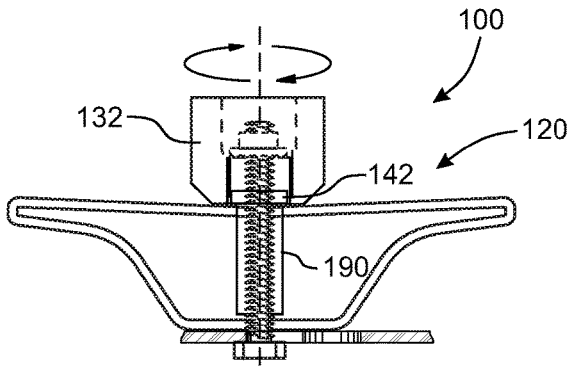
FIG. 87 is a diagrammatic cross-sectional view similar to that of FIG. 86, but showing the cover element being rotated while the rotational detent member remains non-rotatably engaged with the rotational detent face, thereby preventing the post element from being able to rotate with respect to the object retention element, to threadingly transport the tightening element to its lock or retaining position so as to clampingly secure the object slot lips between the head portion and the object retention element.

With reference to FIGS. 72, 73 and 93, in the embodiment with a locking pin 194 or other removable locking device such as a c-clip, the locking pin may preferably be completely contained within the end cover 132 by virtue of the end cover being fully extended by elastic (e.g., spring) force. The dimensions of the pin 194 may be adapted such that the sharp end of the pin cannot touch/wear the end cover; the other end of the pin may be configured to touch the end cover but not create any significant wear due to its rounded configuration.

In embodiments incorporating a locking pin 194, the nut 152a may be self-tightening against the locking pin 194, thus locking the assembly/dimensions (e.g., retaining the nut 152a in a fixed axial position along the shaft portion 116 of the post element 110 is typically key to maintaining device operational dimensions and a fixed marking tip distance below the end cover surface). The self-tightening feature results from interaction between the elastic (e.g., spring) force, axial forces, torsional forces and friction between the spring 126, end cover 132, washer 152b and nut 152a. In particular, the torque required to rotate the nut 152a in a direction forcing compression of the spring 126 is significantly greater than the torque required to cause rotation of the nut 152a in a direction allowing expansion of the spring 126. Accordingly, in preferred embodiments, when tightening the tightening element 142 by rotating the end cover 132 in a clockwise direction, the friction between the co-rotating washer 152b and the nut 152a may transfer insufficient torque to the nut 152a to cause the nut 152a to turn clockwise as well. Contrastingly, when loosening the tightening element 142 by rotating the end cover 132 in a counter-clockwise direction, the friction between the co-rotating washer 152b and the nut 152a may transfer sufficient torque to the nut 152a to cause the nut 152a to turn counter-clockwise as well, at least until the nut 152a jams against the locking pin 194.

Figure 99:
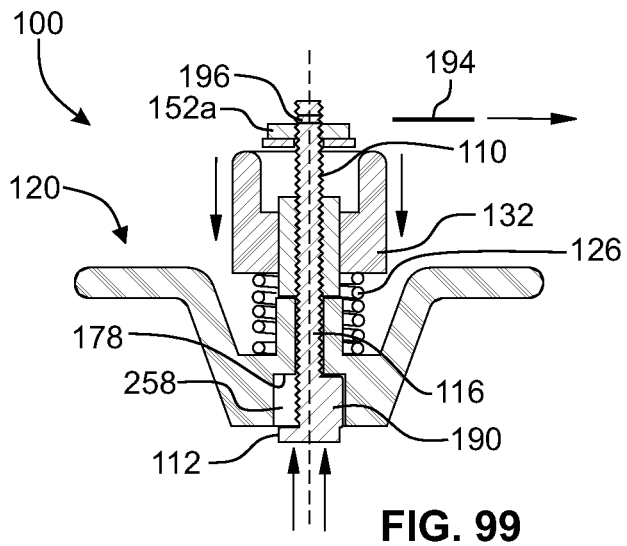
FIG. 99 is a diagrammatic cross-sectional view of the example apparatus of FIG. 89, illustrating a configuration in which the locking pin is able to be removed from the pin aperture of the post element.
Figure 100A:
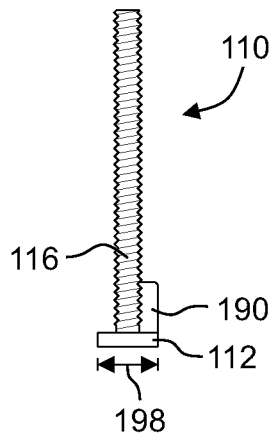
FIG. 100A is a diagrammatic side view of an example post element for use with marking apparatus embodiments such as that shown in FIG. 70, wherein there is no axial offset between the rotational detent member and the inner face of the head portion.
Figure 100B:
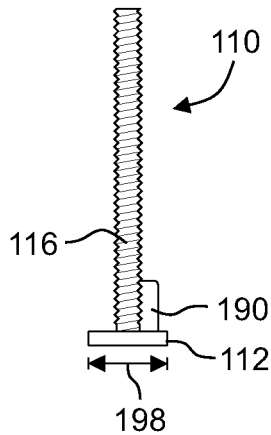
FIG. 100B is a diagrammatic side view of an alternate example post element with a larger head diameter compared to that of FIG. 100A.
Figures 100C, 100D:
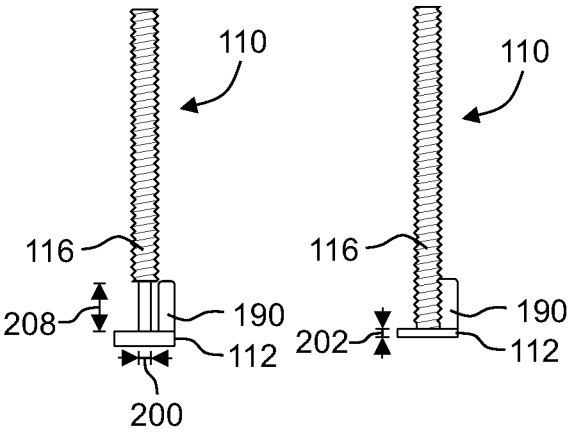
FIG. 100C is a diagrammatic side view of an alternate example post element with a smaller shaft diameter in the gap zone of the shaft portion compared to that of FIG. 100A.
FIG. 100D is a diagrammatic side view of an alternate example post element with a smaller head thickness compared to that of FIG. 100A.
Figure 100E:
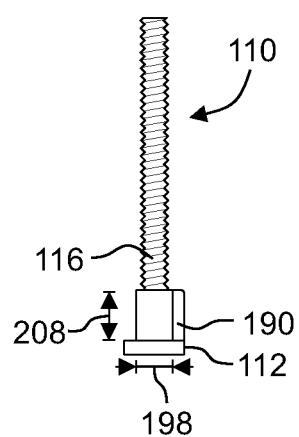
FIG. 100E is a diagrammatic side view of an alternate example post element with a larger shaft diameter in the gap zone of the shaft portion compared to that of FIG. 100A.
Figure 101A:
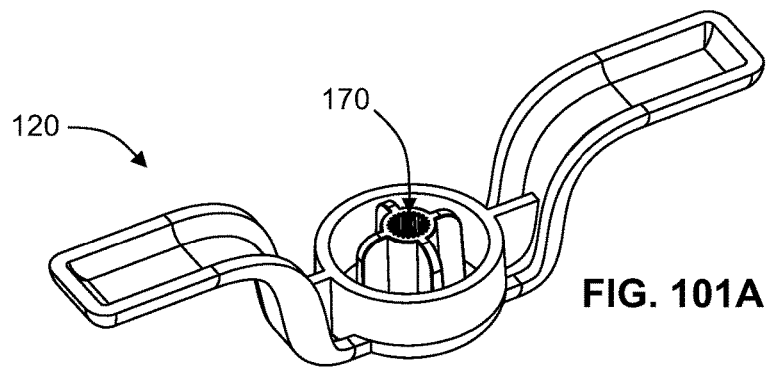
FIG. 101A is a diagrammatic perspective view of an alternate example of an object retention element, wherein the first segment of the alignment bore has a larger diameter than the second segment of the alignment bore, and the rotation detent face comprises a plurality of radially-distributed detent grooves.
Figure 101B:
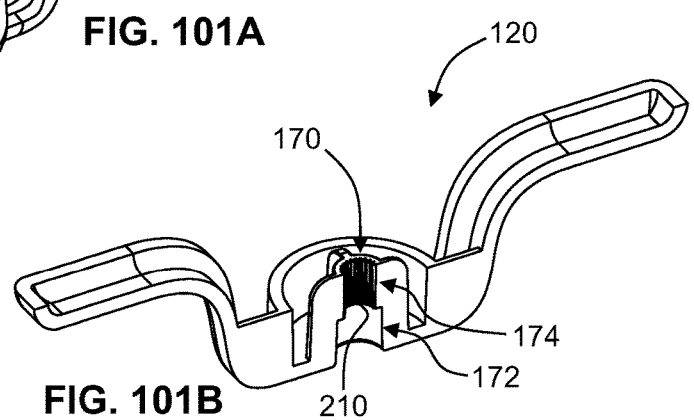
FIG. 101B is a further diagrammatic perspective view of the object retention element of FIG. 101A, but shown in cross-section.
Figure 102A:
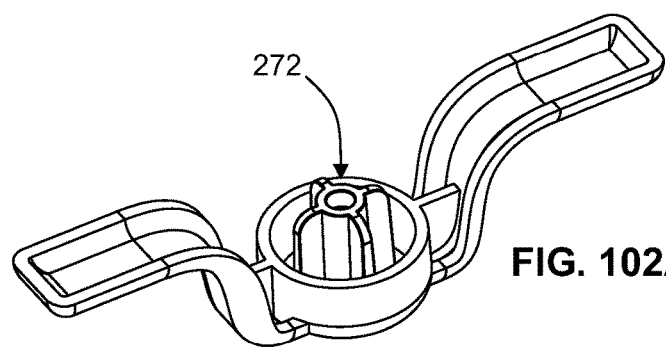
FIG. 102A is a diagrammatic perspective view of an alternate example of an object retention element similar to that of FIG. 101A, but wherein the alignment bore includes a third segment providing an axial detent portion configured to limit axial movement of a corresponding post element.
Figure 102B:
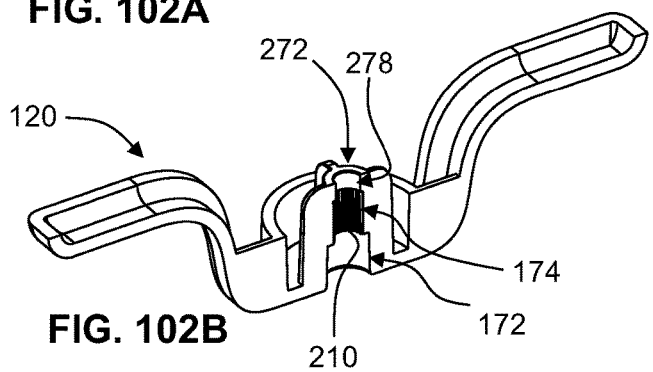
FIG. 102B is a further diagrammatic perspective view of the object retention element of FIG. 102A, but shown in cross-section.

Referring to FIG. 99 for illustration, in order to remove the post element 110 and replace it (e.g., with one having a larger-diameter head portion 112 or different shaft diameter 200 in the gap zone 208), after some tightening (e.g., clockwise rotation) of the cover element 132 to put some distance between the tightening element 142 and nut 152a, the end cover 132 may be pushed down a slight amount (e.g., compressing the spring), allowing the nut 152a to be turned (e.g., clockwise) to threadedly move it away from the locking pin 194. With the end cover 132 pushed down enough for the pin 194 to clear the top of the end cover, the pin can then be removed. The nut 152*a* can then be threadedly removed from the shaft portion 116 of the post element 110, thus allowing full disassembly of the marking apparatus. After replacing the initial post element 110 with an alternate post element (e.g., one of the alternate post elements illustrated in FIGS. 100B-100D), re-assembly of the apparatus may be, for example, just the reverse of the disassembly process.

Referring to FIGS. 72-81, the construction and operation of an example alternate implementation of an apparatus is depicted. Referring to FIG. 72, the object retention element 120 may include an alignment bore 170 with a first segment 172, a second segment 174 and a third segment 176. In an initial manufacturing process, the rotational detent element 190 may be adapted to be threaded onto the shaft portion 116 of the post element 110, then axially and rotationally affixed thereto by way of, for example, thread locking adhesive, peening, soldering, welding, a lock nut, one or more c-clips, some combination thereof or the like. Referring to FIG. 75B, the rotational detent element 190 may have, for example, a polygonal cross-section (or other cross-sectional shape), or provide a lateral protuberance (of any shape) which is adapted to axially-slidably but non-rotatably engage a rotational detent section/face 210 of the alignment bore 170 during the operation of the marking apparatus 100. Moreover, as illustrated in FIGS. 76 and 77, the third segment 176 of the alignment bore 170 shown in FIG. 72 may have a smaller diameter than the first and second segments, so as to present a flange lip to axially engage the rotational detent member 190 for limiting axial movement of the post element 110 with respect to the object retention element 120. This type of configuration may allow the diameter of the first segment 172 to be larger than the head diameter 198 (e.g., to accommodate a larger shaft diameter 200 in the gap zone 208) while preventing the head portion 112 from undesirably retracting into the alignment bore 170.

Figure 103:
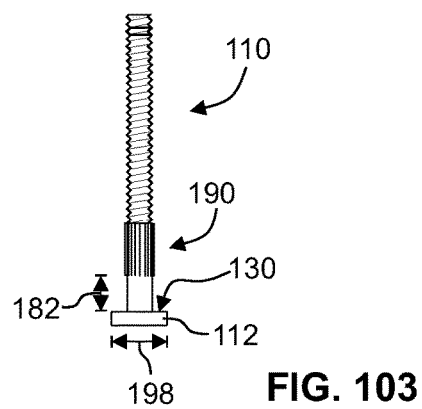
FIG. 103 is a diagrammatic side view of an example post element adapted to for use with the object retention elements of FIGS. 101A and 102A, wherein the rotation detent member is multilaterally disposed about the shaft of the post element, takes the form of a plurality of splines integrally formed with the shaft, and is configured to axially-slidably but non-rotatably engage the grooved rotational detent face in the alignment bore of the object retention element.
Figure 104:
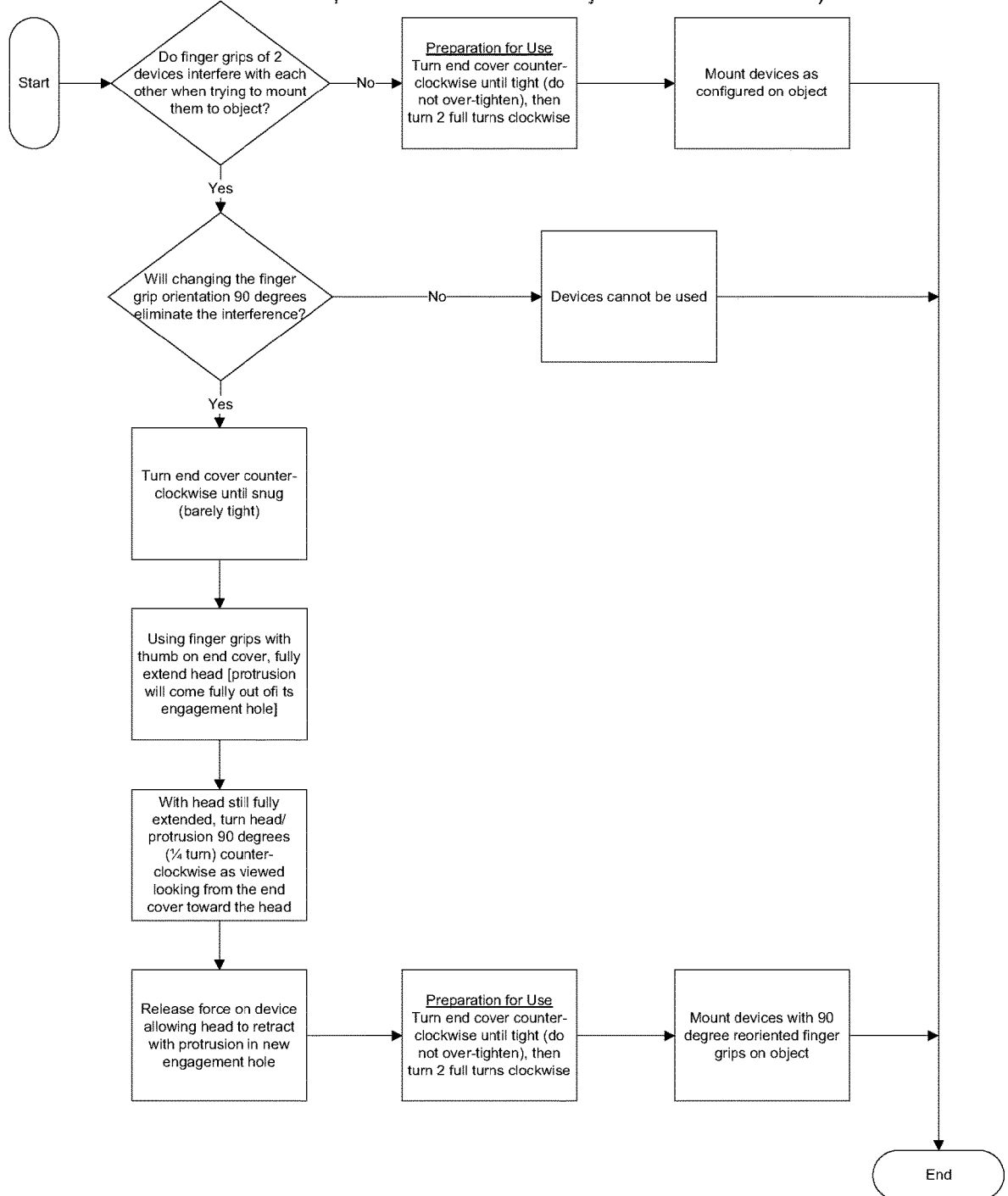
Figure 105:
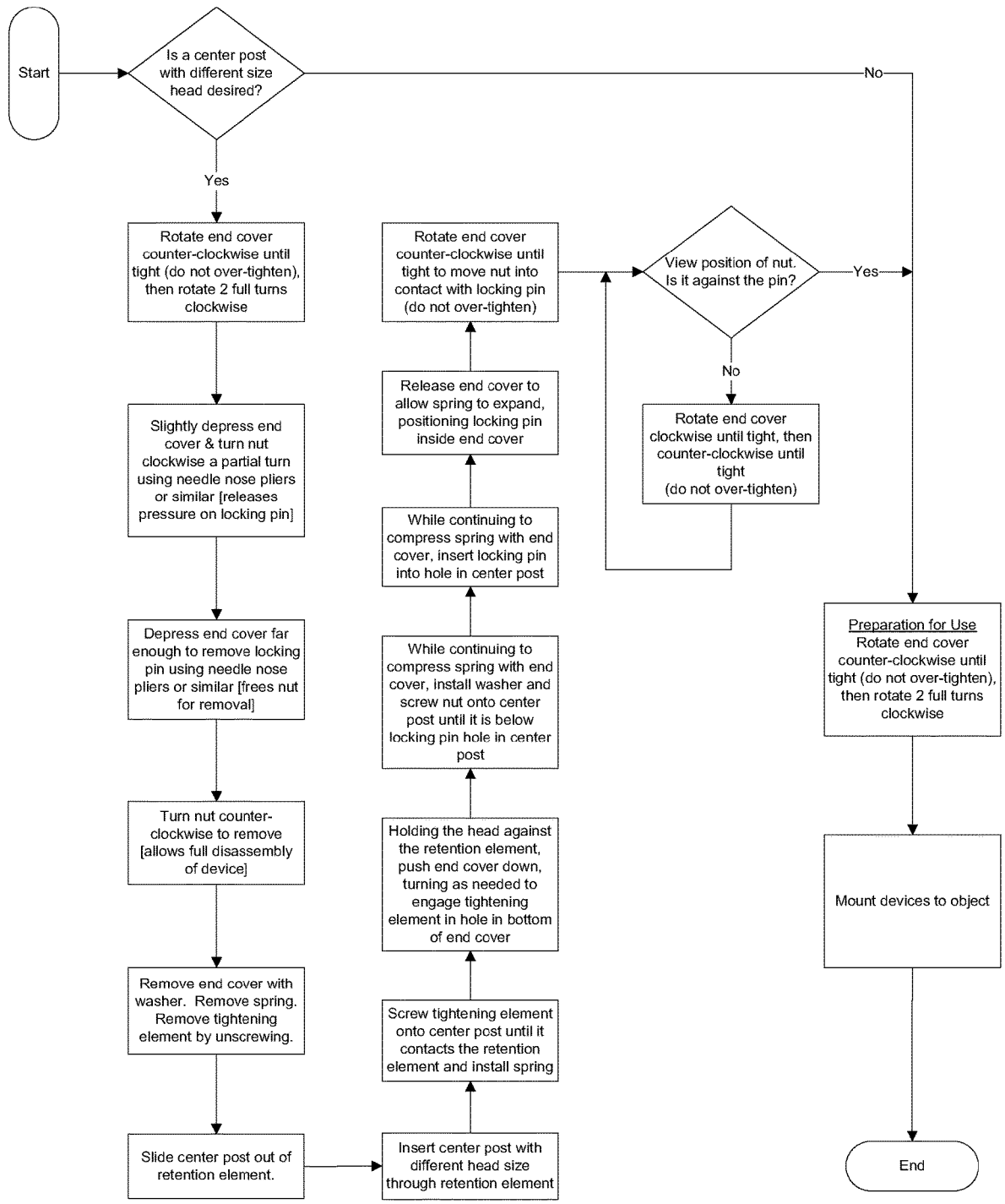

An alternate example of an object retention element 120 is shown in FIGS. 101A-102B, and a complementary alternate example of a post element 110 is shown in FIG. 103. These example components may collectively be used in an embodiment of the apparatus in which the rotational detent section 210 includes a plurality of radially-distributed grooves and the rotational detent member 190 includes a plurality of splines radially distributed about the shaft portion 116 of the post element 110.

Advantages

The improvements and innovations disclosed herein provide several advantages over conventional expedients for locating mounting hardware for objects with blind slide-mounts (e.g., keyhole slots) using the object as the template. Most of these advantages fall into the categories of (a) ease of use and accuracy, (b) ergonomics and (c) the ability to address a broad range of blind slide-mount (keyhole slot) applications, thus bringing the marking apparatuses disclosed herein close to achieving universal applicability.

Improvement in Ease of Use and Accuracy

Paramount to the design intent is simplicity of use. Users are either left or right handed, and the desired keyhole slot mounting may be left, up, right, or even down or at an angle. There is thus a convenience advantage if the mount hole fastener locating device can be engaged without regard to the prior mentioned considerations. There are also applications whereby two keyhole slots may be in close proximity, examples being shelf corbels (two oriented vertically) or wireless phone charger cradles (two oriented horizontally). Freedom of engagement orientation eliminates potential interference between two devices.

A further key objective of the design is to ensure accuracy of mount hardware locations. This comes from the ability to tighten the device on the object to be mounted, on any object material, in the exact location where the mount hardware will ultimately sit in the keyhole slot.

Both of these objectives are met in the current disclosure by implementation of an internal rotational detent element which enables the user to have complete freedom of device orientation while at the same time having the ability to tighten the device on any object material.

Ergonomics

Finger Grips. In preferred embodiments of the marking apparatus 100, the finger grips on the object retention element provide a natural and comfortable configuration to extend the device head for insertion into a blind slide-mount (keyhole slot) for both right-handed and left-handed persons. In order to extend the head, two fingers—preferably the index and middle fingers—are used on the finger grips while the thumb is placed over the end cover and center post marking tip to extend the head with a push action.

Extending the Head. With the thumb being used to apply the primary force to extend the head, in preferred embodiments of the marking apparatus 100, it was an important design consideration to minimize any user discomfort imposed by the center post marking tip when performing that operation. In particular prototypes of the preferred embodiment of the marking apparatus 100, there is approximately 7 pounds of force required to compress the integrated spring when fully extending the head, which could be quite uncomfortable if transferred to the thumb over an approximate 0.135" diameter marking tip. That is where a key design feature comes into play. In operation of the preferred embodiments of the marking apparatus, for everything but extending the head, the spring force acts upon both the end cover and the center post. However, for the particular action of extending the head, the movement of the end cover from thumb pressure occurs slightly before the movement of the center post due to the marking tip being recessed. This results in the transfer of nearly all of the spring force to the end cover, thus "unloading" the center post from spring force and allowing the center post to be moved to extend the head with very little force from contact with the thumb.

Universal Applicability

Interchangeable head/center post. A "flat bottom" head works best and most accurately for blind slide-mounts (e.g., keyhole slots) molded or cut into objects. For the majority of add-on keyhole slot hardware, however, an "angled bottom" head works best and most accurately as it better matches the add-on hardware angled slot lip characteristics, and in some cases is required due to the add-on hardware dimensions. In preferred embodiments of marking apparatus 100 in accordance with the present disclosure, the cover retention element 150 is easily and quickly removable by the user, thus providing a simple process for removal/replacement of the head/center post configuration.

Accommodation of Different Head and Center Post Sizes. Preferred embodiments of a marking apparatus 100 in accordance with the present disclosure provide an internal rotational detent member which results in an axial offset that defines a clearance zone adjacent to the head. That clearance zone provides the additional advantage of now being able to accommodate center posts with a larger diameter near the head, potentially desirable for wide keyhole (blind slide-mount) slots. The marking apparatus can also have a smaller head (and near-the-head center post) diameter by virtue of the disclosed axial detent (stop) feature that limits axial travel of the head when in its resting position.

Orthogonality Adapter. Much of the add-on keyhole slot hardware available on the market is characterized by angled keyhole slot "lips." This hardware design, if surface mounted, or not fully routed-in to be flush with (or below) the object surface, results in the absence of a flat surface with which certain marking apparatuses can engage. This in turn increases the chance that such marking adapters may not mount/tighten perpendicular to the object surface, thereby creating error in the mount hole location marks placed on the mounting surface. This problem is overcome by embodiments of an orthogonality adapter in accordance with the present disclosure. The orthogonality adapter may surround the add-on hardware to provide a flat engagement surface thus ensuring the marking apparatus is perpendicular to the object surface during the process of mounting and tightening. This then renders the marking apparatus capable of being used for virtually all add-on keyhole slot hardware mounting configurations—from surface mount to cut-in flush, and all variations in-between.

Kit Formats

A number of kits may be formed comprising various combinations of components and assemblies disclosed herein.

Kit for Molded/Cut-in Blind Slide-mounts. This type of kit may comprise a pair of marking apparatuses with "Flat bottom" heads. The applicability of such a kit would focus on blind slide-mounts (e.g., keyhole slots) molded or cut into objects. The marking apparatus in this kit may use a non-interchangeable head/center post characterized by a cover retention element that is fixed to the center post in a semi-permanent or permanent fashion.

Kit for Add-on Keyhole Slot Hardware. This type of kit may comprise a pair of marking apparatuses with "Angled bottom" heads. The applicability of such a kit would focus on add-on keyhole slot hardware. The marking apparatuses in this kit may use a non-interchangeable head/center post characterized by a cover retention element that is fixed to the center post in a semi-permanent or permanent fashion. Included in this kit would be the orthogonality adapter.

Master Kit. This type of kit may comprise a pair of marking apparatuses with an easily and quickly-removable cover retention element, thus allowing user-interchangeability of the post elements (e.g., with respective head configurations and sizes). Both "flat bottom" and "angled bottom" head center posts would be included, as would the orthogonality adapter.

Universal Kit. This kit is envisioned as a "master kit" that would also include additional head and near-the-head center post diameters for use on blind slide-mounts having extra-large or extra small keyhole slot dimensions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A marking apparatus for facilitating blind slide-mounting of an object to a mounting surface in a desired alignment using the object as an alignment template, the apparatus comprising:
   (a) a post element including a head portion, a marking end, and a shaft portion extending therebetween along a main axis, the head portion having an outer face opposite of the marking end, and an inner face disposed oppositely of the outer face between the outer face and the marking end;
   (b) a rotational detent member affixed to the shaft portion and projecting radially outwardly thereof, the rotational detent member being axially offset from the inner face so as to define a clearance distance along the main axis between the rotational detent member and the inner face;
   (c) an object retention element including a retention face, an opposing face, and an alignment bore disposed therebetween along the main axis, the alignment bore being in receipt of the shaft portion and including a rotational detent section, the rotational detent section being configured to axially-slidably and non-rotatably receive the rotational detent member, the alignment bore including an axial detent portion configured to limit axial movement of the head portion in a retraction direction from the retention face toward the opposing face, the object retention element being movable with respect to the post element along the main axis between a closed position, an open position, and a gripping position therebetween, wherein:
      (i) movement of the object retention element from the closed position to the open position results in the presentation of a lip groove for receiving a mounting lip of an object, the lip groove being at least partially defined by a gap distance between the head portion and the retention face, and
      (ii) movement of the object retention element from the open position to the gripping position results in a reduction of the gap distance for securement of the mounting lip within the lip groove with a gripping force;
   (d) a tightening element threadedly transportable along the shaft portion between a release position and a lock position, thereby being configured to:
      (i) when in the release position, allow movement of the object retention element between the closed position and the open position,
      (ii) when in the lock position, prevent movement of the object retention element from the gripping position toward the open position, and
      (iii) enable adjustability of the gripping force; and
   (e) a cover element configured to engage the tightening element so as to restrict relative rotational movement therebetween about the main axis while enabling relative axial movement therebetween;
   wherein the clearance distance is configured to prevent the rotational detent member from protruding outward of the retention face when the object retention element is in the gripping position.

2. A marking apparatus as defined in claim 1 wherein the rotational detent member and the rotational detent section are configured to be placed in mutual non-rotatable engagement at multiple rotational orientations about the main axis with respect to one another.

3. A marking apparatus as defined in claim 1 wherein the limitation of axial movement is by way of engagement between the axial detent portion and the rotational detent member.

4. A marking apparatus as defined in claim 3 wherein the axial detent portion is a retention flange lip within the alignment bore.

5. A marking apparatus as defined in claim 1 wherein the limitation of axial movement is by way of engagement between the axial detent portion and an axial detent member affixed to the shaft portion between the head portion and the marking end.

6. A marking apparatus as defined in claim 5 wherein the axial detent member is a retaining ring.

7. A marking apparatus as defined in claim 5 wherein the axial detent member is disposed between the rotational detent member and the head portion.

8. A marking apparatus as defined in claim 5 wherein the rotation detent member and the axial detent member are a unitary component.

9. A marking apparatus as defined in claim 1 wherein the alignment bore includes a first segment extending from the retention face, the first segment being devoid of the rotational detent section so as not to restrict axial and rotational movement between the rotational detent member and the object retention element.

10. A marking apparatus as defined in claim 1 wherein the alignment bore includes a first segment extending from the retention face, the head portion has a head diameter, and the first segment has a first diameter equal to or greater than the head diameter.

11. A marking apparatus as defined in claim 1 wherein the clearance distance is configured to prevent the rotational detent member from protruding outward of the retention face when the object retention element is in the open position.

12. A marking apparatus as defined in claim 1 wherein the object retention element includes one or more finger grip portions extending radially of the main axis, each of the finger grip portions having a base transition portion axially terminating in-plane with the retention face.

13. A marking apparatus as defined in claim 1 wherein:
(a) the cover element includes a surface engagement portion and is movable with respect to the post element along the main axis between an extended position and a marking position, the cover element being elastically biased toward the extended position;
(b) the surface engagement portion
(i) extends axially beyond the marking end when the cover element is in the extended position, and
(ii) is axially aligned with or inward of the marking end when the cover element is in the marking position;
(c) the object retention element is resiliently biased toward the closed position;
(d) the resilient bias and elastic bias are provided by way of a spring element; and
(e) the object retention element includes an alignment boss through which the alignment bore extends and about which the spring element is disposed.

14. A marking apparatus as defined in claim 13 wherein the post element includes a cover retention element removably attached to the shaft portion, wherein
(a) when the cover retention element is attached to the shaft portion, the cover retention element is configured to
(i) axially retain the cover element on the post element,
(ii) limit the axial distance between the surface engagement portion and the marking end when the cover element is in the extended position, and
(iii) prevent the post element from being removed from the object retention element;
(b) the cover element includes a marking tip chamber, at least a majority of the cover retention element being configured to reside within the marking tip chamber when the cover element is in the extended position;
(c) removal of the cover retention element from the shaft portion is laterally obstructed when the majority of the cover retention element resides within the marking tip chamber;
(d) the cover element is movable with respect to the post element along the main axis to a retention-access position, whereat the cover retention element is removable from the shaft portion; and
(e) the post element is removable from the object retention element when the cover retention element and tightening element are removed from the shaft portion.

15. A marking apparatus as defined in claim 14 wherein the cover retention element comprises a locking pin configured to extend radially through a pin aperture in the shaft portion.

16. A marking apparatus as defined in claim 15 wherein the lateral obstruction prevents removal of the locking pin from the pin aperture.

17. A marking apparatus as defined in claim 14 wherein the cover retention element is an external retaining ring configured to laterally snapingly engage the shaft portion.

18. A marking apparatus as defined in claim 14 wherein the cover retention element is configured to threadedly engage the shaft portion, and thereby form the marking end.

19. A marking apparatus as defined in claim 1 wherein the adjustability of the gripping force enables the gripping force to be increased sufficiently so as to rigidly affix the marking apparatus to the object.

20. A marking apparatus as defined in claim 1 further comprising an orthogonality adapter for rigidly maintaining the main axis in an orthogonal orientation with respect to a local surface of a said object having a keyhole hardware element protrudingly affixed to the local surface of the object, the orthogonality adapter including
(a) a primary axis and a relief axis defined orthogonally to one another and collectively defining a transverse plane in which they reside;
(b) a post deployment aperture extending along the primary axis;
(c) a relief channel extending along the relief axis and intersecting the post deployment aperture;
(d) a retainer engagement portion configured to be in removable engagement with the object retention element;
(e) an object engagement plane defined orthogonally to the primary axis; and
(f) two shim portions disposed on opposing sides of the transverse plane and terminating at the object engagement plane.

21. A marking apparatus as defined in claim 20 wherein the removable engagement is by way of at least partial receipt of the object retention element by the retainer engagement portion.

22. A marking apparatus as defined in claim 21 wherein the orthogonality adapter and the object retention element include complementary securement features for manually-reversibly maintaining the removable engagement.

23. A marking apparatus as defined in claim 22 wherein the complementary securement features include one or more cantilever snaps.

24. A marking apparatus as defined in claim 22 wherein the complementary securement features include a pair of cantilever snaps disposed on opposing sides of the orthogonality adapter.

25. A marking apparatus as defined in claim 24 wherein the cantilever snaps are configured to snapingly engage corresponding snap-receiving portions of the object retention element.

26. A marking apparatus as defined in claim 22 wherein the complementary securement features include a mutually-frictionally engageable surfaces.

27. A marking apparatus as defined in claim 20 wherein the relief channel includes a relief mouth opening along the relief axis oppositely of the post deployment aperture.

28. A marking apparatus as defined in claim 27 wherein the orthogonality adapter includes a cross member connecting the shim portions to one another.

29. A marking apparatus as defined in claim 20 wherein the relief channel includes a first relief mouth and a second relief mouth which open along the relief axis on opposing sides of the post deployment aperture.

30. A marking apparatus as defined in claim 20 wherein
  (a) the shim portions have a thickness in a direction along the primary axis;
  (b) a head extension distance is defined between the retention face and the inner face when the object retention element is in the open position; and
  (c) the thickness is equal to or less than the head extension distance.

31. A marking apparatus as defined in claim 1 wherein the inner face is tapered at a taper angle with respect to the shaft portion.

32. A marking apparatus as defined in claim 31 wherein the taper angle is between 30 and 60 degrees.

33. A marking apparatus as defined in claim 1 further comprising a shaft size adapter, wherein
  (a) the axial offset defines a clearance zone between the inner face and rotational detent member;
  (b) the shaft size adapter is configured to be in receiving engagement with the shaft portion within the clearance zone, and thereat extend radially outwardly of the shaft portion; and
  (c) the alignment bore includes a first segment extending from the retention face, the shaft size adapter being configured to be received by the first segment.

34. A marking apparatus as defined in claim 33 wherein the shaft size adaptor is in removable receiving engagement with the shaft portion.

35. A marking apparatus as defined in claim 34 wherein the shaft size adapter is comprised of a polymer and the removably receiving engagement is by way of snap joining.

36. A marking apparatus as defined in claim 33 comprising a plurality of said shaft size adapters, said plurality of shaft size adapters having respective shaft adapter diameters which are distinct from one another.

37. A marking apparatus for facilitating blind slide-mounting of an object to a mounting surface in a desired alignment using the object as an alignment template, the apparatus comprising:
  (a) a post element including a head portion, a marking end, and a shaft portion extending therebetween along a main axis, the head portion having an outer face opposite of the marking end, and an inner face disposed oppositely of the outer face between the outer face and the marking end;
  (b) a rotational detent member affixed to the shaft portion and projecting radially outwardly thereof;
  (c) an object retention element including a retention face, an opposing face, and an alignment bore disposed therebetween along the main axis, the alignment bore being in receipt of the shaft portion and including a rotational detent section, the rotational detent section being configured to axially-slidably and non-rotatably receive the rotational detent member, the object retention element being movable with respect to the post element along the main axis between a closed position, an open position, and a gripping position therebetween, wherein:
    (i) movement of the object retention element from the closed position to the open position results in the presentation of a lip groove for receiving a mounting lip of an object, the lip groove being at least partially defined by a gap distance between the head portion and the retention face, and
    (ii) movement of the object retention element from the open position to the gripping position results in a reduction of the gap distance for securement of the mounting lip within the lip groove with a gripping force;
  (d) a tightening element threadedly transportable along the shaft portion between a release position and a lock position, thereby being configured to:
    (i) when in the release position, allow movement of the object retention element between the closed position and the open position,
    (ii) when in the lock position, prevent movement of the object retention element from the gripping position toward the open position, and
    (iii) enable adjustability of the gripping force;
  (e) a cover element configured to engage the tightening element so as to restrict relative rotational movement therebetween about the main axis while enabling relative axial movement therebetween; and
  (f) an orthogonality adapter including
    (i) a primary axis and a relief axis defined orthogonally to one another and collectively defining a transverse plane in which they reside;
    (ii) a post deployment aperture extending along the primary axis;
    (iii) a relief channel extending along the relief axis and intersecting the post deployment aperture;
    (iv) a retainer engagement portion configured to be in removable engagement with the object retention element;
    (v) an object engagement plane defined orthogonally to the primary axis; and
    (vi) two shim portions disposed on opposing sides of the transverse plane and terminating at the object engagement plane.

38. A marking apparatus as defined in claim 37 wherein the removable engagement is by way of at least partial receipt of the object retention element by the retainer engagement portion.

39. A marking apparatus as defined in claim 38 wherein the orthogonality adapter and the object retention element include complementary securement features for manually-reversibly maintaining the removable engagement.

40. A marking apparatus as defined in claim 39 wherein the complementary securement features include one or more cantilever snaps.

41. A marking apparatus as defined in claim 39 wherein the complementary securement features include a pair of cantilever snaps disposed on opposing sides of the orthogonality adapter.

42. A marking apparatus as defined in claim 41 wherein the cantilever snaps are configured to snapingly engage corresponding snap-receiving portions of the object retention element.

43. A marking apparatus as defined in claim 39 wherein the complementary securement features include a mutually-frictionally engageable surfaces.

44. A marking apparatus as defined in claim 37 wherein the relief channel includes a relief mouth opening along the relief axis oppositely of the post deployment aperture.

45. A marking apparatus as defined in claim 44 wherein the orthogonality adapter includes a cross member connecting the shim portions to one another.

46. A marking apparatus as defined in claim 37 wherein the relief channel includes a first relief mouth and a second relief mouth which open along the relief axis on opposing sides of the post deployment aperture.

47. A marking apparatus as defined in claim 37 wherein
   (a) the shim portions have a thickness in a direction along the primary axis;
   (b) a head extension distance is defined between the retention face and the inner face when the object retention element is in the open position; and
   (c) the thickness is equal to or less than the head extension distance.

\* \* \* \* \*